(12) United States Patent
Zarket et al.

(10) Patent No.: US 12,023,642 B2
(45) Date of Patent: Jul. 2, 2024

(54) MULTILAYER STRUCTURES WITH DISTINCT LAYERS AND METHODS OF FORMING SAME

(71) Applicant: University of Maryland, College Park, College Park, MD (US)

(72) Inventors: Brady C. Zarket, Elkridge, MD (US); Srinivasa R. Raghavan, Columbia, MD (US); Hanchu Wang, Germantown, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 1095 days.

(21) Appl. No.: 16/631,947

(22) PCT Filed: Jul. 17, 2018

(86) PCT No.: PCT/US2018/042379
§ 371 (c)(1),
(2) Date: Jan. 17, 2020

(87) PCT Pub. No.: WO2019/018334
PCT Pub. Date: Jan. 24, 2019

(65) Prior Publication Data
US 2020/0179895 A1 Jun. 11, 2020

Related U.S. Application Data

(60) Provisional application No. 62/533,913, filed on Jul. 18, 2017.

(51) Int. Cl.
*B01J 13/18* (2006.01)
*B01J 13/22* (2006.01)
(Continued)

(52) U.S. Cl.
CPC ............... *B01J 13/18* (2013.01); *B01J 13/22* (2013.01); *B29D 23/00* (2013.01); *C08F 220/56* (2013.01); *B29K 2033/26* (2013.01)

(58) Field of Classification Search
None
See application file for complete search history.

(56) References Cited

U.S. PATENT DOCUMENTS

| | | | |
|---|---|---|---|
| 2007/0110810 A1 | 5/2007 | Smith | |
| 2015/0282934 A1* | 10/2015 | Gray, Jr. | ................. A61L 27/18 424/423 |
| 2015/0353698 A1* | 12/2015 | Matuschewski | ....... B01D 71/26 210/500.21 |

FOREIGN PATENT DOCUMENTS

CA  2975067  6/2016

OTHER PUBLICATIONS

Abate, A. R. et al. (2009) "*High-Order Multiple Emulsions Formed In Poly(dimethylsiloxane) Microfluidics*," Small 5:2030-2032.
(Continued)

*Primary Examiner* — Jeffrey D Washville
(74) *Attorney, Agent, or Firm* — HYLTON-RODIC LAW PLLC

(57) ABSTRACT

Methods of synthesizing multilayer structures, including multilayer capsules, tubes and hair-covered substrates, are provided. A substrate is provided comprising a polymerization initiator. The initiator-loaded substrate is exposed to a solution comprising a monomer and crosslinker. The initiator diffuses outwardly from the substrate, thereby initiating polymerization of the monomer and forming a layered structure comprising a polymer portion disposed on an exterior surface of the substrate. The process may be repeated for a selected number of cycles, thereby forming a multilayer structure having a selected number of layers. The composition, thickness and properties of each layer are
(Continued)

selectively controlled. Multilayer structures formed in accordance with the methodologies are also provided.

10 Claims, 39 Drawing Sheets

(51) Int. Cl.
    *B29D 23/00*      (2006.01)
    *B29K 33/00*      (2006.01)
    *C08F 220/56*    (2006.01)

(56) References Cited

OTHER PUBLICATIONS

Ahmed, E.M. (2015) "Hydrogel: Preparation, Characterization and Applications: A Review," J. Advanced Res. 6:105-121.

Ahn, S. K. et al. (2008) "Stimuli-Responsive Polymer Gels," Soft Matter 4:1151-1157.

Alexandre, N. et al. (2017) "Long Term Performance Evaluation of Small-Diameter Vascular Grafts Based on Polyvinyl Alcohol Hydrogel and Dextran and Mscs-Based Therapies Using The Ovine Pre-Clinical Animal Model," Int. J. Pharm. 523:515-530.

Antipov, A. A. et al. (2001) "Sustained Release Properties of Polyelectrolyte Multilayer Capsules," J. Phys. Chem. B, 105:2281-2284.

Ariga, K. et al. (2012) "Soft Capsules, Hard Capsules, and Hybrid Capsules," Soft Mater. 10:387-412.

Arya, C. et al. (2013) "Capturing Rare Cells From Blood Using a Packed Bed of Custom Synthesized Chitosan Microparticles," J. Mater. Chem. B 1:4313-4319.

Arya, C. et al. (2016) "Killer" Microcapsules That Can Selectively Destroy Target Microparticles In Their Vicinity, ACS Appl. Mater. Interfaces 8:29688-29695.

Athas, J. C. (2016) "Designing Hydrogels That Transform Their Shape In Response to Molecular Cues," Ph.D., University of Maryland—College Park; 102 pages.

Beltran, S. et al. (1991) "Swelling Equilibria for Weakly Ionizable, Temperature-Sensitive Hydrogels," Macromolecules 24:549-551.

Bhalla, A. S. et al. (2014) "Mechanistic Studies of an Autonomously Pulsing Hydrogel/Enzyme System for Rhythmic Hormone Delivery," J. Control Release 196:261-271.

Bhushan, B. (2009) "Biomimetics: Lessons From Nature—An Overview," Phil. Trans. R. Soc. A 367:1445-1486.

Buckley, J. A. et al. (1998) "CT Evaluation of Small Bowel Neoplasms: Spectrum of Disease," Radiographics 18:379-392 (Abstract Only).

Caruso, F. et al. (1998) "Nanoengineering of Inorganic and Hybrid Hollow Spheres by Colloidal Templating," Science 282:1111-1114.

Caruso, F. et al. (2001) "Magnetic Nanocomposite Particles and Hollow Spheres Constructed by a Sequential Layering Approach," Chem. Mater. 13:109-116.

Chan, E.-S. et al. (2011) "Effect of Formulation of Alginate Beads on Their Mechanical Behavior and Stiffness," Particuology 9:228-234.

Chen, P. Y. et al. (2012) "Biological Materials: Functional Adaptations and Bioinspired Designs," Prog. Mater. Sci. 57:1492-1704.

Choi, C-H. et al. (2013) "One Step Formation of Controllable Complex Emulsions: From Functional Particles to Simultaneous Encapsulation of Hydrophilic and Hydrophobic Agents Into Desired Position," Adv. Mater. 25:2536-2541.

Chojnacka-Gorka, K. et al. (2016) "Robust Polyelectrolyte Microcapsules Reinforced With Carbon Nanotubes," RSC Adv. 6:114639-114643.

Cipriano, B. H. et al. (2014) "Superabsorbent Hydrogels That are Robust and Highly Stretchable," Macromolecules 47:4445-4452.

Cummins, H. Z. (2007) "Liquid, Glass, Gel: The Phases of Colloidal Laponite," J. Non-Cryst. Solids 353:3891-3905.

Dai, H. et al. 2009) "Multi-Membrane Hydrogel Fabricated by Facile Dynamic Self-Assembly," Soft Matter 5:1987-1989.

Daugherty, A. L. et al. (1999) "Transcellular Uptake Mechansisms of The Intestinal Epithelial Barrier: Part One," Pharm. Sci. Technol. To. 2:144-151.

Dawson, C. et al. (1997) "How Pine Cones Open," Nature 390:668-668.

Decher, G. et al. (1991) "Buildup of Ultrathin Multilayer Films by a Self-Assembly Process: II. Consecutive Adsorption of Anionic and Cationic Bipolar Amphiphiles and Polyelectrolytes on Charged Surfaces," Berich. Bunsen. Gesell. 95:1430-1434 (Abstract Only).

Decher, G. et al. (1991) "Buildup of Ultrathin Multilayer Films by a Self-Assembly Process, 1 Consecutive Adsorption of Anionic and Cationic Bipolar Amphiphiles on Charged Surfaces," Macromol. Symp. 46:321-327 (Abstract Only).

Decher, G. et al. (1992) "Buildup of Ultrathin Multilayer Films by a Self-Assembly Process: III. Consecutively Alternating Adsorption of Anionic and Cationic Polyelectrolytes on Charged Surfaces," Thin Solid Films 210:831-835.

Dinarvand, R. et al. (1995) "The Use of Thermoresponsive Hydrogels for On-Off Release of Molecules," J. Control Release 36:221-227.

Duan, J. et al. (2013) "Versatile Fabrication of Arbitrarily Shaped Multi-Membrane Hydrogels Suitable for Biomedical Applications," J. Mater. Chem. B 1:485-492.

Dunlop, J. W. C. et al. (2011) "Artful Interfaces Within Biological Materials," Mater. Today 14:70-78.

Esser-Kahn, A. P. et al. (2011) "Triggered Release From Polymer Capsules," Macromolecules 44:5539-5553.

Forterre, Y. et al. (2005) "How The Venus Flytrap Snaps," Nature 433:421-425.

Fratzl, P. (2007) "Biomimetic Materials Research: What Can We Really Learn From Nature's Structural Materials?" J. R. Soc. Interface 4:637-642.

Fundueanu, G. et al. (1999) "Physico-Chemical Characterization of Ca-Alginate Microparticles Produced With Different Methods," Biomaterials 20:1427-1435.

Gargava, A. et al. (2016) "Smart Hydrogel-Based Valves Inspired by The Stomata In Plants," Acs Appl. Mater. Interfaces 8:18430-18438.

Ghaffarian, R. et al. (2016) "Chitosan-Alginate Microcapsules Provide Gastric Protection and Intestinal Release of ICAM-1-Targeting Nanocarriers, Enabling Gi Targeting In Vivo," Adv. Funct. Mater. 26:3382-3393.

Gong, J. P. et al. (2003) "Double-Network Hydrogels With Extremely High Mechanical Strength," Adv. Mater. 15:1155-1158.

Gracias, D. H. (2013) "Stimuli Responsive Self-Folding Using Thin Polymer Films," Curr. Opin. Chem. Eng. 2:112-119.

Granasy, L. et al. (2005) "Growth and Form of Spherulites," Phys. Rev. E 72:011605:1-14.

Haase, M. F et al. (2014) "Tailoring of High-Order Multiple Emulsions by The Liquid-Liquid Phase Separation of Ternary Mixtures," Angew. Chem. Int. Edit. 53:11793-11797.

Haraguchi, K. et al. (2005) "Mechanism of Forming Organic/Inorganic Network Structures During In-Situ Free-Radical Polymerization In PNIPA-Clay Nanocomposite Hydrogels," Macromolecules 38:3482-3490.

Haraguchi, K. (2011) "Stimuli-Responsive Nanocomposite Gels," Colloid Polym. Sci. 289:455-473.

Hasan, A. et al. (2015) "A Multilayered Microfluidic Blood Vessel-Like Structure," Biomed. Microdevices 17:88:1-23.

Helander, H. F. et al. (2014) "Surface Area of The Digestive Tract—Revisited," Scand. J. Gastroentero. 49:681-689.

Hench, L.L. et al. (1990) "The Sol-Gel Process," Chem. Rev. 90:33-72.

Hench, L.L. (1991) "Bioceramics: From Concept to Clinic," J. Am. Ceram. Soc. 74:1487-1510.

Hirokawa, Y. et al. (1984) "Volume Phase Transition In a Nonionic Gel," J. Chem. Phys. 81:6379 (Abstract Only).

Hoch, E. et al. (2014) "Bioprinting of Artificial Blood Vessels: Current Approaches Towards a Demanding Goal," Eur. J. Cardio-Thorac 46:767-778.

Hu, Z. et al. (1995) "Synthesis and Application of Modulated Polymer Gels," Science 269:525-527.

(56) References Cited

OTHER PUBLICATIONS

Hu, N. et al. (2015) "*Photo-Crosslinked Natural Polyelectrolyte Multilayer Capsules for Drug Delivery*," 482:315-323.
Hüe, S. et al. (2004) "*A Direct Role for NKG2D/MICA Interaction In Villous Atrophy During Celiac Disease*," Immunity 21:367-377.
Hunziker, O. et al. (1979) "*The Aging Human Cerebral Cortex: A Stereological Characterization of Changes In The Capillary Net*," J. Gerontol. 34:345-350.
Ionov, L. (2013) "*Biomimetic Hydrogel-Based Actuating Systems*," Adv. Funct. Mater. 23:4555-4570.
Ju, Y. M. et al. (2010) "*Bilayered Scaffold for Engineering Cellularized Blood Vessels*," Biomaterials 31:4313-4321.
Ju, Y. M. et al.(2017) "*Electrospun Vascular Scaffold for Cellularized Small Diameter Blood Vessels: A Preclinical Large Animal Study*," Acta Biomater. 59:58-67.
Kang, J.-H. et al. (2017) "*Ultrathin Double-Shell Capsules for High Performance Photon Upconversion*," Adv. Mater. 29:1606830:1-6.
Kim, S. H. et al. (2011) "*Double-Emulsion Drops With Ultra-Thin Shells for Capsule Templates*," Lab on a Chip 11:3162-3166.
Kim, S. H. et al. (2011) "*One-Step Emulsification of Multiple Concentric Shells With Capillary Microfluidic Devices*," Angew. Chem. Int. Ed. 50:8731-8734.
Koppes, A. N. et al.(2016) "*Complex, Multi-Scale Small Intestinal Topography Replicated In Cellular Growth Substrates Fabricated via Chemical Vapor Deposition of Parylene C*," Biofabrication 8:035011:1-13.
Lack, L. et al. (1961) "*In Vitro Absorption of Bile Salts by Small Intestine of Rats and Guinea Pigs*," Am. J. Physiol. 200:313-317.
Ladet, S. et al. (2008) "*Multi-Membrane Hydrogels*," Nature 452:76-79.
Lee, K. et al. (2011) "*Growth Factor Delivery-Based Tissue Engineering: General Approaches and a Review of Recent Developments*," J.R. Soc. Interface 8:153-170.
Lee, K. Y. et al. (2012) "*Alginate: Properties and Biomedical Applications*," Prog. Polym. Sci. 37:106-126.
Li, Q. et al. (2017) "*Manufacture and Property Research of Heparin Grafted Electrospinning PCU Artificial Vascular Scaffolds*," Mat. Sci. Eng. C 78:854-861.
Lima, A. C. et al. (2013) "*Biomimetic Methodology to Produce Polymeric Multilayered Particles for Biotechnological and Biomedical Applications*," Small 9:2487-2492.
Mao, S. S. et al. (2008) "*Normal Thoracic Aorta Diameter on Cardiac Computed Tomography In Healthy Asymptomatic Adult; Impact of Age and Gender*," Academic Radiology 15:827-834.
Melchiorri, A. J. et al. (2016) "*3D-Printed Biodegradable Polymeric Vascular Grafts*," Adv. Healthc. Mater. 5:319-325.
Murphy, S. V. et al. (2014) "*3D Bioprinting of Tissues and Organs*," Nat. Biotechnol. 32:773-785.
Naahidi, S. et al. (2017) "*Biocompatability of Hydrogel-Based Scaffolds for Tissue Engineering Applications*," Biotechnol. Adv. 35:530-544.
Nguyen, K.T. et al. (2002) "*Photopolymerizable Hydrogels for Tissue Engineering Applications*," Biomaterials, 23:4307-4314.
Nichol, J.W. et al. (2010) "*Cell-Laden Microengineered Gelatin Methacrylate Hydrogels*," Biomaterials, 31:5536-5544.
Nita, L. E. et al. (2014) "*Upon Some Multi-Membrane Hydrogels Based on Poly(N,N-Dimethyl-Acrylamide-Co-3, 9-Divinyl-2,4,8,10-Tetraoxaspiro (5.5) Undecane): Preparation, Characterization and In Vivo Tests*," J. Mater. Sci. Mater. Med. 25:1757-1768.
Nys, Y. et al. (2004) "*Avian Eggshell Mineralization: Biochemical and Functional Characterization of Matrix Proteins*," C. R. Palevol 3:549-562.
Osada, Y. et al. (2004) "*Polymer Gels*," J. Macromol. Sci. Polym. Rev. C44:87-112.
Patel, A. et al. (2006) "*Elastin Biosynthesis: The Missing Link In Tissue-Engineered Blood Vessels*," Cardiovasc. Res. 71:40-49.
Pauly, H. M. et al. (2017) "*Hierarchically Structured Electrospun Scaffolds With Chemically Conjugated Growth Factor for Ligament Tissue Engineering*," Tissue Eng. Pt. A, 23:823-836.

Payne, G. F. et al. (2013) "*Accessing Biology's Toolbox for The Mesoscale Biofabrication of Soft Matter*," Soft Matter 9:6019-6032.
Pignoli, P. et al. (1986) "*Intimal Plus Medial Thickness of The Arterial Wall: A Direct Measurement With Ultrasound Imaging*," Circulation 74:1399-1406.
Polomska, A. et al. (2017) "*Layer-By-Layer Coating of Solid Drug Cores: A Versatile Method to Improve Stability, Control Release and Tune Surface Properties*," Macromol. Biosci. 17:1600228:1-17.
Qiu, Y. et al. (2012) "*Environment-Sensitive Hydrogels for Drug Delivery*," Adv. Drug Deliv. Rev. 64:49-60.
Quintana, G. et al. (2017) "*Layer-By-Layer Encapsulation of Lactobacillus delbrueckii Subsp Bulgaricus Using Block-Copolymers of Poly(Acrylic Acid) and Pluronic for Safe Release In Gastro-Intestinal Conditions*," J. Funct. Foods 35:408-417.
Ramesh, S. et al. (2013) "*Properties of Hydroxyapatite Synthesize by Wet Chemical Method*," J. Ceram. Process. Res. 14:448-452.
Ribeiro, C. A. et al. (2017) "*Electrochemical Preparation and Characterization of PNIPAM-Hap Scaffolds for Bone Tissue Engineering*," Mat. Sci. Eng. C, 81:156-166.
Sandgren, T. et al. (1999) "*The Diameter of The Common Femoral Artery In Healthy Human: Influence of Sex, Age, and Body Size*," J. Vasc. Surg. 29:503-510.
Slaughter, B. et al. (2009) "*Hydrogels In Regenerative Medicine*," Adv. Mater. 21:3307-3329.
Stadler, B. et al. (2009) "*Polymer Hydrogel Capsules: En Route Toward Synthetic Cellular Systems*," Nanoscale 1:68-73.
Suchanek, W. et al. (2011) "*Processing and Properties of Hydroxyapatite-Based Biomaterials for Use as Hard Tissue Replacement Implants*," J. Mater. Res. 13:94-117.
Sung, J. H. et al. (2011) "*Microscale 3-D Hydrogel Scaffold for Biomimetic Gastrointestinal (GI) Tract Model*," Lab Chip 11:389-392.
Tan, Z. et al. (2017) "*Electrospun Vein Grafts With High Cell Infiltration for Vascular Tissue Engineering*," Mat. Sci. Eng. C 81:407-415.
Tanaka, T. (1981) "*Gels*," Sci. Am. 244:124-138.
Thomas, P. C. et al. (2011) "*Nanoparticle-Crosslinked Hydrogels as a Class of Efficient Materials for Separation and Ion Exchange*," Soft Matter 7:8192-8197.
Tobin, J. M. et al. (2001) "*Upper Gastrointestinal Mucosal Disease In Pediatric Crohn Disease and Ulcerative Colitis: A Blinded, Controlled Study*," J. Pediatr. Gastr. Nutr. 32:443-448.
Turing, A. M. (1953) "*The Chemical Basis of Morphogenesis*," Philos. Trans. R. Soc. Lond. B Biol. Sci. 237:37-72.
Wang, H. et al. (2011) "*Hemocompatible Polyurethane/Gelatin-Heparin Nanofibrous Scaffolds Formed by a Bilayer Electrospinning Technique as Potential Artificial Blood Vessels*," Front. Chem. Sci. Eng. 5:392-400.
Wang, X. et al. (2011) "*A Tubular PLGA-Sandwiched Cell/Hydrogel Fabrication Technique Based on a Step-By-Step Mold/Extraction Process*," Adv. Polym. Tech. 30:163-173.
Wang, H. C. et al. (2015) "*Trigger Chemistries for Better Industrial Formulations*," Acs Appl. Mater. Interfaces 7:6369-6382.
White, J. C. et al. (2012) "*Addition of Perfluorocarbons to Alginate Hydrogels Significantly Impacts Molecular Transport and Fracture Stress*," J. Biomed. Mater. Res. A 101:438-446.
White, J. C. et al. (2013) "*Alginate/Peo-Ppo-Peo Composite Hydrogels With Thermally-Active Plasticity*," Biomacromolecules 14:4456-4464.
Wong, M. et al. (1993) "*Ultrasonic-Pathological Comparison of The Human Arterial Wall. Verification of Intima-Media Thickness*," Arterioscl. Throm. Vas. 13:482-486.
Xiong, Y. et al. (2014) "*Compartmentalized Multilayer Hydrogel Formation Using a Stimulus-Responsive Self-Assembling Polysaccharide*," ACS Appl. Mater. Interfaces 6:2948-2957.
Yan, K. et al. (2016) "*Electro-Molecular Assembly: Electrical Writing of Information Into an Erasable Polysaccharide Medium*," ACS Appl. Mater. Interfaces 8:19780-19786.
Yoshida, R. et al. (1994) "*Positive Thermosensitive Pulsatile Drug-Release Using Negative Thermosensitive Hydrogels*," J. Control Release 32:97-102.

(56) References Cited

OTHER PUBLICATIONS

Zarket, B. et al. (2017) "*Onion-Like Multilayered Polymer Capsules Synthesized by a Bioinspired Inside-Out Technique*," Nature Communications 8:13:1-10.
Zhang, C. Q. et al. (2016) "*Nano/Micro-Manufacturing of Bioinspired Materials: A Review of Methods to Mimic Natural Structures*," Adv. Mater. 28:6292-6321.
Zhao, N. et al. (2014) "*Bioinspired Materials: From Low to High Dimensional Structure*," Adv. Mater. 26:6994-7017.

\* cited by examiner

MULTILAYER STRUCTURES WITH DISTINCT LAYERS AND METHODS OF FORMING SAME

CROSS-REFERENCE TO RELATED APPLICATIONS

This application is a § 371 National Stage Application of PCT/US2018/042379 (filed Jul. 17, 2018), which application is based on U.S. Provisional Patent Application Ser. No. 62/533,913, filed Jul. 18, 2017, titled "Multilayer Capsules with Distinct Compositions for Each Layer," each of which applications is incorporated herein by reference in its entirety and to which priority is claimed.

FIELD OF THE INVENTION

The present invention relates to methods of synthesizing multilayer structures and the structures formed therefrom, and in particular multilayer capsules, tubes and hair-covered surfaces, comprising discrete layers or portions with differing properties.

BACKGROUND OF THE INVENTION

Nature is increasingly providing the inspiration for the design of new materials (see, e.g., Forgacs, G. & Sun, W., BIOFABRICATION: MICRO- AND NANO-FABRICATION, PRINTING, PATTERNING AND ASSEMBLIES (William Andrew, eds., 2013); Brennan, A. B. & Kirschner, C. M., BIO-INSPIRED MATERIALS FOR BIOMEDICAL ENGINEERING (Wiley, eds., 2014); Fratzl, P. *Biomimetic materials research: what can we really learn from nature's structural materials?* J. R. Soc. Interface 4, 637-642 (2007)). Significant efforts have been devoted to mimicking the microstructure or nanostructure found in natural materials, e.g., such as opals, nacre, gecko feet, bird beaks, etc. (Bhushan, B. *Biomimetics: lessons from nature—an overview*, Phil. Trans. R. Soc. A 367, 1445-1486 (2009); Chen, P. Y. et al. *Biological materials: functional adaptations and bioinspired designs*, Prog. Mater. Sci. 57, 1492-1704 (2012); Zhao, N. et al. *Bioinspired materials: from low to high dimensional structure*, Adv. Mater. 26, 6994-7017 (2014); Zhang, C. Q. et al. *Nano/micro-manufacturing of bioinspired materials: a review of methods to mimic natural structures*, Adv. Mater. 28, 6292-6321 (2016)). The large-scale (e.g., mm to cm) structure of natural materials can also provide a source of inspiration.

Consider the examples of a plant seed, an egg, a spinal disc, an onion, a blood vessel, and the small intestine (FIG. 1, panels (a-f); see also Gray, H. ANATOMY OF THE HUMAN BODY (Bartleby, 2000); Mauseth, J. D. BOTANY: AN INTRODUCTION TO PLANT BIOLOGY (Jones & Bartlett Learning, 2011)). A common theme to such natural materials is that they have many different layers, roughly arranged in a concentric fashion around a core. In the case of an egg and embryos in general, the yolk and the genetic material form the inner core, which is surrounded by the albumen, then multiple protein membranes, and finally the inorganic outer shell. Many tissues and body parts are also multilayered. For instance, the spinal discs located between consecutive vertebrae in the spine have two layers: a soft core surrounded by a stiffer shell. Another example is that of an onion, which has a developing bud in the center, surrounded by many water-rich concentric layers, and a drier outer scale. A feature from these natural examples is that the concentric layers in a given material often have different compositions, which in turn indicates their distinct function in the overall material.

In addition to structure, another aspect of many multilayered natural materials involves the manner of their growth, and in particular the growth and resulting shape of each of the specific structures (i.e., morphogenesis) (Thompson, D. A. W. ON GROWTH AND FORM (Cambridge University Press, 1917); Turing, A. M. *The chemical basis of morphogenesis*, Philos. Trans. R. Soc. Lond. B Biol. Sci. 237, 37-72 (1953)). To form a multilayered structure, such as a plant seed, the core typically forms first, followed by the next several surrounding layers, and finally the outer shell. Natural growth of many such structures invariably occurs from the inside-out. That is, not only does the core form first, but it dictates the subsequent growth, which occurs in a direction radiating outwardly from the core or center.

For instance, consider how a seed develops into a full-fledged organism. The growth begins at the surface of the seed and proceeds radially outward, utilizing nutrients from the external medium. Importantly, the seed core controls the rate and extent of growth. This strategy is fundamentally different from conventional processes used in materials synthesis, such as nucleation-and-growth, self-assembly, or additive manufacturing (Zhang, C. Q. et al. *Nano/micro-manufacturing of bioinspired materials: a review of methods to mimic natural structures*, Adv. Mater. 28, 6292-6321 (2016); Evans, D. F. & Wennerstrom, H. THE COLLOIDAL DOMAIN: WHERE PHYSICS, CHEMISTRY, BIOLOGY, AND TECHNOLOGY MEET (Wiley-VCH, 2001)). In nucleation-and growth, for example, nuclei grow outwardly to form macroscopic crystals, but the rate and form of growth is controlled by the availability of external precursor, and not by the core nucleus (Granasy, L. et al. *Growth and form of spherulites*, Phys. Rev. E 72, 011605 (2005)). In additive manufacturing (e.g., 3-D printing), macroscopic objects can be formed by adding one layer of material at a time, but this is essentially a deposition scheme controlled from the outside.

Conventional layer-by-layer techniques have many limitations. First, each layer is necessarily very thin because it must bind strongly to the underlying layer below. Second, due to the necessity for interaction between adjacent layers, the selection of materials is extremely limited (e.g., one cannot deposit adjacent layers of like-charged materials using such conventional methods). Moreover, each layer is interpenetrated with the layers above and below it, and thus there is no distinct separation between adjacent layers. Other conventional techniques provide for multilayered structures wherein all of the layers are made from the same material. The core of the object does not dictate the growth in such processes (Murphy, S. V. & Atala, A. *3D bioprinting of tissues and organs*, Nat. Biotechnol. 32, 773-785 (2014)). In addition, such techniques fail to mimic natural multilayered structures including distinct layers having differing thicknesses and/or formed from differing materials (see Kim, S. H. et al. *Double-emulsion drops with ultra-thin shells for capsule templates*, Lab on a Chip, 11, 3162-3166 (2011); Antipov, A. A. et al. *Sustained Release Properties of Polyelectrolyte Multilayer Capsules*, J. Phys. Chem. B, 105, 2281-2284 (2001)).

As such, conventional processes fail to provide for an inside-out growth strategy, particularly in the context of soft material synthesis. Moreover, they are overly complex and laborious to implement, and fail to provide for a multilayer structure having distinct layers with differing characteristics or properties.

Thus, it would be beneficial to provide methods of synthesized multilayer structures having features similar to those provided in natural structures, and that overcome one or more of the limitations associated with conventional processes. Further, it would be beneficial to provide multilayer structures, wherein each of the layers comprises different compositions, different thicknesses, and/or exhibit different properties (e.g., such as in response to stimuli).

SUMMARY OF THE INVENTION

Diverse structures in nature have many concentric layers, which are often formed starting from the core and proceeding outwards. In accordance with disclosed embodiments, inside-out polymerization techniques for creating multilayer polymer structures are provided that allow for precise control over the composition and thickness of each layer. In preferred embodiments, each layer is a crosslinked polymer gel that grows outwardly from the surface of the previous or underlying structure. Growth of each layer is controlled by reactive materials or molecules (e.g., a first monomer, a polymerization initiator) disposed in or on the core or base substrate. Using the disclosed techniques, multilayer structures may be synthesized in various geometries, including multilayer capsules and tubes, as well as structures having protrusions or hair-like components extending therefrom (referred to herein as 'hairs').

In some embodiments, a multilayer polymer capsule or sphere is synthesized using the disclosed techniques. In some implementations, the capsules include concentric polymer layers surrounding a gel core. Each of the layers may be non-responsive and/or responsive to a stimulus. In some embodiments, the thickness of a stimuli-responsive layer is sharply altered in response to the stimulus, while the thickness of a non-responsive layer remains substantially constant. In addition, the permeability of small molecules through the stimuli-responsive layer may be altered. Such multilayer capsules therefore allow for the pulsatile release of solutes, e.g., such as drugs or other chemicals. Further, the multilayer capsules exhibit improved mechanical properties as compared to the corresponding core lacking any layer(s).

In one embodiment, a template (e.g., a gel core) is provided which is loaded with an initiator used for free-radical polymerization. The initiator-loaded gel core is placed in a solution comprising a first monomer, a crosslinking agent, and preferably also an accelerant. The initiator diffuses outwardly from the core and induces polymerization of the first monomer, leading to a shell or layer of a first polymer surrounding the core. Thereafter, the single-layer structure is reloaded with fresh initiator and placed in a solution comprising a second monomer. The initiator again diffuses outwardly and induces polymerization of the second monomer, leading to a concentric shell or layer of a second polymer formed around the first polymer layer. The resulting multilayer structure (e.g., a core surrounded by two concentric and discrete polymer layers) may again be re-loaded with fresh initiator to form a third polymer layer, and again repeated thereafter to form a fourth polymer layer, a fifth polymer layer, a sixth polymer layer, and so forth. As many additional polymer layers as desired may be formed by repeating the same process. For example, a multilayer structure having at least 5, 10, 15, 20, 25 or more layers may be formed. Thus, the number of layers is selectively controlled by repeating the polymerization process. In addition, the thickness of each layer is selectively controlled (e.g., by varying the amount of initiator and/or polymerization time).

In some implementations, the interior gel core is dissolved following the layering process to yield a hollow multilayer capsule or sphere.

In some embodiments, a multilayer polymer tube is synthesized. Precise control over the inner diameter of the tube, the number of layers in the tube wall and/or the thickness and chemistry of each layer, is achieved using the disclosed techniques. The multilayer tube may be patterned with different polymers, either in the lateral or longitudinal direction. In some implementations, the patterned tube includes one or more layers comprising a stimuli-responsive polymer. The properties of the responsive layer and thus the tube are altered upon exposure to the stimulus. For example, the lumen diameter of the tube may spontaneously change in response to the stimulus, or the tube may change from a longitudinally straight configuration to a curled or twisted configuration in response to the stimulus. Further, the tube may be synthesized to comprise particular components or portions that mimic characteristics of natural structures, e.g., such as characteristics exhibited by blood vessels.

In some embodiments, a base polymer gel structure comprising outwardly extending protrusions or hairs is synthesized. The diameter, length, and spacing of the protrusions or hairs are selectively tunable. The addition of hairs on the surface of a base substrate (e.g., a hair-covered gel structure) substantially increases the overall surface area of the base substrate, e.g., by 2-fold, 3-fold, 5-fold, 8-fold, 10-fold or more, as desired (e.g., depending on hair density, size, composition and/or configuration). Such increase in surface area is thus comparable to the surface area increase exhibited by villi on the inner wall of the small intestine. In addition, the hairs may be utilized to extract solutes from a solution at a much faster rate as compared to the solute extraction profile exhibited by the base substrate lacking such hairs. Further, stimuli-responsive properties may be imparted to some or all of the hairs and/or the base substrate. For example, the spacing of the hairs relative to each other may be altered in response to a stimulus, or the orientation of the hairs relative to the base substrate may be altered in response to a stimulus. Further, the base substrate may be induced to fold or curve, resulting in a tubular structure having an exterior or interior surface covered with hairs.

The polymerization process or cycle utilized to form the polymer layer(s) may be repeated as many times as desired in order to form as many concentric layers as desired. The composition of each polymer layer is selectively controlled to achieve the desired characteristics thereof. In addition, the thickness or caliper of each layer is selectively controlled, e.g., such as by varying the amount of initiator utilized and/or polymerization time. The resulting multilayer structure exhibits remarkable mechanical resilience as well as stimuli-responsive properties. Further, the release of solutes from the multilayer structure may be tailored to follow a specific profile, e.g., depending on the chemistry of the layers and/or order of the layers (e.g., relative to the core or exterior of the structure).

The multilayer structures are suitable for a wide variety of applications, e.g., in fields of cosmetics, drug delivery, agrochemicals, catalysis, and biomimetics. For example, the multilayer tubes are particularly suitable for use in tissue engineering and biomaterials, e.g. artificial blood vessels. The hair-covered structures are likewise suitable for use in tissue engineering and biomaterials, e.g., for engineering structures mimicking the intestinal wall and/or other structures with increased surface area provided by the hairs. Selected combinations of polymeric layers may be incorporated into a given structure for a desired release profile. In addition, various nanoparticles may be incorporated into one or more layers during synthesis, e.g., for altering the release profile or other properties thereof. Optical properties may also be tuned based on layer composition and/or number. Thus, the particular characteristics of the multilayer structures may be readily engineered by adjusting the composition and/or thickness of each layer, and by selecting the order and number of layers.

In accordance with disclosed embodiments, the present invention is directed to a method of synthesizing a multilayer structure by subjecting a substrate to one or more polymer layer-forming cycle(s). In the initial layer-forming cycle, a substrate is loaded with a first reactant, e.g., such as by diffusion. The loaded substrate is then exposed to a second reactant. The first reactant diffuses outwardly from the substrate and reacts with the second reactant, thereby initiating polymerization and forming a polymer layer disposed on the substrate.

In some embodiments, the substrate is subjected to one or more additional polymer layer-forming cycle(s) following the initial cycle. In each of the additional cycle(s), the substrate from the preceding cycle is reloaded with a first reactant. The reloaded substrate is then exposed to a second reactant, wherein the first reactant diffuses outwardly from the substrate and reacts with the second reactant, thereby initiating polymerization and forming a polymer layer disposed on and discrete from the polymer layer formed in the preceding cycle.

In some embodiments, the multilayer structure comprises at least two distinct polymer layers. In some implementations, one of the polymer layers comprises a first composition, and at least another of the polymer layers comprises a second composition different from the first composition. In some implementations, one of the polymer layers has a first solute permeability, and at least another of the polymer layers has a second solute permeability different from the first solute permeability. In some implementations, one of the polymer layers has a first thickness and at least another of the polymer layers has a second thickness different from the first thickness.

In some implementations, the first reactant in at least one of the cycles differs from the first reactant in another of the cycles. In some implementations, the second reactant in at least one of the cycles differs from the second reactant in another of the cycles. In some implementations, at least one of the polymer layers formed in the cycles substantially or completely surrounds the substrate. In other implementations, at least one of the polymer layers only partially surrounds the substrate. For example, growth or polymerization of the polymer layer may be prevented in particular regions by treating the surface of such regions, e.g., such as by applying to such region (e.g., via spraying or brushing) a hydrophobic coating that prevents polymer growth. In some implementations, one or more of the polymer layers are concentrically disposed around the substrate. In some implementations, the polymer layer(s) comprise one or more arrays of hair-like protrusions extension outwardly from a base substrate.

In some embodiments, the substrate and/or one or more of the polymer layers comprises a biopolymer. In some implementations, the substrate and/or one or more of the polymer layers comprises a hydrogel. As well known in the art, hydrogels, or gels, comprise cross-linked polymer networks that may be extensively swollen with water. Hydrogels may be synthesized by simple reactions of one or more monomers, resulting in two- or multi-component systems of three-dimensional networks of polymer chains with water readily absorbed and filling the space between macromolecules. Thus, hydrogels may be readily synthesized in a number of ways, including one-step procedures like polymerization and cross-linking of multifunctional monomers, as well as multiple step procedures involving synthesis of polymer molecules having reactive groups and their subsequent cross-linking, sometimes also by reacting polymers with suitable cross-linking agents. Hydrogel-forming biopolymers include proteins such as collagen and gelatin, and other polysaccharides such as dextran, chitosan, cellulose, alginate, starch, and agarose (see, e.g., Ahmed, E. M. *Hydrogel: Preparation, characterization and applications: A review*, J. Advanced Res., 6, 105-121 (2015). Numerous synthetic polymers that form hydrogels may also be prepared via polymerization methods (id.), such as from monomers including, e.g., vinyl acetate, acrylamide, ethylene glycol and lactic acid.

In some embodiments, the first reactant is a polymerization initiator, which reacts with and initiates polymerization of the second reactant. The second reactant may be a monomer. For example, the initiator-loaded substrate may be exposed to a solution containing a monomer, which react to form the crosslinked polymer layer. The solution also preferably comprises a crosslinking agent, and may additionally comprise an accelerant.

In other embodiments, the first reactant is a first monomer, which reacts with the second reactant. In some implementations, the second reactant is a second monomer. A wide variety of natural and synthetic polymers may be formed via the reaction of monomer components, e.g., including numerous synthetic polymers such as polyethylene, polyester, epoxy resins, and nylon. As well known in the art, nylon may be synthesized by reacting monomers of diamines and diacids, wherein mixtures of these components are polymerized together to make copolymers. Thus, various chemistries may be utilized to form discrete polymer layers, each having a desired composition, thickness and/or other properties.

In some embodiments, the multilayer structure comprises a capsular configuration. In some embodiments, the multilayer structure comprises a generally cylindrical configuration. Further, the base gel or substrate may be removed, e.g. dissolved, thereby forming a multilayer structure having a generally tubular configuration. In some embodiments, at least one of the polymer layers comprises an array of thread or hair-like protrusions coupled to and extending outwardly from the base or substrate. The multilayer structure may be constructed in a wide range of sizes, e.g., in some implementations the multilayer structure has a diameter of between about 10 µm and about 50 mm, or between about 10 µm and about 10 mm, or between about 100 µm and about 10 mm, or between about 100 µm and about 5 mm.

In some embodiments, one or more of the polymer layers and/or the base or substrate comprises a stimulus-responsive polymer. A stimulus responsive material changes some property, such as shape, in response to a change in environment. Hydrogel materials may respond with sharp, large property changes in response to a relatively minor change in physical or chemical conditions. Exemplary stimuli include pH, temperature, ionic strength, solvent composition or concentration, pressure, electrical potential or magnetic field, visible light or radiation, and chemical and biological agents. Common stimuli for many stimulus responsive hydrogels includes pH, temperature and ionic strength.

The present invention is also directed to multilayer structures formed in accordance with the disclosed techniques. In one embodiment, an artificial multilayer structure comprises an interior region or substrate, a first polymer layer disposed around the interior region, and a second polymer layer disposed around and discrete from the first polymer layer. The first polymer layer comprises a first composition, and the second polymer layer comprises a second composition different from the first composition. In some embodiments, one of the polymer layers has a first thickness, and at least another of the polymer layers has a second thickness different than the first thickness. In some embodiments, one of the polymer layers has a first solute permeability and at least another of the polymer layers has a second solute permeability different from the first solute permeability.

In some embodiments, the artificial multilayer structure comprises three or more discrete polymer layers (e.g., 3, 4, 5, 6, 7, 8, 9, 10, 12, 15, 20 or more) arranged around the interior region. In some implementations, the discrete polymer layers are concentrically arranged around the interior region.

In some implementations, the interior region or substrate and/or one or more of the polymer layers comprises a biopolymer. In some implementations, the interior region or substrate and/or one or more of the polymer layers comprises a hydrogel, e.g., as described above.

In some embodiments, the multilayer structure comprises one or more polymer layers comprising a stimulus responsive polymer. Stimulus responsive materials are responsive to various changes or materials, e.g., including changes in pH, temperature, ionic strength, solvent composition or concentration, pressure, electrical potential or magnetic field, visible light or radiation, and chemical and biological agents, as described above.

The present invention is also directed to an artificial multilayer structure comprising a polymer substrate comprising a first composition, and an array of polymeric hairs coupled to and extending outwardly from the substrate. In some embodiments, the array of hairs comprises a second composition different from the first composition.

In some embodiments, the array of polymeric hairs is a first array, wherein the structure also includes a second array of polymeric hairs coupled to and extending outwardly from the substrate. The second array may have a composition or other properties different from that of the first array. For example, in some embodiments, the second array comprises a third composition that is different from the composition of the substrate and/or the composition of the first array of hairs.

In some embodiments, each of the protrusions of the first array has a first thickness and each of the protrusions of the second array has a second thickness different than the first thickness. In some embodiments, the structure comprising the hairs comprises a substrate formed from a stimulus-responsive polymer, as described above.

The multilayer structures of the present invention may be constructed to have various geometric configurations, including, e.g., a generally spherical, cylindrical or tubular configuration. In some embodiments, the structure and/or the substrate or base has a generally planar configuration. The configuration of the structure, substrate or base, and/or one or more of the hairs or layers may change orientation or shape in response to an external stimulus via use of a stimulus responsive polymer(s), as described above. In addition, the structure may be constructed in a wide range of sizes. For example, in some implementations, the multilayer structure has a diameter of between about 10 µm and about 50 mm, or between about 10 µm and about 10 mm, or between about 100 µm and about 10 mm, or between about 100 µm and about 5 mm.

BRIEF DESCRIPTION OF THE DRAWINGS

As shown in FIG. 12, when the Alg gel core was compressed up to ~50% strain, it was irreversibly flattened or squished into a disc shape (plastic behavior). The Alg gel core sample did not recover when the plate was lifted. As shown in FIG. 13, when the Alg-DMAA capsule was compressed up to ~50% strain, it responded elastically and recovered to its initial size and shape when the plate was raised during the recovery cycle. A second compression-recovery cycle was then applied on the sphere, wherein the data closely tracked that from the first cycle.

DETAILED DESCRIPTION OF EMBODIMENTS OF THE INVENTION

Figure 1:
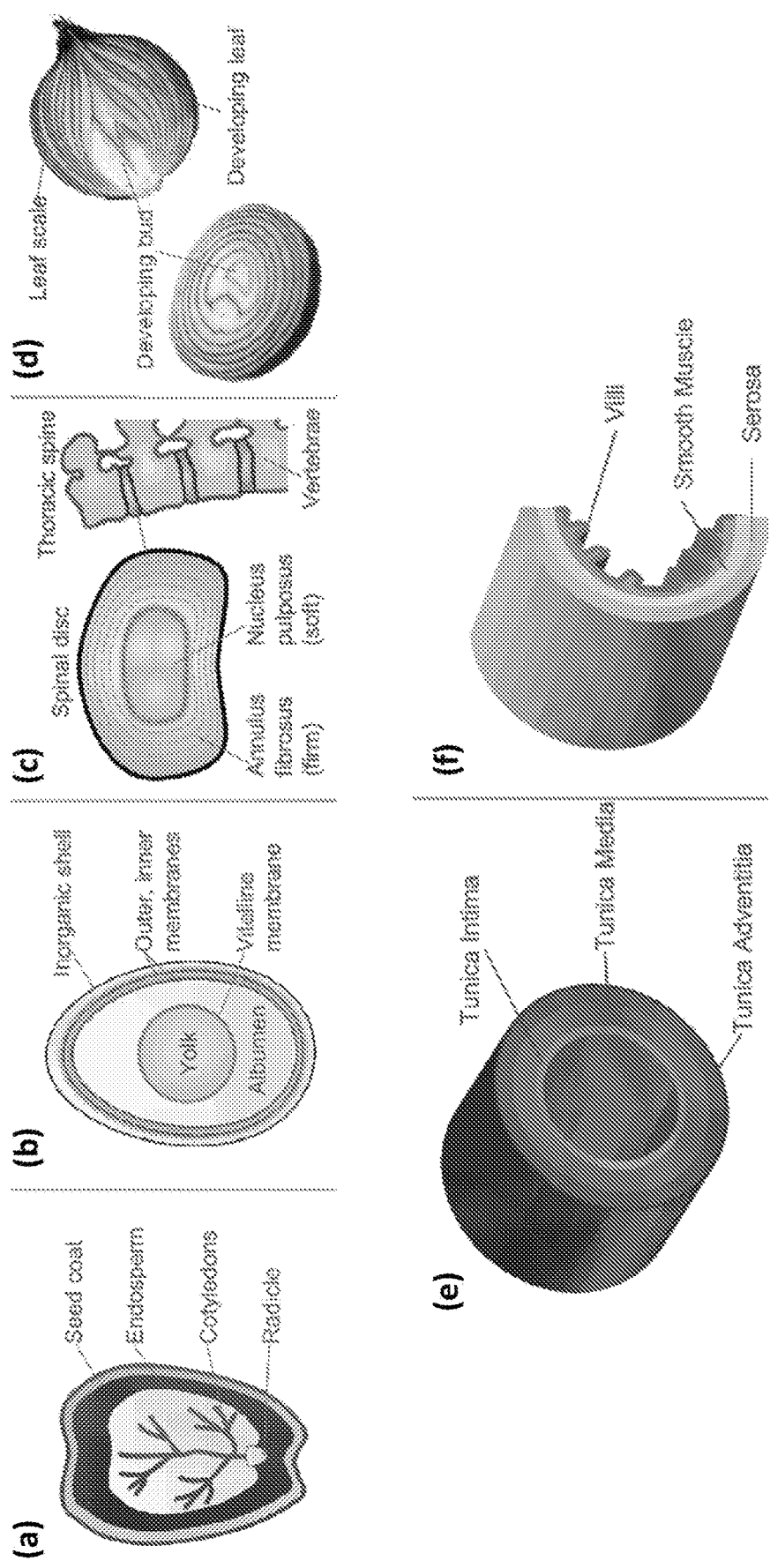
FIG. 1 illustrates exemplary natural structures having multiple, generally concentric layers, including: (a) a cross-sectional view of a caster bean seed; (b) a cross-sectional view of a chicken egg; (c) a cross-sectional view of a spinal disc (shown in the left image) located between the vertebrae in the spine (shown in the right image); (d) cross-sectional views of an onion showing the different layers; (e) a cross sectional view of a portion of a blood vessel; and (f) a cross sectional view of a portion of the small intestine showing the wall villi. The composition of each layer in the various natural structures is tied to its distinct function in the overall material.

The present invention is directed to methods for synthesizing multilayer polymer structures, e.g., polymer capsules, tubes and hair-covered surfaces or substrates, resulting therefrom. The multilayer structures are synthesized utilizing an inside-out polymerization technique, wherein the composition and thickness of each layer, as well as the total number of layers, is selectively controllable.

In some implementations, a polymer sphere or capsule is formed comprising a gelled or liquid core, with one or more concentrically arranged polymeric shell(s) or layer(s) surrounding the core. As described herein, the term "capsule" may refer to a structure having a generally spherical or oval configuration, and also encompasses other structures that generally encase, contain or at least partially surround a central region. The multilayer structures of the present invention are capable of encasing, storing and/or releasing solutes, and thus are suitable for a wide variety of applications, e.g., including cosmetics and drug-delivery (Stadler, B. et al. *Polymer hydrogel capsules: en route toward synthetic cellular systems*, Nanoscale 1, 68-73 (2009); Ariga, K. et al. *Soft capsules, hard capsules, and hybrid capsules*, Soft Mater. 10, 387-412 (2012)). Research in this area has primarily focused on stimuli-responsive capsules, wherein the release of solutes can be modulated by an external trigger (Esser-Kahn, A. P. et al. *Triggered release from polymer capsules*, Macromolecules 44, 5539-5553 (2011); Wang, H. C. et al. *Trigger chemistries for better industrial formulations*, ACS Appl. Mater. Interfaces 7, 6369-6382 (2015)).

Capsules have been synthesized with several identical layers formed via conventional methods (see, e.g., Ladet, S. et al. *Multi-membrane hydrogels*, Nature 452, 76-79 (2008); Dai, H. et al. *Multi-membrane hydrogel fabricated by facile dynamic self-assembly*, Soft Matter 5, 1987-1989 (2009); Kim, S.-H. & Weitz, D. A. *One-step emulsification of multiple concentric shells with capillary microfluidic devices*, Angew. Chem. Int. Ed. 50, 8731-8734 (2011); Choi, C.-H. et al. *One step formation of controllable complex emulsions: from functional particles to simultaneous encapsulation of hydrophilic and hydrophobic agents into desired position*, Adv. Mater. 25, 2536-2541 (2013); Duan, J. et al. *Versatile fabrication of arbitrarily shaped multi-membrane hydrogels suitable for biomedical applications*, J. Mater. Chem. B 1, 485-492 (2013); Lima, A. C. et al. *Biomimetic methodology to produce polymeric multilayered particles for biotechnological and biomedical applications*, Small 9, 2487-2492 (2013); Nita, L. E. et al. *Upon some multi-membrane hydrogels based on poly(N,N-dimethyl-acrylamide-co-*3, 9-*divinyl-*2,4,8,10-*tetraoxaspiro* (5.5) *undecane*): *preparation, characterization and in vivo tests*, J. Mater. Sci. Mater. Med. 25, 1757-1768 (2014); Xiong, Y. et al. *Compartmentalized multilayer hydrogel formation using a stimulus-responsive self-assembling polysaccharide*, ACS Appl. Mater. Interfaces 6, 2948-2957 (2014); Yan, K. et al. *Electro-molecular assembly: electrical writing of information into an erasable polysaccharide medium*, ACS Appl. Mater. Interfaces 8, 19780-19786 (2016)). However, prior methods have failed to provide for capsules including diverse polymeric layers or shells integrated together in the capsule.

Figure 2:
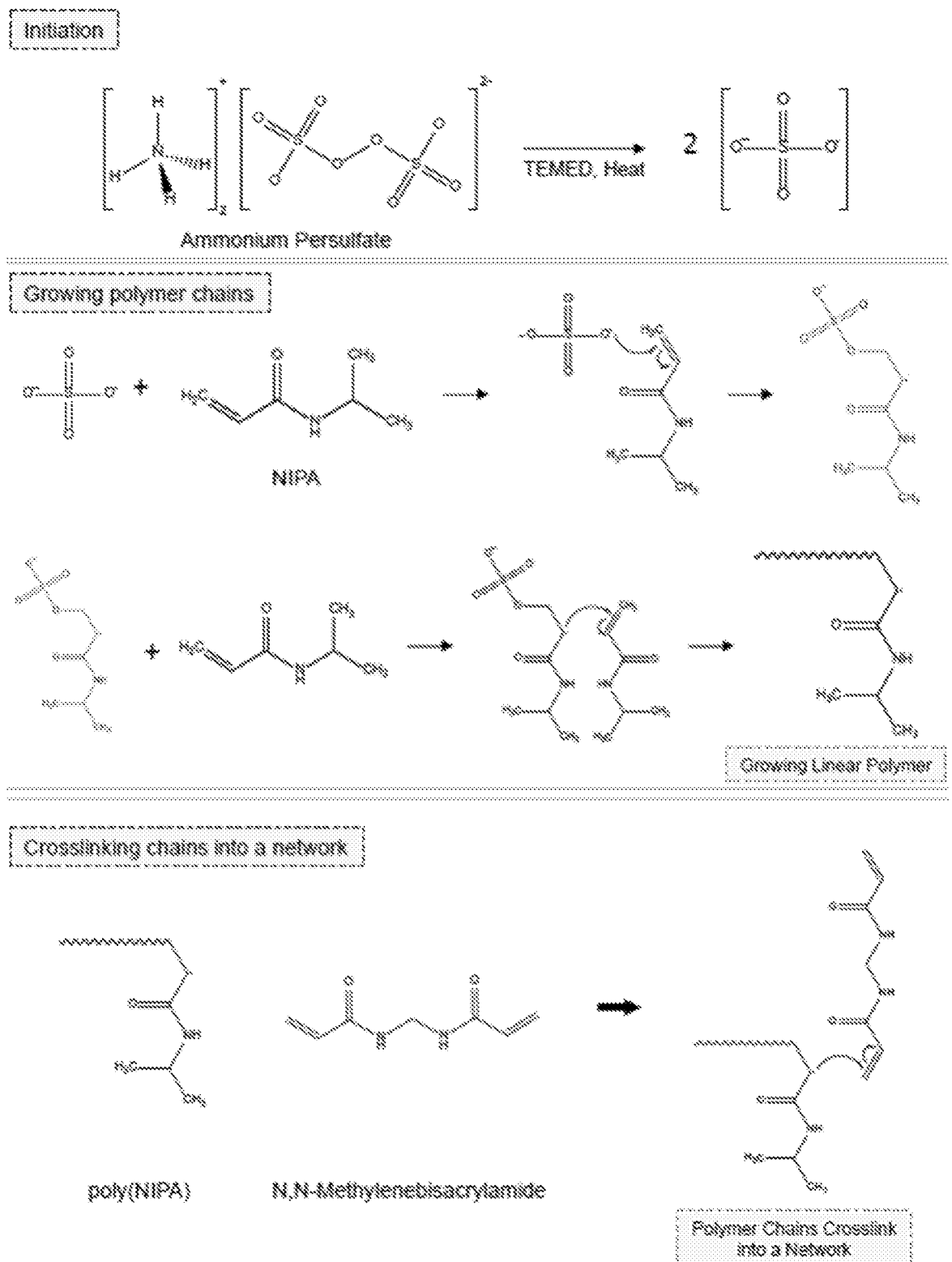
FIG. 2 illustrates reactions involved in the crosslinking of N-isopropylacrylamide (NIPA). In initiation, the free-radical initiator is cleaved to create radicals. Next, the radicals attack vinyl groups on the monomer (NIPA) and the cross-linker (BIS), resulting in a NIPA-BIS network.

In contrast, the present invention provides for multilayer structures including diverse layers with varying thicknesses and/or varying compositions, which are formed from the inside-out. In some implementations, one or more hydrogel layers are formed around a gel core. Hydrogels are water-swollen networks of crosslinked polymer chains, as described above. The most common method to synthesize hydrogels with covalent crosslinks is through free-radical polymerization. This process involves the interaction between water-soluble monomers and crosslinkers in the presence of free-radical initiators and an additional chemical accelerant (FIG. 2). The monomer, N-isopropylacrylamide (NIPA) is combined with the initiator, ammonium persulfate (APS) and the chemical accelerant N,N,N'N'-tetramethylethylenediamine (TEMED). First, the initiator molecule is cleaved by heat to generate free-radicals. Next, in the propagation step, the free-radicals interact with vinyl groups (e.g., carbon-carbon double bonds) on the monomers and crosslinkers, and thus begin the process of growing chains. A monomer like NIPA, with just one vinyl group, can only form linear chains. However, monomers with two or more vinyl groups act as crosslinkers, meaning that one growing chain may connect to more than one other growing chain, creating a polymer network. An exemplary crosslinker is N,N'-methylenebisacrylamide (BIS), which has two vinyl groups. Typically, the crosslinker is used at a relatively low concentration (e.g., about 1% of the monomer on a molar basis). The low crosslinker concentration allows the polymer chains to reach a considerable length before being crosslinked into a network.

The successive free-radical polymerization around an initial core leads to multiple layers that may comprise very different compositions and properties. In some implementations, the initiator for polymerization is present only in the core. Therefore, layer growth may be controlled by the diffusion of the initiator from the core (hence the term 'inside-out' for the disclosed techniques). Significantly, both the thickness and composition of each layer can be independently tuned and selectively controlled.

In some implementations, one (or some) of the polymeric layers are responsive to a stimulus (e.g., pH, temperature, solvent, light). Hydrogels that respond to external stimuli such as pH, temperature, ionic strength, solvent composition or concentration, pressure, electrical potential or magnetic field, visible light or radiation, and chemical and biological agents, are known in the art. For example, gels of acrylamide (AAm) shrink when the solvent composition is changed (e.g., in mixtures of water and acetone). Gels of N-isopropylacrylamide (NIPA) shrink upon heating above a critical temperature. Gels of sodium acrylate (SA) shrink when the pH of the solution is lowered below a critical value.

Figure 3:
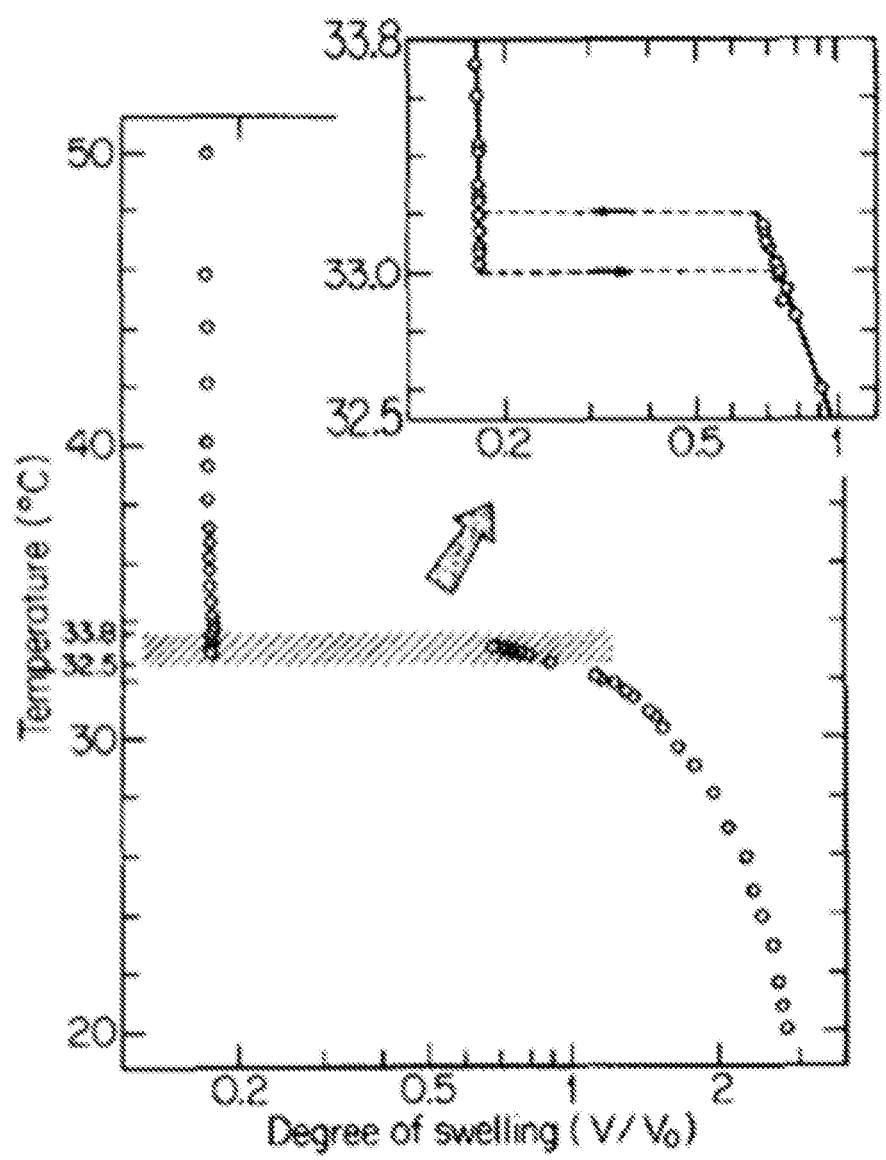
FIG. 3 illustrates graphically the volume change of a NIPA gel upon heating. When a NIPA gel is heated above its lower critical solution temperature (LCST) of 32° C., it shrinks abruptly.

NIPA is a derivative of acrylamide (AAm) with the addition of a hydrophobic isopropyl group. Below 32° C., the isopropyl groups in a NIPA gel are hydrated, and the gel becomes swollen. Above 32° C., which is the lower critical solution temperature (LCST) of NIPA, the isopropyl groups aggregate due to their hydrophobic nature. This causes water to be expelled from the hydrogel, which results in a sharp reduction in the gel volume, and the gel turns an opaque white color. The volume change with respect to temperature of a NIPA hydrogel in water is illustrated graphically in FIG. 3. The thermoresponsive gel NIPA has been extensively studied given its LCST is relatively close to human body temperature (~37° C.).

Hydrogels that respond to pH are engineered through the selection of ionizable monomers, i.e. monomers that have positive or negative charges on the polymer chains. For example, a gel synthesized from SA will be neutral in charge at a low pH (~3) because the carboxylic acid groups along the chains will be unionized, i.e., —COONa. However, when the pH is raised to about 7, these groups are ionized and become negatively charged. The charged polymer chains within the network repel each other, causing the network to expand and swell. Thus, SA gels exhibit a sharp increase in volume as a function of pH. Gels that respond to changes in solvent are based on polymer backbones that are soluble in one solvent, but not in others. For example, linear chains of poly(AAm) are soluble in water, but insoluble in acetone (a solvent that is miscible with water). Correspondingly, gels of AAm that are swollen in water will shrink when the water is replaced with a water-acetone mixture where the acetone content is >50%.

Figure 4:
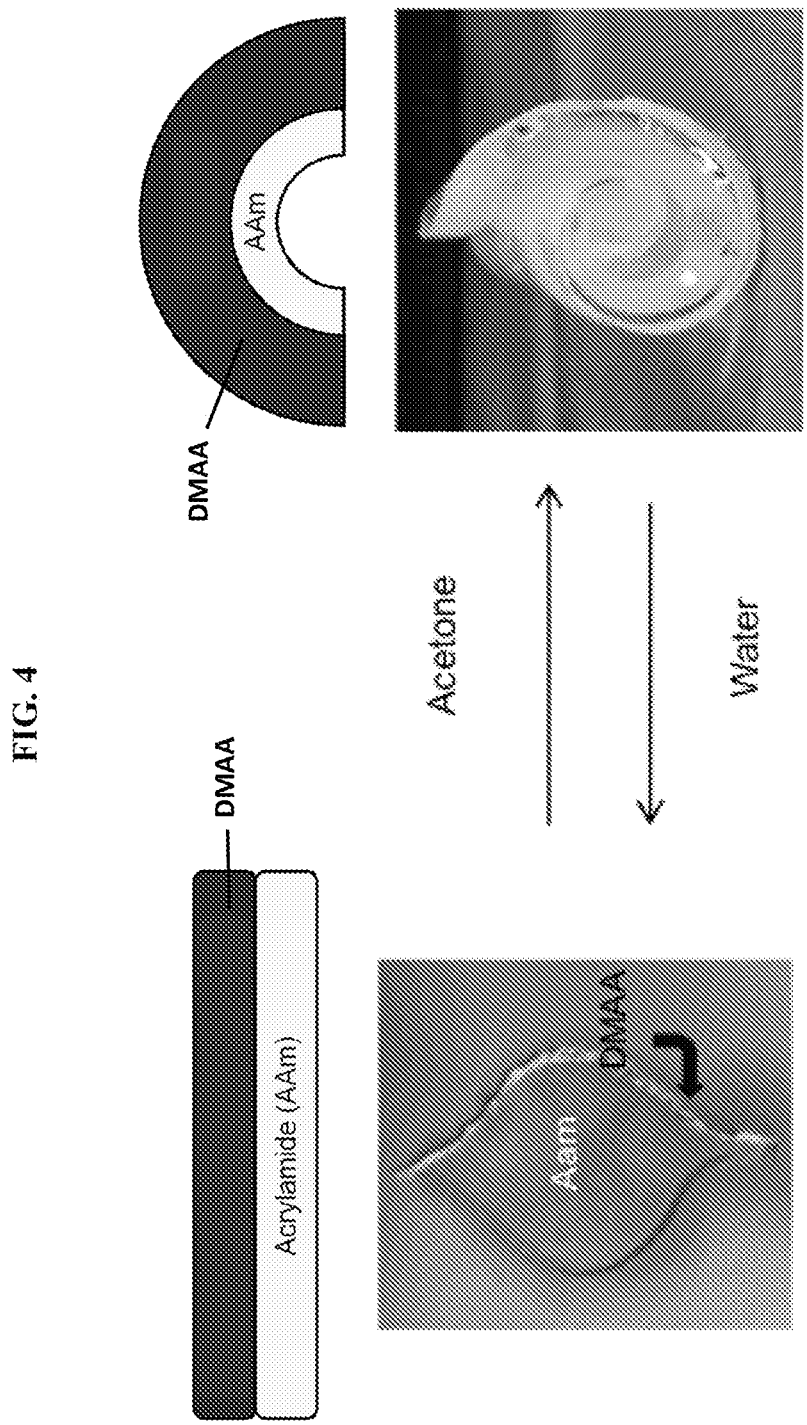
FIG. 4 illustrates folding of a bilayer hydrogel substrate. The bilayer substrate comprises one layer formed from acrylamide (AAm) and another layer formed from N,N-dimethylacrylamide (DMAA). Both layers swell in water. However, the AAm layer shrinks in the presence of acetone, while the DMAA remains swollen. The mismatch in response between the layers causes the substrate to curl as shown in the images and schematically.

The disclosed multilayer structures may be engineered to change their shape or configuration in response to a stimulus. For example, a structure may fold or bend in response to a stimulus. The different layer compositions of the multilayer structure respond differently to a given stimulus (e.g., swell to different extents), which drives the change in shape or orientation. For example, a bilayer gel may include a layer of N,N-dimethylacrylamide (DMAA) adjacent to a layer of AAm, wherein both of the layers swell to similar extents in water. However, when the layers are exposed to a solvent (e.g., >50% acetone), the AAm layer shrinks, while the DMAA layer remains swollen (FIG. 4). The shrinking of one layer induces an anisotropic strain within the bilayer structure. In order to alleviate this strain, the structure curls toward the shrinking layer. In order for such behavior to occur, the layers should be strongly and sufficiently attached together at the interface, since a weak attachment will cause the layers to delaminate. In addition, the layers should be deformable, i.e. having a relatively low elastic modulus, in order to allow for the change in configuration. Such folding behavior may also be triggered in response to other stimuli, e.g. temperature, pH, magnetic fields, etc., depending on the layer composition.

The multilayer structures may additionally or alternatively comprise a solute for release. Solute release from stimuli-responsive structures may follow a step-like (pulsatile) profile. As such, the disclosed structures are suitable for use in a wide range of delivery applications (Yoshida, R. et al. *Positive thermosensitive pulsatile drug-release using negative thermosensitive hydrogels*, J. Control Release 32, 97-102 (1994); Dinarvand, R. & D'Emanuele, A. *The use of thermoresponsive hydrogels for on-off release of molecules*, J. Control Release 36, 221-227 (1995); Bhalla, A. S. & Siegel, R. A. *Mechanistic studies of an autonomously pulsing hydrogel/enzyme system for rhythmic hormone delivery*, J. Control Release 196, 261-271 (2014)). Furthermore, the disclosed inside-out polymerization techniques disclosed herein may be used to create multifunctional materials that mimic the remarkable structures found in nature.

Figure 5:
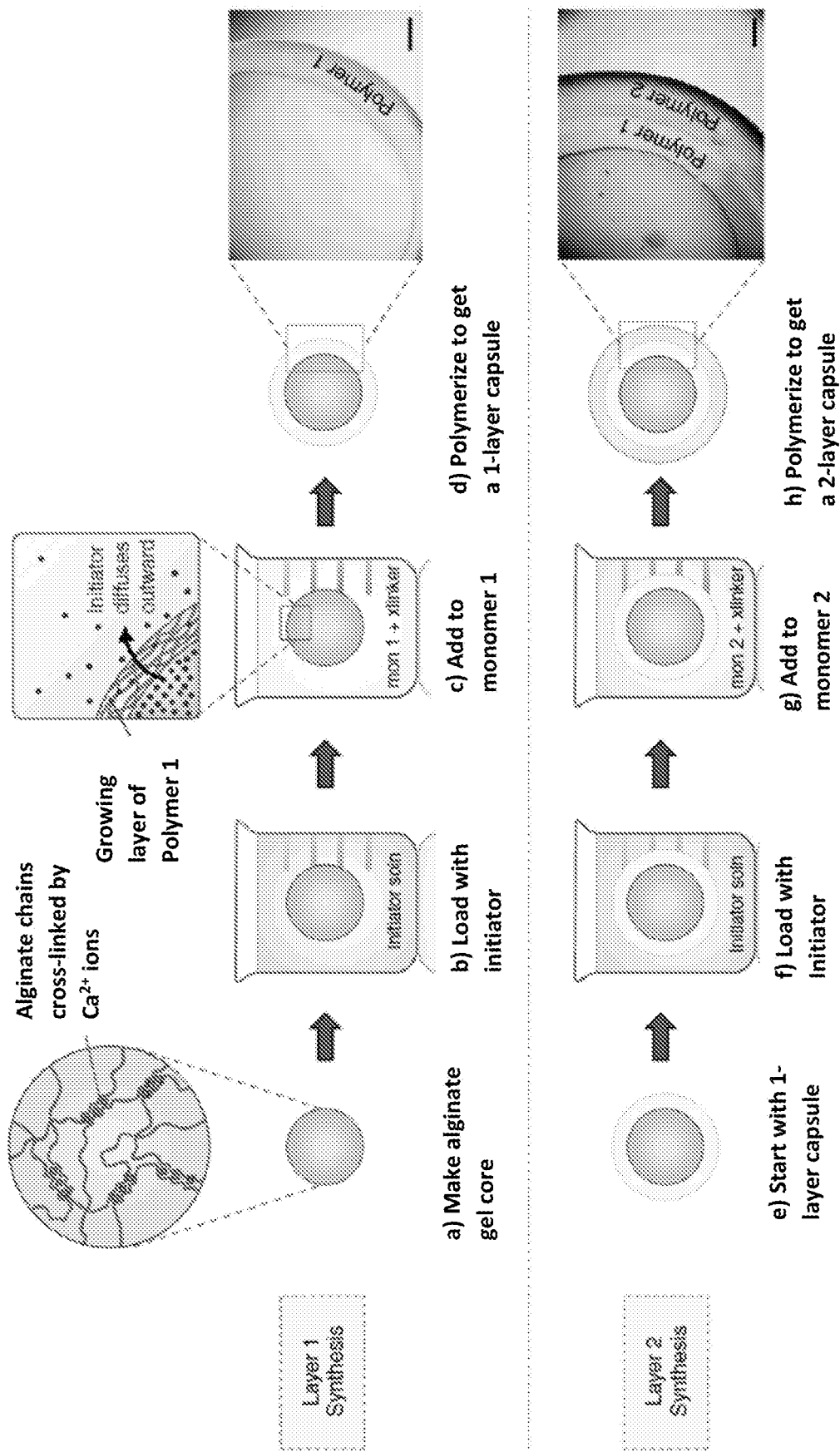
FIG. 5 illustrates schematically a method of synthesizing a multilayer sphere or capsule in accordance with the present invention. A gel core is first made (a), which is then loaded with free-radical initiator (b). The gel is then introduced into a solution of monomer 1 along with crosslinker and accelerant (c). Upon polymerization, a layer of polymer 1 is formed around the gel core (d). The inset of panel (c) shows formation of the layer as the initiator diffuses outwardly from the core and into the monomer solution. This process is then repeated using the formed one-layer capsule (e), which is re-loaded with initiator (f), and then contacted with monomer 2 (g). Upon polymerization, a second layer of polymer 2 is formed (h). The process can be repeated to form as many additional layers as desired. Scale bars in the inset images in panels (d) and (h) represent 500 µm.

In accordance with disclosed embodiments, a step-wise technique is provided for generating polymeric multilayer sphere or capsule (see FIG. 5). A gelled core is first created by the physical crosslinking of a polymer. Various polymer gels are suitable for this purpose, such as, e.g., biopolymer gels based on chitosan, gelatin, cellulose, agarose, or other hydrogels (Payne, G. F. et al. *Accessing biology's toolbox for the mesoscale biofabrication of soft matter*, Soft Matter 9, 6019-6032 (2013)). The gelled core is then loaded with a water-soluble initiator. The core may be placed in a solution containing an initiator, wherein the initiator is adsorbed into the core via diffusion. The initiator-loaded gel is then transferred to another solution containing a first monomer, a crosslinking agent, and preferably an accelerant. Free-radical polymerization is then conducted at ambient temperature (~25° C.). In particular, polymerization begins as the initiator diffuses out of the core into the surrounding solution and reacts with the first monomer. Thus, polymerization begins at the surface of the core. A layer or shell of a first crosslinked polymer is thereby formed around the core. In this way, the polymer layer grows in a radial direction outwardly from the core as time progresses due to the outward diffusion of the initiator from the core. The thickness of the polymer layer is selectively controllable by selecting the amount of initiator and/or the amount of time for polymerization. Once a polymer layer of desired thickness is formed, the resulting structure may be removed from the solution, washed and stored in buffer. The resulting structure thus includes a gelled core surrounded by a layer of a first polymer.

The polymerization process can be sequentially repeated with the same and/or different monomer solutions in order to generate as many additional and discrete layers as desired. For example, the single-layered capsule structure (see, e.g., FIG. 5e) may be reloaded with initiator and placed in a solution of a second monomer, which solution also preferably includes crosslinking agent and accelerant. A second polymerization step then yields a second concentric layer of a second crosslinked polymer. Thus, the resulting multilayer capsule has a gelled core, a first polymer layer surrounding the core, and a second polymer layer surrounding the first polymer layer. Additional concentric polymer layers may be formed by employing the same polymerization process, with each distinct layer formed around at least a portion of the underlying (and previously formed) layer.

In addition, other multilayer structures may be synthesized utilizing the disclosed inside-out polymerization techniques disclosed herein. For example, a similar step-wise technique is provided for synthesizing a multilayer tube (see FIG. 18). As known in the art, tubular structures with multiple layers of soft, gel-like materials are ubiquitous in natural biological structures.

In accordance with disclosed embodiments, a cylindrical biopolymer template is formed, e.g. using a tubular mold. Next, the cylindrical template is incubated in a solution containing a water soluble free-radical initiator for a sufficient amount of time so that the initiator diffuses into the template. This initiator-loaded template is then transferred into a solution containing a monomer, a crosslinker and an accelerant. Free-radical polymerization then occurs, e.g., at room temperature. As described above, the initiator diffuses out of the template and into the surrounding monomer solution, thereby inducing polymerization and the growth of a crosslinked polymer layer around the template. Once the polymer layer has the desired thickness, the resulting structure is removed and washed. Additional polymer layers may then be formed by repeating the process (e.g., by re-loading the single-layer tube with initiator, and exposing the initiator-loaded tube to a second monomer solution thereby inducing polymerization and growth of a second polymer layer around the first polymer layer, and so forth). Once the desired number of layers have been formed, the hemispherical caps at the ends of the cylindrical structure may be removed to reveal the inner gel core. This gel core may be removed (e.g., by exposure to heat), resulting in a hollow tube with multiple distinct layers (see, e.g., FIG. 27).

Figure 26:
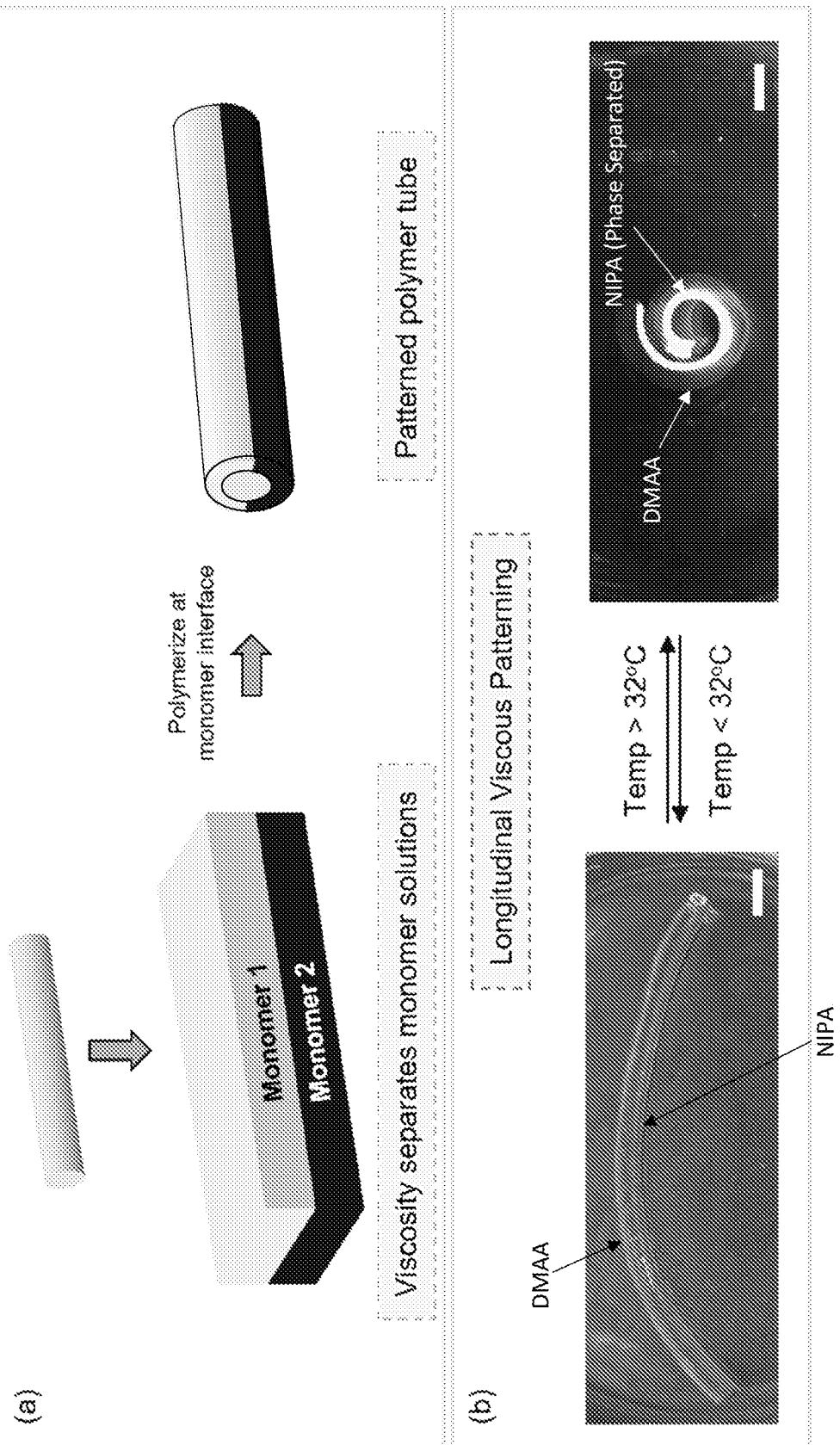
FIG. 26 illustrates the synthesis of longitudinally patterned ("Janus") tubes and images of an exemplary stimuli-responsive tube. An initiator-loaded cylindrical agar template is placed in a rectangular trough containing two viscous monomer solutions, poured one after the other (a). The solutions do not mix due to their viscosity. The Janus tube has a top half of DMAA and a bottom half of NIPA (b). When heated above 32° C., the NIPA half shrinks, which in turn causes the tube to curl and coil. Scale bars are 5 mm.

The multilayer tubes formed in accordance with the present invention are mechanically robust and flexible. Lumen diameter, and the thickness and composition of individual layers in the tube wall, are selectively controllable. In addition, stimuli-responsive polymers may be incorporated into the tube walls, so that the resulting tubular structure exhibits constriction and dilatation via exposure to the stimuli. In addition, differently patterned tubes may be synthesized which have a first half or portion differing from a second half or portion. Alternatively, or in addition, multilayer tubes having differing layer compositions may be synthesized which spontaneously curl or otherwise change configuration or orientation in response to a stimulus (see, e.g., FIG. 26). Multilayer tubes may also be constructed to exhibit a local change in lumen diameter in response to a stimulus (e.g., temperature change), similar to blood vessels which undergo vasoconstriction or vasodilation over a particular segment.

The disclosed techniques may also be utilized for synthesizing hair-covered substrates or surfaces. For example, a step-wise technique is provided for forming polymer hairs extending outwardly from a polymer base gel (see FIG. 30). As known in the art, many natural biological structures contain outwardly extending, thread or hair-like protrusions. Such hair-like structures substantially increase the surface area of overall structure (e.g., villi lining the wall of the small intestine substantially increase surface area and thereby improve nutrient uptake).

In accordance with disclosed embodiments, a base polymer gel having the desired size and configuration is formed. Next, a template having one or more channels or wells is formed. In some implementations, the template is formed using a mold having an array of spaced protrusions or cylindrical structures (e.g., an array of needles), around which a liquified polymer solution is injected or poured. The liquified polymer solution is then solidified (e.g., such as by cooling) into a gel. The mold is removed from the solidified gel, resulting in a gel template having an array of channels or wells (corresponding to the mold array (see FIG. 30*c*). The wells of the gel template are then filled with a solution containing a monomer, a crosslinker and preferably an accelerant.

Next, the base gel is incubated in a solution containing a polymerization initiator. The initiator-loaded base gel is then placed onto the gel template, so that the base gel and the monomer-filled wells are in intimate contact. The initiator in the base gel diffuses outwardly and into the monomer-filled channels in the gel template, thereby initiating polymerization of the monomers in the wells. Thus, diffusion occurs outwardly from the initiator-loaded base gel, thereby 'growing' hairs from the surface of the base gel and outwardly therefrom in the wells. The length and thickness of the hairs is selectively controllable by adjusting the amount of initiator in the base gel, the configuration of the wells, and/or the amount of time allowed for polymerization.

After polymerization is complete, the formed hairs are still embedded in the gel template (see, e.g., FIG. 30*i*). The gel template may then be removed (e.g., by application of heat), resulting in a hair-covered base gel (see FIG. 30*j*). The hairs remain attached to the base gel due to their outward growth therefrom. The hairs may include additional and distinct polymer layers by repeating the polymerization process. However, the dimensions of the gel templates used for subsequent layer formation should be larger than the previously formed hairs. In particular, the wells formed in a second or subsequent gel template should be sufficiently sized (in depth and diameter) to accommodate a second (or further) monomer solution as well as the hairs formed from the prior polymerization process.

The disclosed polymerization methods allow for the selective control of the number and surface density of hairs, the length and thickness of the hairs, and the composition of the hairs. The presence of the hairs substantially increases the overall surface area of the base substrate, and therefore may be utilized to increases the adsorption profile of a solute from a bulk solution. In addition, patterns of hairs having differing compositions or configurations may be created that co-exist on a substrate. For example, a substrate or surface may include a portion of stimuli-responsive hairs (e.g., responding to temperature, solvent or magnetic fields) and another portion of hairs that are non-responsive to such stimuli. Further, a hair-covered substrate initially having a generally planar configuration may be engineered to bend or fold in response to a stimulus (e.g., into a generally tubular or curved configuration). For example, a tubular structure may be created having a hair-covered exterior surface or a hair-covered interior surface, similar to the villi-covered interior wall of the small intestine.

The unique inside-out polymerization techniques of the present invention are thus capable of synthesizing a wide range of structures, e.g. capsules, tubes, and hair-covered surfaces, all with controlled morphology. The individual layer chemistry and size can be tailored precisely over a range of length-scales (e.g., micro to centimeter sizes). For example, multilayer structures may be formed having a diameter between about 10 µm and about 50 mm or more. In addition, microfluidic techniques may be utilized to achieve such micro- or nano-sized structures.

The composition, thickness and properties of the layers are selectively controllable. Desired characteristics of the multilayer structures may be readily tuned by altering the layer composition, layer number, layer order and/or layer thickness. Further, one or more of the polymer layers may be responsive to external stimuli (e.g., pH, temperature, solvent, light, magnetic fields, etc.). For example, structures may be engineered such that changes in stimuli cause the thickness of individual layers to change dramatically. Additionally, stimuli-responsive layers may be provided to control the permeability of small molecules. Thus, pulsatile and step-wise release of solutes is demonstrated, which is particularly suitable for use in applications for the release of drugs or other compounds. Moreover, the structures may be constructed with hydrogels, which are similar to biological tissue and an attractive material for tissue engineering applications (Nguyen, K. T. & West, J. L. *Photopolymerizable hydrogels for tissue engineering applications*, Biomaterials, 23, 4307-4314 (2002); Slaughter, B. et al. *Hydrogels in Regenerative Medicine*, Adv. Mater. 21, 3307-3329 (2009)). Further, the permeability of the layers may be selectively controlled based on the composition and/or thickness thereof), providing for the controlled release of an agent.

The disclosed multilayer structures exhibit substantially different mechanical properties as compared to their corresponding gel cores or bases lacking the polymer layers. As demonstrated herein, the addition of a thin, elastic polymer layer to a fragile gel core substantially improves its elastic properties. Thus, the surrounding layers may be utilized to protect encapsulated material and/fragile inner components.

Thus, the disclosed methods and structures are applicable to a wide range of applications, including tissue engineering. In accordance with disclosed embodiments, the synthesis of multilayer structures suitable for use as complex tissue engineering scaffolds is achieved. Through the incorporation of monomers known to promote the growth of cells, e.g. such as methacrylate-modified gelatins (Nichol, J. W. et al. *Cell-laden microengineered gelatin methacrylate hydrogels*, Biomaterials, 31, 5536-5544 (2010); Naahidi, S. et al. *Biocompatability of hydrogel-based scaffolds for tissue engineering applications*, Biotechnol. Adv. 35, 530-544 (2017), the multilayer structures may be utilized to form scaffolds for tissue growth. As known in the art, the conjugation or incorporation of growth factors into tissue scaffolds promotes the growth of certain types of cells ( Lee, K. et al. *Growth factor delivery-based tissue engineering: general approaches and a review of recent developments*, J. R. Soc. Interface, 8, 153-170 (2011); Wang, H. et al. *Hemocompatible polyurethane/gelatin-heparin nanofibrous scaffolds formed by a bilayer electrospinning technique as potential artificial blood vessels*, Front. Chem. Sci. Eng. 5, 392-400 (2011); Pauly, H. M. et al. *Hierarchically Structured Electrospun Scaffolds with Chemically Conjugated Growth Factor for Ligament Tissue Engineering*, Tissue Eng. Pt. A, 23, 823-836 (2017)). The disclosed structures may be modified via direct conjugation of growth factors suitable for different types of cells.

The disclosed techniques may also be utilized to fabricate hybrid organic-inorganic multilayer materials. As known in the art, a wide variety of inorganic chemistries are suitable for such hybrid materials (Hench, L. L. & West J. K. *The sol-gel process*, Chem. Rev., 90, 33-72 (1990); Hench, L. L. *Bioceramics: From Concept to Clinic*, J. Am. Ceram. Soc., 74, 1487-1510 (1991); Ribeiro, C. A. et al. *Electrochemical preparation and characterization of PNIPAM-Hap scaffolds for bone tissue engineering*, Mat. Sci. Eng. C, 81, 156-166 (2017)). For example, in silica sol-gel chemistry, a silica precursor reacts with water in a hydrolysis which is accelerated by an acid or base. Thus, the diffusion of an acid or base from a template or core may be employed via an inside-out polymerization process to create a shell of silica around a template. The synthesis of hydroxyapatite may be achieved by reacting orthophosphoric acid ($H_3PO_4$) with calcium hydroxide ($Ca(OH)_2$) (Ramesha, S. et al. *Properties of hydroxyapatite synthesize by wet chemical method*, J. Ceram. Process. Res. 14, 448-452 (2013)). Thus, the diffusion of the acid from a template or core for reaction via the inside-out process of the present invention may be employed to create a layer of hydroxyapatite around the template.

The disclosed techniques are simple to implement and do not require complex multiphase precursors, or strong interactions between adjacent layers. Moreover, a wide variety of polymers may be utilized to form the layers. For example, various hydrogels may be utilized, wherein polymerization of a monomer(s) is initiated via diffusion of a polymerization initiator. Alternatively, two or more monomers may be provided to form a synthetic polymer layer, wherein a first monomer reacts with a second monomer(s) to form a polymer shell. Thus, numerous natural and synthetic polymers may be formed via the reaction of monomer components, e.g., including numerous synthetic polymers (e.g., polyethylene, polyester, epoxy resins, and nylon). Thus, various chemistries may be utilized to form discrete polymer layers, each having a desired composition, thickness and/or other properties. Therefore, the present invention is not limited to the exemplary materials utilized in the experiments discussed below.

Example 1: Multilayer Capsules

Materials and Methods

Materials. The monomers N,N'-dimethylacrylamide (DMAA) and N-isopropylacrylamide (NIPA), and the accelerant, N,N,N',N'-tetramethylethylenediamine (TEMED) were obtained from TCI America (Portland, OR). All other chemicals were from Sigma-Aldrich (St. Louis, MO), including the crosslinker N,N'-methylenebis(acrylamide) (BIS) and the monomer sodium acrylate (SA). The following biopolymers were used: alginate (medium viscosity alginic acid), sodium salt from brown algae, chitosan (medium molecular weight), and xanthan gum (Xanthomonas campestris). Other chemicals included calcium chloride dihydrate ($CaCl_2$) salt, APS initiator, GA, glacial acetic acid, and BY dye. Deionized (DI) water was used in the experiments.

Synthesis of gel cores. To form the alginate gel cores, a 2 wt % alginate solution was first made in DI water. This was then added drop-wise using a transfer pipette or syringe into a solution of 0.5M $CaCl_2$ under mild stirring. After incubation for 30 min, $Ca^{2+}$-crosslinked alginate gels were obtained. To form the chitosan gel cores, a 2 wt % chitosan solution was made in 0.2-M acetic acid. This was then added drop-wise (as above) to a solution of 2 wt % GA. After incubation for 24 h, chitosan gels crosslinked by GA were obtained. To form gel cores with diameters <1 mm, a pulsed-gas micro-capillary device was used (Arya, C. et al. *"Killer" microcapsules that can selectively destroy target microparticles in their vicinity*, ACS Appl. Mater. Interfaces 8, 29688-29695 (2016); Ghaffarian, R. et al. *Chitosan-alginate microcapsules provide gastric protection and intestinal release of ICAM-1-targeting nanocarriers, enabling GI targeting in vivo*, Adv. Funct. Mater. 26, 3382-3393 (2016)). The biopolymer solution of interest was sent through a capillary of 80-μm inner diameter at a flow rate of 3 μl/min. Pulses of nitrogen gas (4 Hz frequency at 9 psi) were applied to the tip of the capillary, leading to the formation of microscale droplets, which were then crosslinked as described above.

Synthesis of multilayer capsules. Multilayer capsules were synthesized as described above (FIG. 5). First, the gel cores were placed in an aqueous solution of 15 mg/ml APS initiator for 10 or more minutes. The gel was then removed from the solution and blotted with a KIMWIPES® to remove excess solution. The APS-soaked gel was then transferred into the desired monomer solution. The monomer (e.g., DMAA or NIPA) was at a concentration of 1M. A crosslinking agent (typically BIS) was added at a concentration of 2.2 mol % with respect to the monomer. In addition, 15 mg/ml of the accelerant TEMED and 0.5-0.75 wt % of xanthan gum were added to the solution. The TEMED was utilized to accelerate the polymerization, thereby allowing it to be conducted at room temperature. The xanthan gum was utilized to increase the viscosity of the solution, which aiding in keeping the capsule suspended during polymerization. Thereafter, free-radical polymerization, initiated by persulfate ions from the APS, was carried out at room temperature. The time for polymerization was dictated by the time needed for the layer thickness to saturate, which was typically around 10-20 min (see FIG. 10). In many cases, polymerization was continued for a period of 24 h to allow ample time to reach a steady state. Once the first layer was formed, the polymer capsule was washed with water and stored in DI water. To form the next layer, the above procedure was repeated (FIG. 5). In the case of the pH-responsive multilayer capsules (FIG. 14), a mixture of DMAA (nonionic) and SA (anionic) in a molar ratio of 9:1 DMAA:SA was used for the pH-responsive layer, with the total monomer concentration being 1M as above.

Optical microscopy. Bright field images of capsules were captured with a Zeiss AXIOVERT® 135 TV microscope. Images were taken using either a ×2.5 or a ×10 objective. In some cases, the microscopy was performed with slight under-focus, which helped to clearly define the outlines of the layers and/or the overall capsule.

Scanning electron microscopy (SEM). A two-layer capsule with an inner layer of NIPA and an outer layer of DMAA was frozen rapidly in a −80° C. freezer, and subsequently lyophilized. Next, the capsule was fractured with a razor and affixed to a viewing platform. The capsule was then sputter coated with gold. A Hitachi SU-70 Schottky field emission SEM was used to obtain images of the sample.

Compression tests. An AR 2000 stress-controlled rheometer (TA Instruments, New Castle, DE) was used to conduct the compression tests at 25° C. From the rheometer software, the squeeze-test mode was chosen, and the tests were done using steel parallel plates with 40 mm or 20 mm diameter (White, J. C. et al. *Alginate/PEO-PPO-PEO composite hydrogels with thermally-active plasticity*, Biomacromolecules 14, 4456-4464 (2013); White, J. C. et al. *Addition of perfluorocarbons to alginate hydrogels significantly impacts molecular transport and fracture stress*, J. Biomed. Mater. Res. A 101, 438-446 (2012)). The spherical sample of interest (gel or capsule) was placed at the center of the plates. Compression was done at a rate of 10% strain per minute, which was determined based on initial sample diameter. The plates were coated with a thin layer of mineral oil to avoid excessive adhesion to the samples during compression. The normal-stress transducer was used to collect the normal force during compression, and this was converted to stress based on the initial surface area of the capsule.

Controlled release experiments. For the dye release studies (FIGS. 13 and 14), capsules were loaded with BY dye by soaking in a 500 μM dye solution for 24 h. Capsules were then added to 100-ml Erlenmeyer flasks filled with DI water, and the flasks were placed in a temperature-controlled water bath (Julabo, Allentown, PA). To monitor the dye concentration, a 1.5 ml sample was taken every 10 min from the supernatant surrounding the capsule, and this was analyzed using a Cary 50 UV-Vis spectrophotometer. After analysis, the sample was returned to the flask containing the capsule.

Synthesis and Properties

Synthesis of multilayer capsules. A step-wise technique was utilized to generate polymeric multilayer capsules (FIG. 5). First, a gelled core is created by the physical crosslinking of a polymer. Various polymer gels are suitable for this purpose, including but not limited to biopolymer gels such as those based on chitosan, gelatin, cellulose, and agarose (Payne, G. F. et al. *Accessing biology's toolbox for the mesoscale biofabrication of soft matter*, Soft Matter 9, 6019-6032 (2013)).

Exemplary cores were made from the biopolymer alginate (Lee, K. Y. & Mooney, D. J. *Alginate: properties and biomedical applications*, Prog. Polym. Sci. 37, 106-126 (2012); Fundueanu, G. et al. *Physico-chemical characterization of Ca-alginate microparticles produced with different methods*, Biomaterials 20, 1427-1435 (1999)). To create the gelled cores, a solution of 2 wt % sodium alginate was added drop-wise to a solution of 0.5M calcium chloride (CaCl2) using a syringe (FIG. 5a). The alginate droplets became crosslinked by the Ca2+ ions into gelled beads, with the bead diameter typically being between about 0.5 mm and about 5 mm. The inset in FIG. 5a shows the structure of an exemplary alginate gel. The Ca2+ ions form junctions between alginate chains (Fundueanu, G. et al. *Physico-chemical characterization of Ca-alginate microparticles produced with different methods*, Biomaterials 20, 1427-1435 (1999)).

The alginate bead was then loaded with ammonium persulfate (APS), which is a water-soluble initiator for free-radical polymerization. For this, the bead was preferably incubated in a solution of 15 mg/ml initiator for at least 10 min (FIG. 5b). The incubation time was set at 10 min based on a calculation from Fick's 2nd law for diffusion, which revealed that this time was ample for the center of a 4-mm bead to equilibrate to roughly the bulk concentration (Bird, R. B., Stewart, W. E. & Lightfoot, E. N. TRANSPORT PHENOMENA (Wiley, $2^{nd}$ ed., 2002)).

Next, the initiator-loaded gel was transferred to a solution containing a first monomer (monomer 1 in FIG. 5c). In particular, N-isopropyl acrylamide (NIPA) was utilized at a 1M concentration, along with a crosslinking agent of N,N'-methylenebis(acrylamide) (BIS) at 2.2 mol % with respect to the monomer, and an accelerant. Free-radical polymerization was then conducted at room temperature (~25° C.) (FIG. 5d).

Polymerization begins as the persulfate ions diffuse from the core into the surrounding solution and react with the first monomer. A layer or shell of a first crosslinked polymer thus formed around the core. As shown in the inset to FIG. 5c, the polymer layer grows in a radial direction outward from the core due to the outward diffusion of the initiator from the core. That is, the initiator concentration is highest at the surface of the core and decreases in a radial direction towards the bulk solution. Thus, an inside-out growth of a polymer shell is achieved. Once the layer of sufficient thickness was formed (after about 10 min), the structure was removed, washed with water, and stored in water or buffer. At this point, a gelled core surrounded by a layer of a first polymer (NIPA) was achieved as shown in the inset image in FIG. 5d.

The above process was repeated to form a layer of a second polymer, as shown in FIGS. 5e-h. For this, the above 1-layered structure (FIG. 5e) was reloaded with APS initiator (FIG. 5f) and placed in a solution of a second monomer, N,N'-dimethylacrylamide (DMAA), along with the same BIS crosslinker and accelerant (FIG. 5g). A second polymerization step then yielded a second concentric layer of a second crosslinked polymer (FIG. 5h). The second layer grows from the surface of the first layer, again consistent with inside-out growth strategy. A spherical capsule was thus achieved with an alginate core (Alg), then a first polymer layer (NIPA) surrounding the core, and finally an outer second polymer layer (DMAA) surrounding the first polymer layer, as shown in the inset image in FIG. 5h). The exemplary capsule was designated as Alg-NIPA-DMAA, which signifies the order of layers outward from the core.

The same process may be further repeated to give additional concentric layers of different polymers. In addition, the alginate core in the capsule may be ungelled to form a liquid core, for example by immersing the capsule in a solution of a calcium chelator like sodium citrate or ethylene diamine tetracetic acid (EDTA) (Lee, K. Y. & Mooney, D. J. *Alginate: properties and biomedical applications*, Prog. Polym. Sci. 37,106-126 (2012)). Alternatively, the gelled core may be left intact. For other gelled-cores, e.g. made from gelatin or agarose, a biopolymer gel may be utilized that is thermoresponsive. Thus, the gelled core is readily liquefied via the application of moderate heat (Payne, G. F. et al. *Accessing biology's toolbox for the mesoscale biofabrication of soft matter*, Soft Matter 9, 6019-6032 (2013)).

Figure 6:
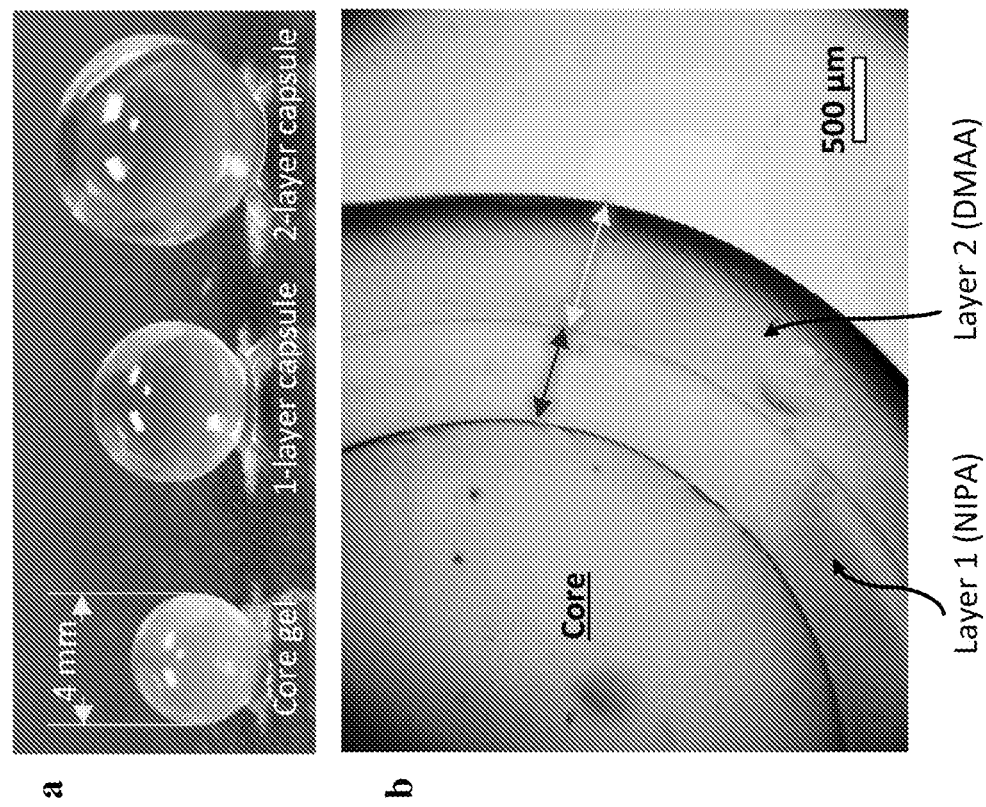
FIG. 6 shows multilayer capsules at different length scales, including images of an alginate gel core and the corresponding one-layer and two-layer capsules (a). An optical micrograph image of a capsule with an alginate (Alg) core, an inner layer of N-isopropylacrylamide (NIPA), and an outer layer of N,N'-dimethylacrylamide (DMAA) is also shown (b). The overall structure shown in panel (b) is denoted as Alg-NIPA-DMAA. The scale bar represents 500 µm.

The alginate core is shown in the left most image in FIG. 6a, and has a diameter of 4 mm. The single-layered capsule is shown in the middle image in FIG. 6a, and the double or two-layered capsule generated by sequential polymerization is shown in the right most image in FIG. 6a. The first layer surrounding the core is a network of NIPA having a thickness or caliper of ~550 μm. The second polymer layer surrounding the first polymer is a network of DMAA having a thickness of ~750 μm. The optical microscope image (FIG. 6b) clearly shows the presence of the two distinct polymer layers, which are not interpenetrated.

Figure 7:
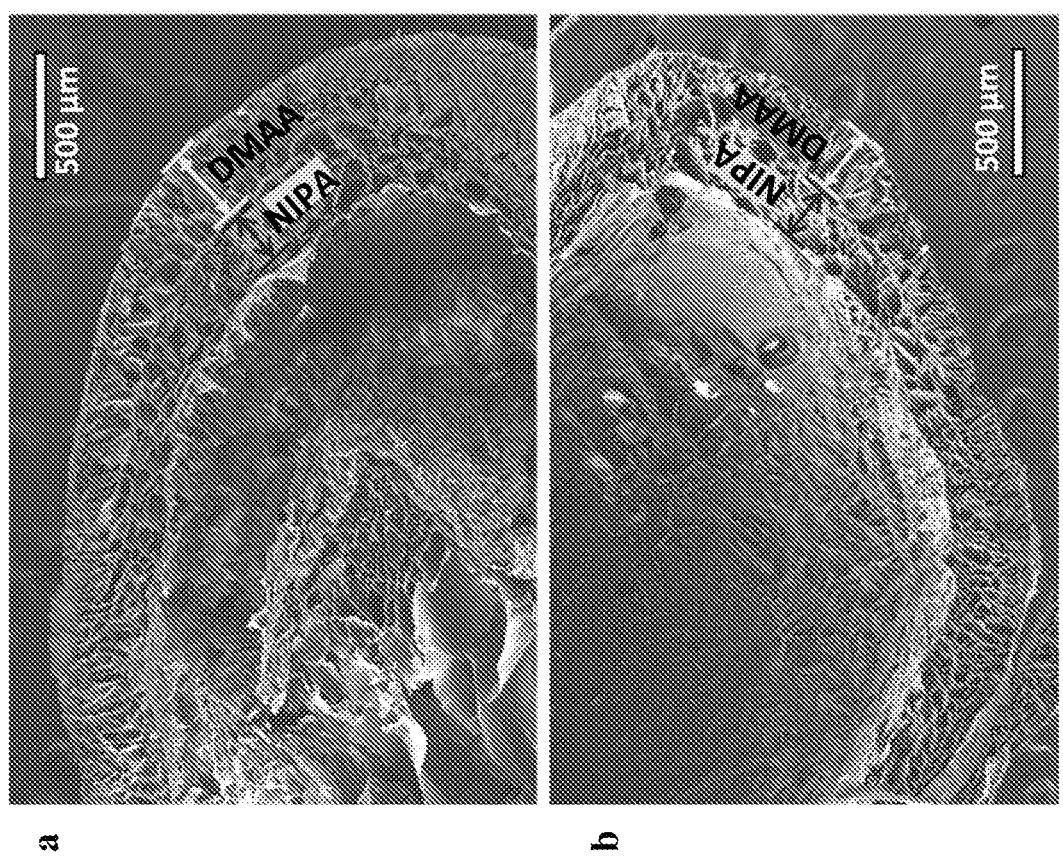
FIG. 7 shows scanning electron micrograph (SEM) images of two Alg-NIPA-DMAA (two-layer) capsules after freeze-drying. The boundaries between the layers is distinctly seen in both cases. Scale bars represent 500 µm.

Scanning electron microscopy (SEM) images of the Alg-NIPA-DMAA capsules after freeze-drying (FIG. 7a-b) further confirm the discrete nature of the two layers. As shown in the images, each layer is relatively porous, which is consistent with their polymer network compositions. The pores are oriented along slightly different directions in the two layers, allowing the layers to be readily distinguished. Note that the SEM images shown in FIG. 7 are of two capsules with identical layer composition but synthesized separately. The similar microstructure in the two separately formed capsules shows that desired characteristics and properties of multilayer capsules are reproducibly synthesized. The presence of the multiple concentric layers in the capsules synthesized in accordance with the disclosed methodologies is reminiscent of natural multilayer materials, such as an onion.

Figure 8:
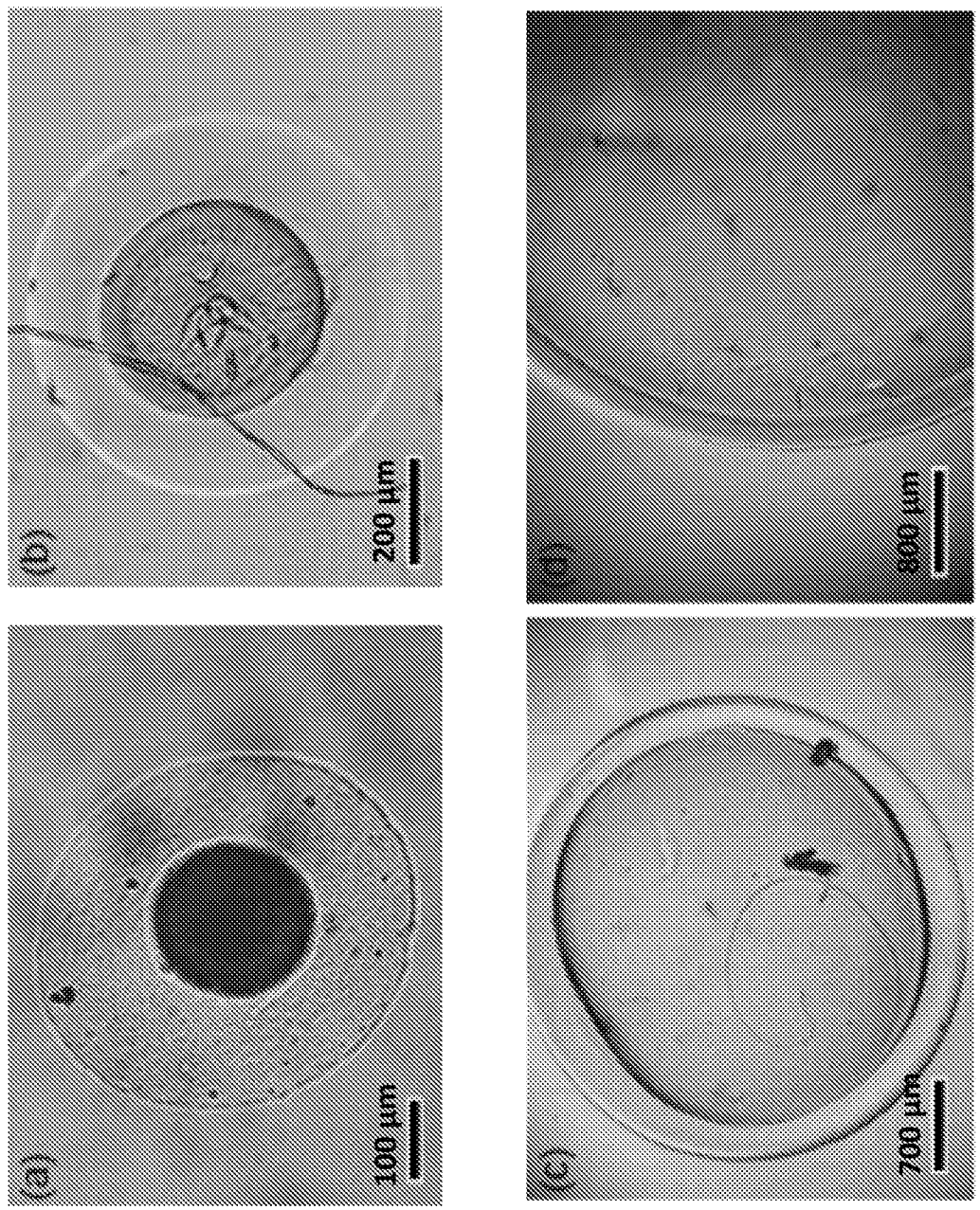
FIG. 8 are optical micrograph images of capsules with a crosslinked polymeric shell surrounding a biopolymer gel core. As shown in panel (a), the core (chitosan/GA) has a diameter of 185 µm, and the shell (SA) has a similar thickness (scale bar is 100 µm). As shown in panel (b), the core (chitosan/GA) has a diameter of 400 µm and the shell (DMAA) has a thickness of ~150 µm (scale bar is 200 µm). As shown in panel (c), the core (alginate) has a diameter of 2.8 mm and the shell (DMAA) has a thickness of ~250 μm (scale bar is 700 μm). As shown in panel (d), the core (alginate) has a diameter of 6.0 mm and the shell (DMAA) has a thickness of ~230 μm (scale bar is 800 μm).

The disclosed methods are capable of synthesizing multilayer capsules over a range of sizes. The diameter of biopolymer cores of exemplary constructs were varied over approximately two orders of magnitude, from about 10 mm to about 200 μm. Optical images of single-layer capsules over this size range and synthesized in accordance with disclosed methods are shown in FIG. 8(a-d). To create biopolymer gel cores with diameters <1 mm, a microfluidic technique was utilized in which pulses of compressed gas were used to shear off biopolymer-bearing aqueous droplets from the tip of a capillary (Arya, C. et al. *"Killer" microcapsules that can selectively destroy target microparticles in their vicinity*, ACS Appl. Mater. Interfaces 8, 29688-29695 (2016); Ghaffarian, R. et al. *Chitosan-alginate microcapsules provide gastric protection and intestinal release of ICAM-1-targeting nanocarriers, enabling GI targeting in vivo*, Adv. Funct. Mater. 26, 3382-3393 (2016)). Once cores of a selected size were created, multilayer capsules were then synthesized as described above (FIG. 5). Exemplary cores were loaded with APS initiator, then placed in a solution of monomer, crosslinking agent and accelerant. A polymer shell was thereby formed around the core in all cases (FIG. 8(a-d)).

Figure 9:
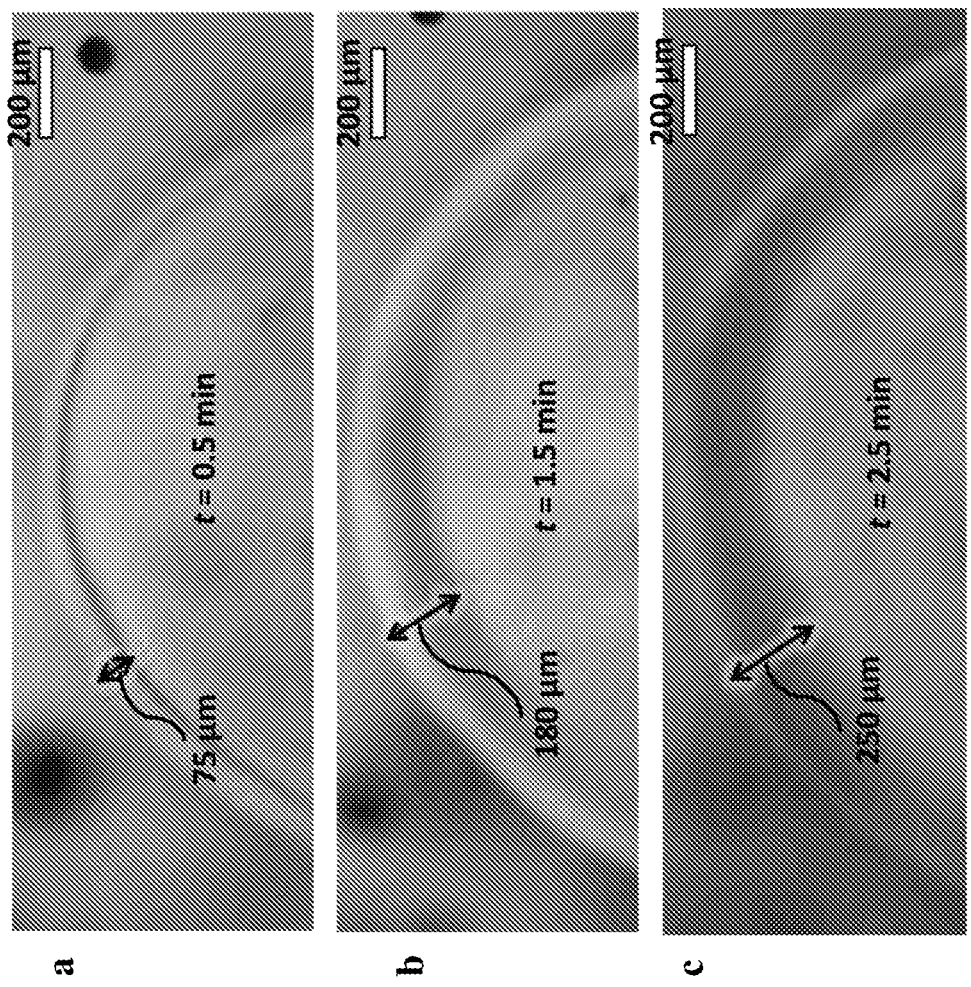
FIG. 9 illustrates the kinetics of layer growth in an exemplary capsule, visualized directly by optical microscopy. At time t=0, an alginate gel core of 2 mm diameter, loaded with 15 mg/ml ammonium persulfate (APS) initiator, is placed in a solution of 1M DMAA monomer (together with crosslinker and accelerant). Still images at various time points are shown (a-c), which reveal the growth of the polymer layer around the core. Scale bars in all images represent 200 μm.

Kinetics of layer growth. Each polymer layer in the capsule grows from the inside out, which growth was visualized in real time. For this, an alginate core of 2 mm diameter was prepared and loaded with 15 mg/ml of APS initiator. At time zero (t=0), the core was placed in a solution of 1M DMAA with crosslinking agent and accelerant. The core was then observed by optical microscopy (FIG. 9a-c). A layer of polymer was readily visible around the core within about 30 s (FIG. 9a). As time progresses, this layer grew outwardly from the core (FIG. 9b-c). The layer thickness (h) at each time point was extracted from the images.

Figure 10:
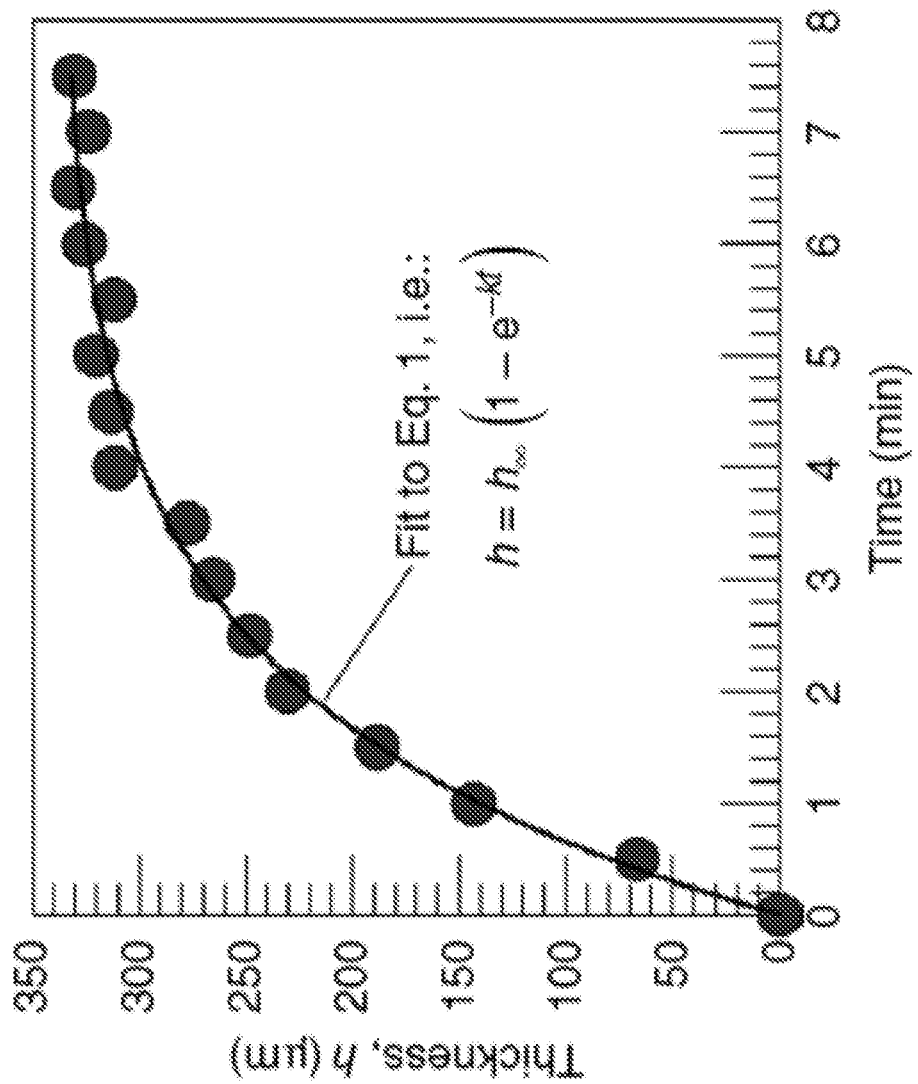
FIG. 10 shows graphically layer thickness h versus time t of layers shown in FIG. 9, with the solid curve through the data fit to Equation 1 (discussed below).

The layer thickness (h) vs. time (t) was plotted, as shown in FIG. 10. Note that within about 8 min, the growth of the layer was complete (as desired), wherein the layer was saturated at a thickness of about 338 μm. Even after a period of 24 hours, the layer thickness remained at this steady-state value ($h_\infty$). The h(t) data may be fit to the following functional form:

$$h = h_\infty (1 - e^{-kt}) \quad \text{(Equation 1)}$$

The only adjustable parameter in equation 1 is the effective rate constant k. Equation 1 gives a very good fit to the data in FIG. 10 with k=0.54. Note that k accounts for the combination of two steps occurring in series: mass transfer (i.e., diffusion) of initiator from the core into the external solution, followed by the kinetics of the polymerization reaction (Bird, R. B., Stewart, W. E. & Lightfoot, E. N. TRANSPORT PHENOMENA (Wiley, $2^{nd}$ ed., 2002)).

The layer thickness h around a given core is fixed by arresting the polymerization at a particular time, e.g., by replacing the monomer-laden solution with water or buffer once the target thickness is achieved. Alternatively, the layer thickness at steady-state $h_\infty$ is varied systematically by modulating the reaction kinetics. Parameters that affect the kinetics include: the concentration of initiator in the core; the concentrations of monomer and crosslinking agent in the external solution; the reaction temperature; and the viscosity of the external solution (see, e.g., Odian, G. PRINCIPLES OF POLYMERIZATION, (Wiley, $4^{th}$ ed., 2004)). For example, the concentration of APS initiator was varied. Using the setup as described above, the APS initiator in the core was reduced from 15 mg/ml to 7.5 and 3.75 mg/ml in test samples. All other conditions were the same and polymerization was conducted for 24 h in each case to allow the layer-thickness to reach steady-state. By reducing the initiator, the layer thickness was decreased: while $h_\infty$ was about 338 µm for 15 mg/ml of APS (FIG. 10), reduction of the APS by a factor of 4 to 3.75 mg/ml resulted in a reduction in $h_\infty$ to about 90 µm.

Mechanical properties. The multilayer capsules of the present invention have very different mechanical properties compared to their gel cores. In this regard, it was shown that their properties depended on the composition of each layer and on the number of layers. The addition of even a thin shell to a core radically altered its mechanical response. This was demonstrated by using compression testing, as shown FIG. 11a-f. Here, an Alg core was contrasted to an Alg-DMAA capsule with compositions identical to those described above. The Alg core had a gel of diameter 4.6 mm. The Alg-DMAA capsule was created with an identical Alg core surrounded by a DMAA shell having a thickness of 200 µm (i.e., 0.2 mm). As such, the thickness of the DMAA shell was less than $\frac{1}{20}^{th}$ the diameter of the Alg core and thus very thin in comparison.

Figure 11:
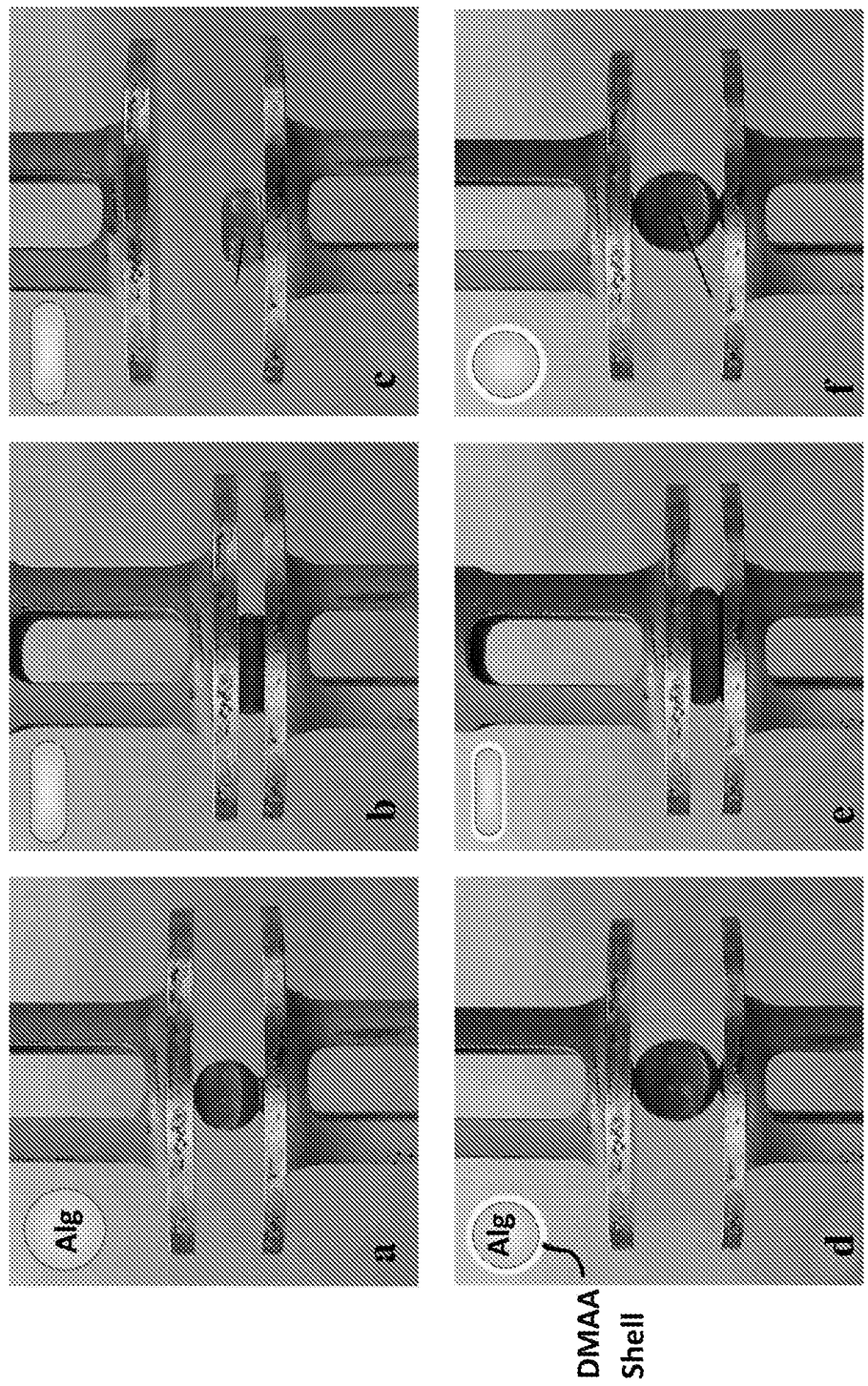
FIG. 11 illustrate contrasting mechanical properties of a gel core versus a single-layer sphere. Panels (a-c) show an Alg gel core and panels (d-f) show an Alg-DMAA sphere, both being compressed between parallel plates. Both have the same core diameter of 4.6 mm, with the DMAA shell being ~200 μm thick. As shown in panels (a-c), when the Alg gel core is compressed by 50%, it remains squished and does not recover when the compression is removed (plastic response, as shown in panel c), which is also depicted in the inset schematic images. As shown in panels (d-f), when the Alg-DMAA capsule is compressed by 60%, it recovers as soon as the compression is removed (elastic response, as shown in panel f), which is also depicted in the inset schematic images. Thus, the addition of the thin DMAA shell dramatically alters the mechanical properties, with the elastic behavior of the Alg-DMAA capsule preserved over multiple cycles of compression.

The compressive response of the Alg gel core is shown in FIG. 11a-c. When compressed, the initial sphere was squished into an ellipsoidal (disc or pancake) shape. With compressive strain of 50% or more, the Alg gel core remained squished in a disc shape after releasing the compression (FIG. 11c). Thus, the Alg gel core suffered a plastic (irreversible) deformation when compressed. Such a response is expected with biopolymer gels such as alginate, given such gels have limited mechanical resilience (Fundueanu, G. et al. *Physico-chemical characterization of Ca-alginate microparticles produced with different methods*, Biomaterials 20, 1427-1435 (1999); Chan, E.-S. et al. *Effect of formulation of alginate beads on their mechanical behavior and stiffness*, Particuology 9, 228-234 (2011)).

The compressive response of the Alg-DMAA capsule is shown in FIG. 11d-f. In this case, even when the initial sphere was compressed by 60%, it recovered to its initial size after release of the compression (FIG. 11f). Thus, deformation was reversible, and the response was elastic even after subjecting the single-layer sphere to three successive compression-recovery cycles. After each compression cycle, the sphere recovered to its original size and shape. The above behavior was also confirmed by squeezing the spheres between one's fingers. As consistently determined with all testing, the Alg gel cores (i.e., without the surrounding polymer layer) were irreversibly deformed and plastic, while the Alg-DMAA spheres were elastic. Thus, the addition of a thin layer or shell to the gel core substantially increased resiliency and elasticity.

Figure 12:
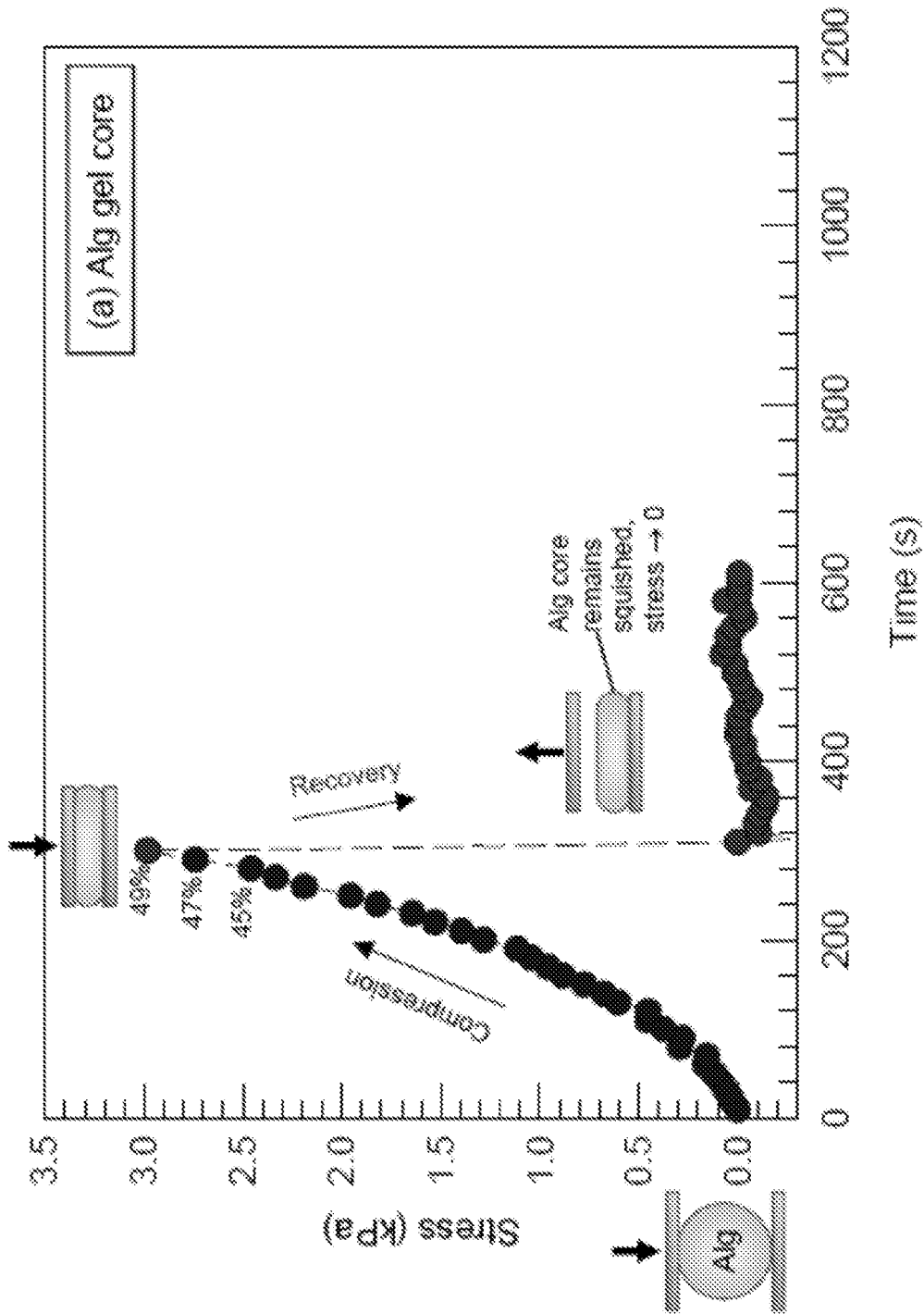
FIG. 12 and FIG. 13 illustrate graphically the compression test data for Alg gel cores and Alg-DMAA spheres, respectively. Samples were placed between parallel plates at time zero. During the compression cycle the top plate was brought down, while during the recovery cycle the top plate was lifted (both at 10% strain per minute). The measured compressive stress was plotted against time, with the compressive strain indicated for selected points.
Figure 13:
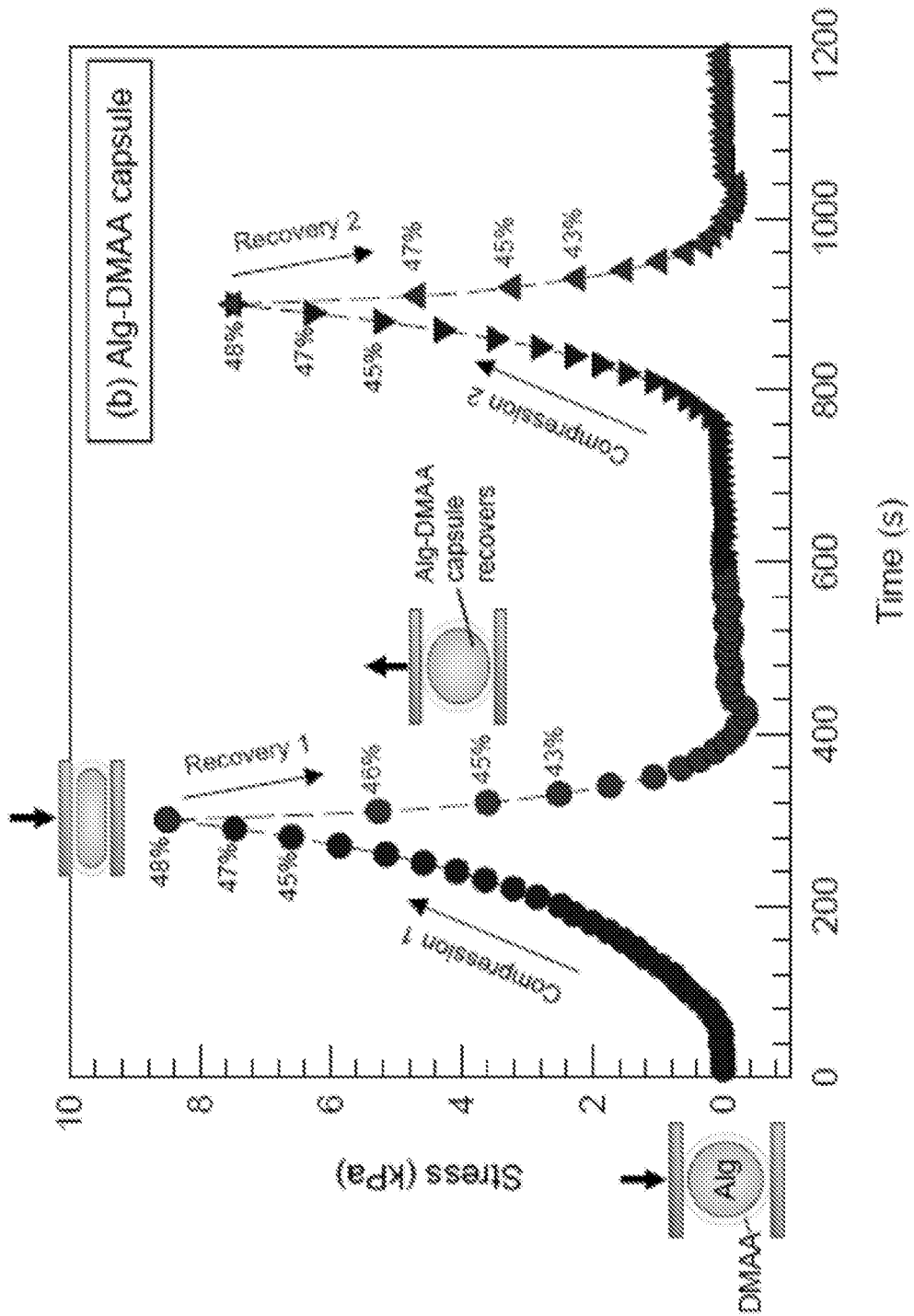

The compressive differences between the Alg core and the Alg-DMAA spheres were further quantified by placing the Alg cores and Alg-DMAA spheres described above between the plates of a rheometer and compressed at 10% strain/min (see White, J. C. et al. *Alginate/PEO-PPO-PEO composite hydrogels with thermally-active plasticity*, Biomacromolecules 14, 4456-4464 (2013); White, J. C. et al. *Addition of perfluorocarbon to alginate hydrogels significantly impacts molecular transport and fracture stress*, J. Biomed. Mater. Res. A 101, 438-446 (2012)). The compressive stress was measured and plotted for the Alg core (FIG. 12) and for the Alg-DMAA sphere (FIG. 13). The data confirmed the visual observations. That is, during the first loading cycle, the Alg core became irreversibly compressed. When the stress was released, the top plate detached from the sample, and the stress therefore plummeted to zero (FIG. 12). In contrast, the Alg-DMAA sphere displayed an elastic response (akin to crosslinked rubber), despite being subjected to multiple compression-recovery cycles (FIG. 13). Note that the non-linearity of the response makes it difficult to extract an elastic modulus from the initial portion of the data.

In addition, the failure mode of the Alg-DMAA sphere was also distinct from that of the Alg core. When compressed beyond a critical strain, the Alg core ruptured into many pieces (Gong, J. P. et al. *Double-network hydrogels with extremely high mechanical strength*, Adv. Mater. 15, 1155-1158 (2003)), whereas the Alg-DMAA sphere suffered a break in its shell with the core then ejecting out as a distinct entity. Further, the elastic nature of the Alg-DMAA sphere was also reflected in its ability to bounce off a hard surface. That is, the Alg-DMAA sphere bounced to a much greater height compared to the Alg core. Thus, its coefficient of restitution is much higher.

Stimuli-responsive layers. Another feature of the disclosed synthesis scheme is that it allows integration of different polymeric layers into the same capsule. Thus, unique combinations may be provided wherein one (or more) of the layers are responsive to external stimuli while other layers are not. Constructs were synthesized and tested to illustrate such capabilities:

pH as a stimulus. As well known in the art, ionic polymer gels exhibit a different response to pH compared to nonionic polymer gels (Osada, Y. et al. *Polymer gels*, J. Macromol. Sci. Polym. Rev. C44, 87-112 (2004); Qiu, Y. & Park, K. *Environment-sensitive hydrogels for drug delivery*, Adv. Drug Deliv. Rev. 64, 49-60 (2012); Ahn, S. K. et al. *Stimuli-responsive polymer gels*, Soft Matter 4, 1151-1157 (2008)). For example, an anionic gel based on a monomer such as sodium acrylate (SA) will be swollen at high pH when all its carboxylate groups are ionized and shrunken at low pH when the same groups lose their charge (Beltran, S. et al. *Swelling equilibria for weakly ionizable, temperature-sensitive hydrogels*, Macromolecules 24, 549-551 (1991); Cipriano, B. H. et al. *Superabsorbent hydrogels that are robust and highly stretchable*, Macromolecules 47, 4445-4452 (2014); Gargava, A. et al. *Smart hydrogel-based valves inspired by the stomata in plants*, ACS Appl. Mater. Interfaces 8, 18430-18438 (2016)). Nonionic gels, on the other hand, will exhibit the same volume at low and high pH.

Figure 14:
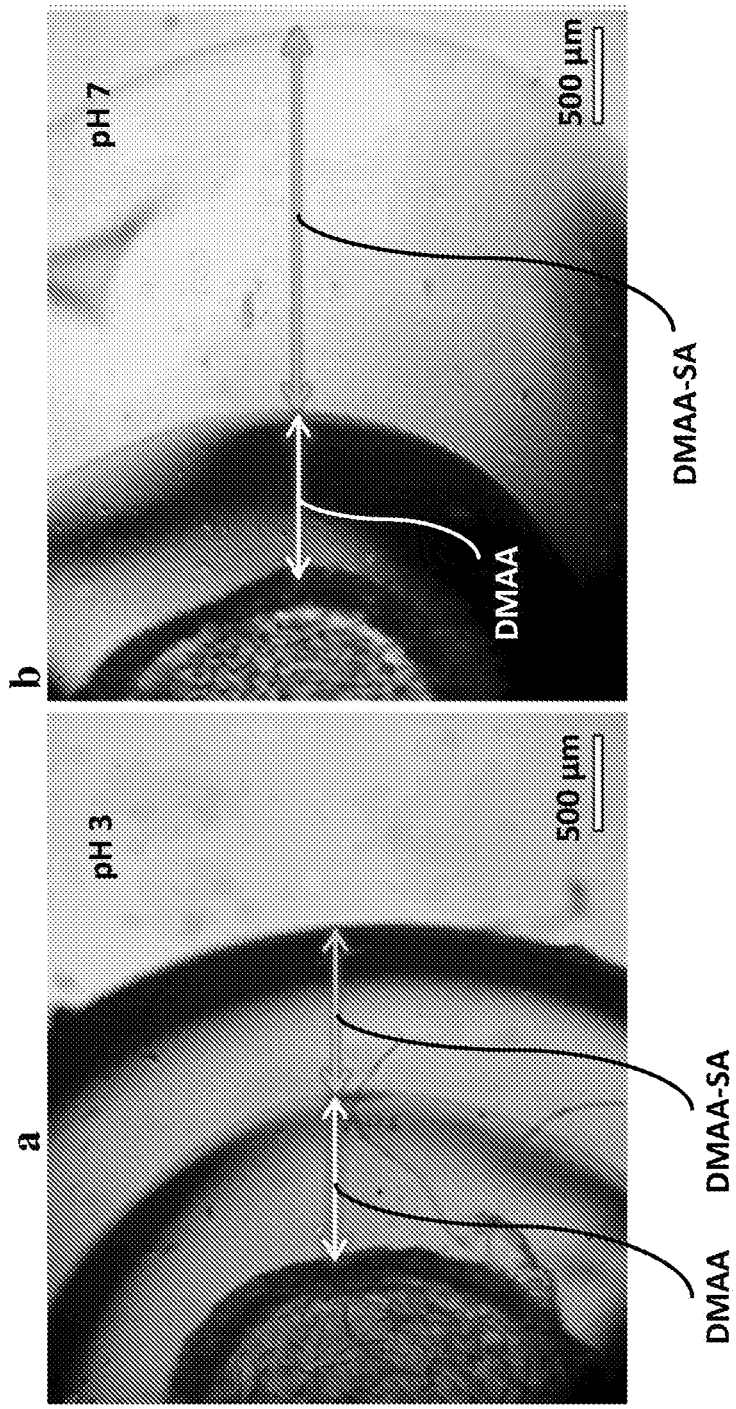
FIG. 14 illustrates a multilayer capsule with specific layers responsive to pH as external stimuli. A two-layer capsule is shown with an inner layer of nonionic polymer (DMAA) and an outer layer of anionic polymer, obtained by copolymerization of DMAA with sodium acrylate (SA) (designated as DMAA-SA). As shown panel (a), at pH of 3 the two layers have substantially the same thickness. As shown panel (b), at pH of 7 the carboxylate groups in the DMAA-SA layer become deprotonated, causing the anionic gel to swell, and thus the thickness of the DMAA-SA layer to increase substantially. Scale bars are 500 μm.

The pH responsive differences were highlighted by a two-layer capsule, shown in FIG. 14, wherein the inner (or first) layer is nonionic while the outer (or second) layer is anionic. To make this capsule, a pH-insensitive core of chitosan (an amine-rich polysaccharide) crosslinked with glutaraldehyde (GA) was first created (Arya, C. et al. *"Killer" microcapsules that can selectively destroy target microparticles in their vicinity*, ACS Appl. Mater. Interfaces 8, 29688-29695 (2016); Chan, E.-S. et al. *Effect of formulation of alginate beads on their mechanical behavior and stiffness*, Particuology 9, 228-234 (2011)). The core was made by adding the chitosan solution drop-wise into a solution of the GA, as described above. Note that GA forms covalent bonds between the amines on chitosan (Payne, G. F. et al. *Accessing biology's toolbox for the mesoscale biofabrication of soft matter*, Soft Matter 9, 6019-6032 (2013)). A layer of nonionic DMAA was then polymerized around the chitosan core by the procedure described above (FIG. 5). Next, an anionic layer was polymerized around the first polymer layer. For this, the single-layer capsule was reloaded with initiator and placed in a solution containing DMAA and SA (at a molar ratio 9:1) as well as crosslinking agent (BIS) and accelerant.

An image of the synthesized two-layer capsule in a pH 3 solution is shown in FIG. 14a. In the pH 3 solution, the two layers of the capsule had about the same thickness of ~900 µm, given the carboxylate groups of SA are not ionized under acidic conditions. The same capsule in a pH 7 solution is shown in FIG. 14b. In the pH 7 solution, the inner DMAA layer remained at the same thickness of ~900 μm (as provided in the pH 3 solution); however, the outer DMAA-SA layer was swollen to about 2000 μm. Thus, the thickness of the outer layer was increased by more than 100%, thus illustrating the pH-responsive properties of the exemplary multilayer capsule.

Figure 15:
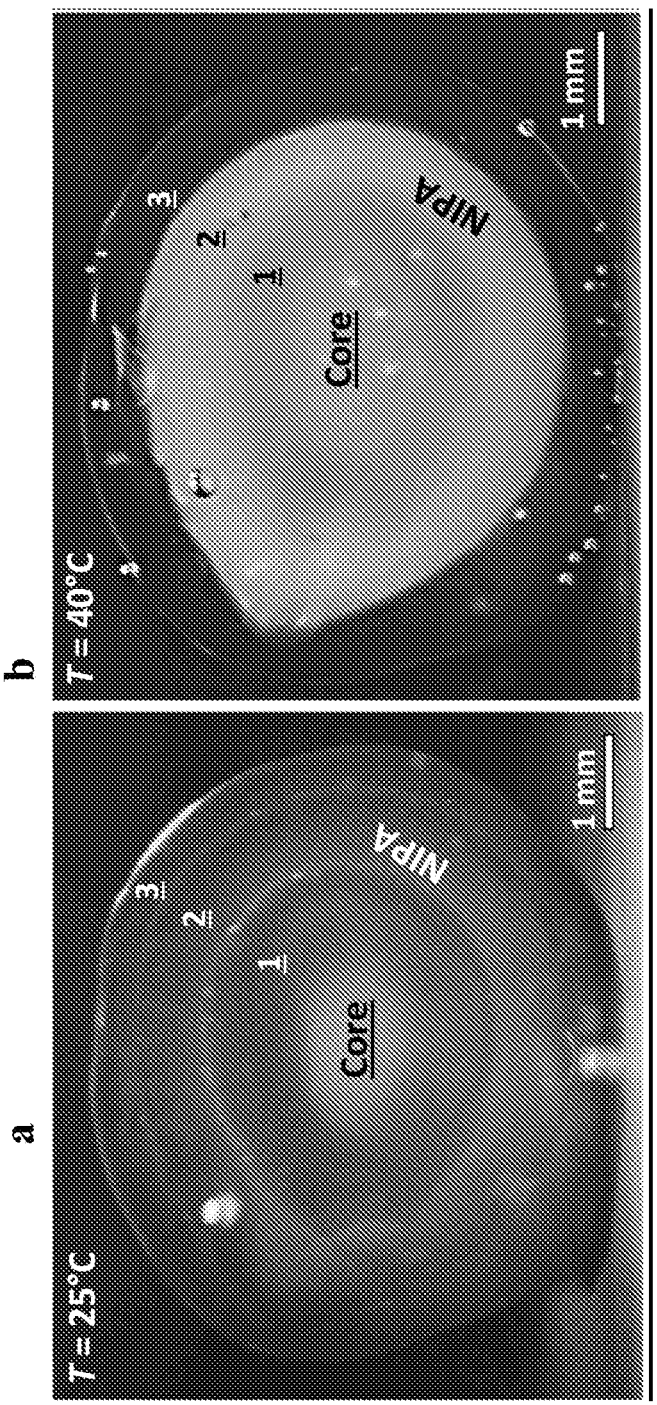
FIG. 15 illustrates a multilayer capsule with specific layers responsive to temperature as external stimuli. A three-layer capsule is shown wherein layers 1 and 3 are DMAA (non-responsive), while layer 2 is NIPA (thermoresponsive). As shown in panel (a), at ambient temperature (25° C.) all layers are substantially transparent. As shown in panel (b), upon heating to 40° C., which is above the LCST of NIPA, the NIPA layer becomes turbid. Scale bars are 1 mm.

Temperature as a stimulus. As well known in the art, NIPA is a thermoresponsive polymer. For example, NIPA gels shrink when heated above the polymer's LCST of 32° C. (Ahn, S. K. et al. *Stimuli-responsive polymer gels*, Soft Matter 4, 1151-1157 (2008); Hirokawa, Y. et al. *Volume phase transition in a nonionic gel*, J. Chem. Phys. 81, 6379 (1984)). DMAA, on the other hand, is not affected by temperature (Gargava, A. et al. *Smart hydrogel-based valves inspired by the stomata in plants*, ACS Appl. Mater. Interfaces 8, 18430-18438 (2016)). FIG. 15 shows a three-layer capsule wherein layer 1 and layer 3 are DMAA and intermediate layer 2 is NIPA. The core is alginate/Ca2+ as described above.

As shown in FIG. 15a, all three layers are clearly visible at 25° C., with each layer being about 1 mm thick. After heating the same capsule to 40° C., which is above the LCST of NIPA, the NIPA layer (2) became opaque (FIG. 15b), given the NIPA chains turn hydrophobic above the LCST and the gel begins to expel water (White, J. C. et al. *Alginate/PEO-PPO-PEO composite hydrogels with thermally-active plasticity*, Biomacromolecules 14, 4456-4464 (2013)). In contrast, the DMAA layers (1 and 3) were not affected by temperature and both remained clear. Note that the inner layer 1 of DMAA appears somewhat turbid, given it is obscured by the surrounding NIPA layer 2. Thus, the exemplary capsule exhibited a visible macroscopic change in response to temperature.

Solute release from temperature-responsive capsules. The release of small-molecule solutes from the temperature-responsive capsules was studied. As noted above, capsules synthesized in accordance with the disclosed invention are suitable for the delivery of drugs and other solutes (Esser-Kahn, A. P. et al. *Triggered release from polymer capsules*, Macromolecules 44, 5539-5553 (2011); Wang, H. C. et al. *Trigger chemistries for better industrial formulations*, ACS Appl. Mater. Interfaces 7, 6369-6382 (2015)). In this context, the proximity of NIPA's LCST to human body temperature (37° C.) has made this polymer of particular interest in drug delivery (Ahn, S. K. et al. *Stimuli-responsive polymer gels*, Soft Matter 4, 1151-1157 (2008)). For example, the pulsatile release of drugs from thermosensitive NIPA gels through temperature control has been demonstrated (Yoshida, R. et al. *Positive thermosensitive pulsatile drug-release using negative thermosensitive hydrogels*, J. Control Release 32, 97-102 (1994); Dinarvand, R. & D'Emanuele, A. *The use of thermoresponsive hydrogels for on-off release of molecules*, J. Control Release 36, 221-227 (1995); Bhalla, A. S. & Siegel, R. A. *Mechanistic studies of an autonomously pulsing hydrogel/enzyme system for rhythmic hormone delivery*, J. Control Release 196, 261-271 (2014)). Thus, utilization of the disclosed multilayer capsules for drug delivery was evaluated.

Figure 16:
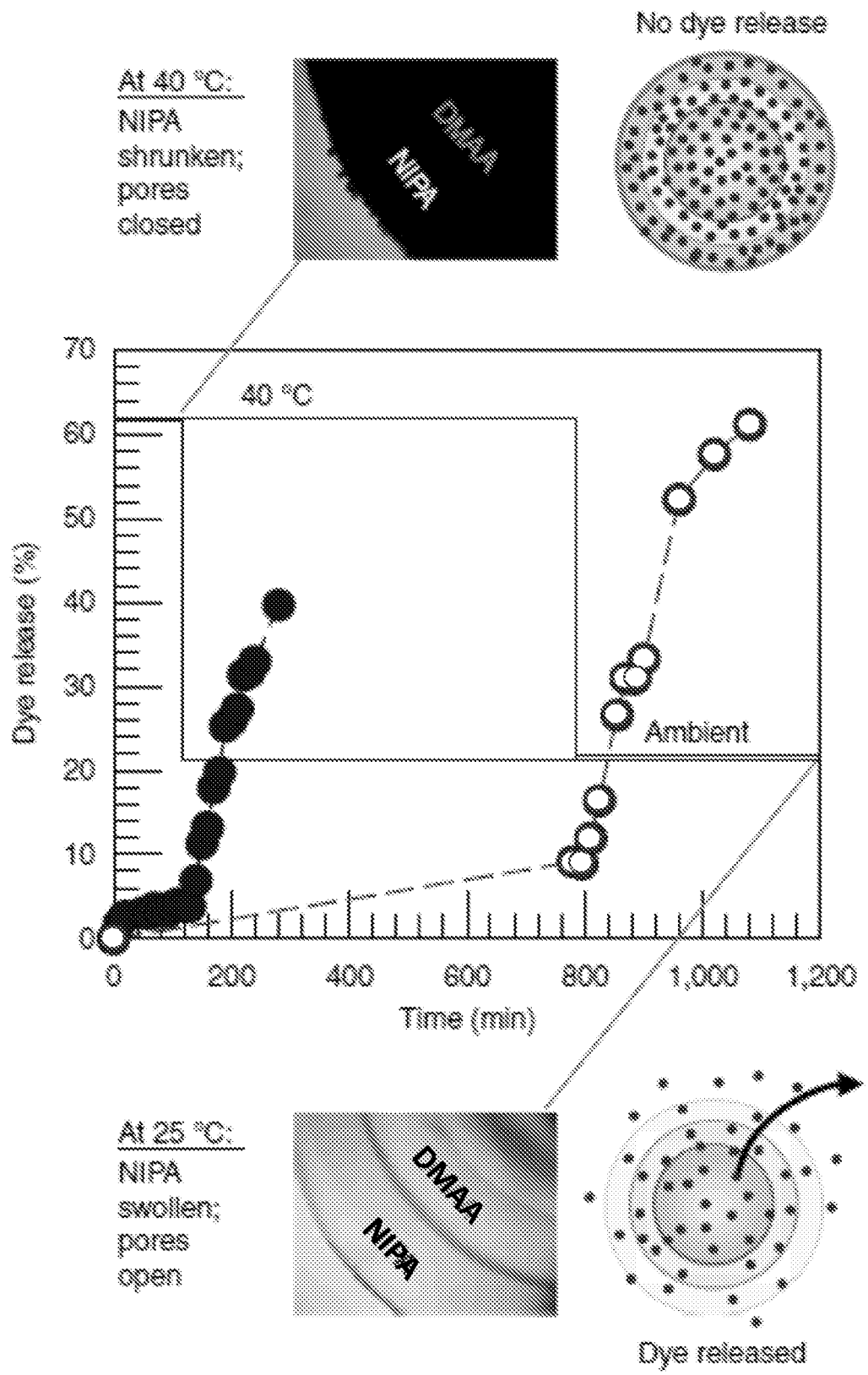
FIG. 16 illustrates graphically temperature-responsive release of dye from a two-layer DMAA-NIPA capsule. Here, DMAA is the inner layer and NIPA is the outer layer. At 40° C. (above the LCST of NIPA), the pores in the outer NIPA layer are closed. Thus, the dye remains in the capsule, as shown in the upper right schematic image. The upper left inset micrograph image shows a dark capsule due to the turbidity of the outer layer. After a certain time (110 min for the solid circle curve; 780 min for the open circle curve), the temperature was lowered to ambient temperature (25° C.); the pores in the NIPA layer opened, causing the dye to be released, as shown in the lower right schematic image. The lower left inset micrograph image shows a transparent capsule. The y-axis is normalized to the dye released into solution after 2 days.

Two-layer capsules having concentric layers of DMAA and NIPA were utilized in testing. First, an Alg-DMAA-NIPA capsule, with DMAA as the inner layer and NIPA as the outer layer, was evaluated. This capsule was loaded with brilliant yellow (BY) dye by soaking in a 500 μM dye solution for 24 h at room temperature. The capsule was then heated in the dye solution up to 40° C., which temperature exceeds the LCST of NIPA. This caused the outer NIPA layer to shrink, thereby preventing release of dye from the inner portions of the capsule. Next, the capsule was rinsed briefly with deionized (DI) water at 40° C., and then transferred to a flask maintained at 40° C. and containing 100 ml of DI water. The dye concentration in the external solution was then monitored as a function of time and plotted (FIG. 16). As long as the temperature was at 40° C., negligible dye was released from the capsule, with the % release (FIG. 16, solid circle curve) saturating at about 5%. Next, at the 110 min mark, heating of the flask was stopped and allowed to cool to ambient temperature. As the temperature dropped below the LCST of NIPA, a sharp increase in dye release was observed. Within the next 180 min (3 h), more than 40% of the dye was released. Thus, the release profile may be switched from little or no release of solute at high temperature to rapid release of solute at low temperature. Note that the y-axis in FIG. 16 is normalized to the dye in the solution 2 days later at ambient temperature, at a state when all the dye had been released from the capsule.

A similar test was conducted using an identical Alg-DMAA-NIPA capsule as described above, but held at a temperature of 40° C. in the flask for 13 hours (780 min). Even over this longer period (FIG. 16, open circle curve), only about 10% of the dye was released. After heating was stopped and the flask allowed to cool to ambient temperature (~25° C.), the dye release was again triggered. Over the next 300 min, more than 60% of the dye was released. Thus, these experiments demonstrate that small-molecule solutes may be encapsulated and maintained in the disclosed multilayer capsules for extended periods of time by exploiting the thermoresponsive properties of NIPA (or other temperature responsive polymers).

When a NIPA gel is heated above its LCST, its chains become hydrophobic and the gel becomes turbid (Bird, R. B., Stewart, W. E. & Lightfoot, E. N. TRANSPORT PHENOMENA (Wiley, $2^{nd}$ ed., 2002); Odian, G. PRINCIPLES OF POLYMERIZATION (Wiley, $4^{th}$ ed., 2004)). Similarly, when the Alg-DMAA-NIPA capsule was observed under a microscope at 40° C., the capsule appeared dark (FIG. 16, upper inset image) because the NIPA layer is turbid and is the outer layer. It is believed that the hydrophobic NIPA chains close the pores in the NIPA layer, akin to forming a precipitate around the pores. This allowed the dye to be retained in the core. When temperature was decreased to ambient temperature (~25° C.), the capsule became clear again (FIG. 16, lower inset image). In this state, the pores in the outer NIPA layer were reopened, allowing the dye to diffuse out. Thus, capsules having a multi-step release profile may be engineered, with little or no release under a first value of the stimulus (e.g., temperature) followed by rapid release under a second and different value of the same stimulus.

Next, an Alg-NIPA-DMAA capsule, with NIPA as the inner layer and DMAA as the outer layer, was evaluated. We again loaded the capsule with BY dye. Note that some of the dye was in the alginate core and inner NIPA layer, while some of it was in the outer DMAA layer. The capsule was then transferred to a flask at 40° C. containing 100 ml of DI water. The release profile (FIG. 17) shows an initial rapid release of dye, followed by a saturation around the 45 min mark. This released dye corresponds to that in the outer DMAA layer. However, the dye in the core was prevented from diffusing out because the pores in the NIPA layer were closed at 40° C.

Figure 17:
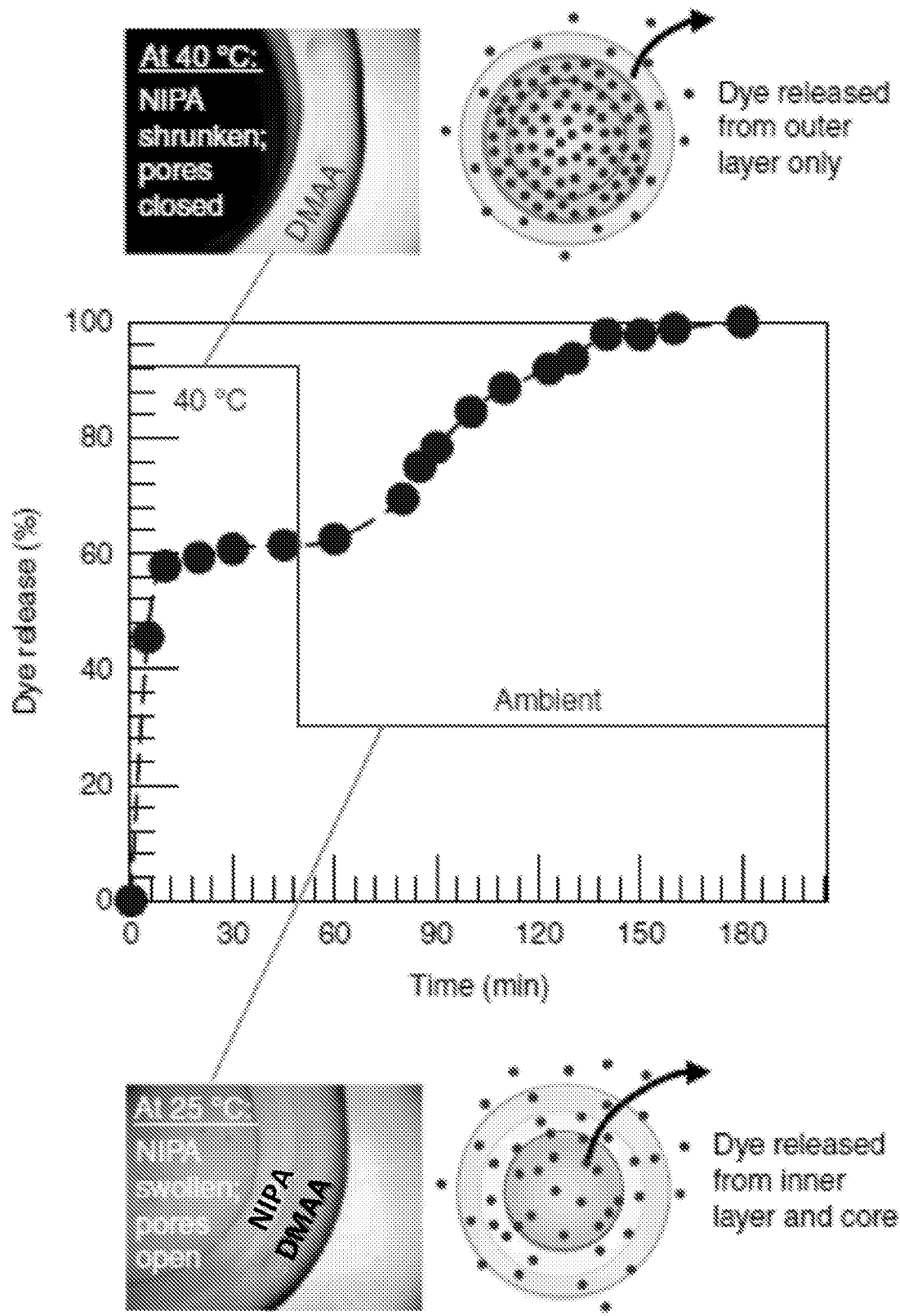
FIG. 17 illustrates graphically temperature-responsive release of dye from a two-layer NIPA-DMAA capsule. Here, NIPA is the inner layer and DMAA is the outer layer. At 40° C. (above the LCST of NIPA), the pores in the inner NIPA layer are closed. Thus, in this case the dye in the outer DMAA layer alone was released, as shown in the upper right schematic image. The upper left inset micrograph image shows a dark inner portion due to the turbidity of the NIPA layer, while the outer layer is substantially transparent. At the 45 min mark, the temperature was lowered to ambient temperature (25° C.); the pores in the inner NIPA layer opened, causing the inner dye to also be released, as shown in the lower right schematic image. As this point, the entire capsule is substantially transparent or translucent, as shown in the lower left inset micrograph image.

As shown in the upper inset image of FIG. 17, the core and NIPA layer appeared black while the DMAA layer was transparent. When the heat was removed at the 45 min mark and the system was allowed to cool to ambient temperature, the entire capsule then appeared transparent, as shown in the lower inset image of FIG. 17. In turn, the pores in the NIPA layer were opened, allowing dye trapped within the core to be released. Thus, the release profile shows a second bump followed by a saturation at about the 180 min mark. The y-axis in FIG. 17 is normalized by the final dye concentration in the solution. Thus, about 60% of the dye in the capsule was released at 40° C., while the remaining 40% of the dye was released upon cooling. Thus, by changing the capsule architecture (e.g., the order of the layers), a two-step release profile was engineered, with some of the solute being released at one value of the stimulus, and the rest of the solute being released at a different value of the stimulus.

Discussion. As demonstrated herein, an inside-out technique for creating multilayer polymer capsules is provided, e.g., with each layer being a crosslinked polymer gel. The disclosed technique is simple to implement and does not require complex multiphase precursors, e.g., such as double emulsions. Nor does the disclosed technique require strong interactions (electrostatic or hydrophobic) between adjacent layers. As such, a wide variety of polymers may be utilized to form the layers. Therefore, the present invention is not limited to the exemplary polymers discussed in the experiments.

Disclosed embodiments provide for a gelled core that is loaded with water-soluble initiator and then placed in a solution containing monomer, crosslinking agent and accelerant. The initiator diffuses out of the core into the surrounding solution, whereupon polymerization of the monomer begins at the surface of the core. A polymer layer is formed by free radical polymerization, and as time progresses, this layer grows outward. The process can be sequentially repeated with the same and/or different monomers in order to generate as many additional and discrete layers as desired. In addition, the thickness of each layer is controllable, e.g., based on the polymerization time or by varying the amount of initiator in the core.

The utility of the disclosed methods was demonstrated by juxtaposing layers of a non-responsive polymer next to a thermoresponsive polymer and a pH-responsive polymer. As shown, the thickness of the stimuli-responsive layer can be altered substantially by varying the external stimulus while the non-responsive layer can be maintained at the same thickness. In addition, the permeability of small molecules through the stimuli-responsive layers may be altered as desired.

For example, when NIPA was used as one of the layers, the release of a small-molecule dye from the capsule was very slow above the LCST of NIPA, but much faster below the LCST. As a result, a two-layer capsule with an inner DMAA and outer NIPA layer displayed a one-step release profile with varying temperature. Conversely, when NIPA was used as the inner layer and DMAA as the outer layer, the capsule displayed a two-step release when subjected to the same temperature profile. Thus, new modes of pulsatile release were achieved by the disclosed capsules.

Example 2: Multilayer Tubes

Materials and Methods

Materials. The following were purchased from Sigma-Aldrich (St. Louis, MO): the initiator ammonium persulfate (APS); the accelerant N,N,N',N'-tetramethylethylenediamine (TEMED); the monomers sodium acrylate (SA), N,N'-dimethylacrylamide (DMAA), and N-isopropyl-acrylamide (NIPA); the crosslinker N,N'-Methylenebis(acrylamide) (BIS); the cationic dye methylene blue (MB); xanthan gum (XG); fluoresceinamine (F—$NH_2$); and N-hydroxysuccinimide (NHS). The coupling agent 1-ethyl-3-(3-dimethylaminopropyl) carbodiimide (EDC) was purchased from Carbosynth (San Diego, CA). Agar was purchased from Living Jin (Los Angeles, CA). The nanoclay laponite XLG (LAP) was obtained as a gift from Southern Clay Products (Austin, TX). Deionized (DI) water from a Millipore system was used for all experiments.

Synthesis of Agar Template Cylinders. Agar powder was dissolved in ~95° C. DI water at a concentration of 5 wt %. This hot solution was then inserted into a length of Tygon® tubing (from) of the desired inner diameter. After ~30 min at room temperature, the agar solidified. Water was then injected into the tube end to force the agar cylinder out of the tubing. The cylinder was then cut to the desired length using a razor blade. Tubes were stored in DI water at 4° C. until use.

Synthesis of Multilayer Polymer Tubes. First, the agar template cylinder was incubated in a 15 mg/mL solution of APS. After 15 min, the cylinder was removed, blotted with a KIMWIPE®, and placed in a monomer solution contained in a rectangular trough. A typical monomer solution had 10 wt % monomer, 0.34 wt % BIS (crosslinker), 0.5 wt % XG, and 15 mg/mL TEMED. The XG was added to increase the viscosity of the solution; note that the template stayed suspended in the middle of the viscous solution in the dish, allowing polymerization to occur on all sides of the template. Instead of BIS, LAP particles were used as crosslinkers, and in that case, the composition was: 10 wt % monomer, 0.005 wt % BIS, 3 wt % LAP and 15 mg/mL TEMED. The XG was not used with the LAP because the LAP particles themselves aggregate and make the solution viscous. To synthesize multilayer tubes, the above process was repeated with a different monomer. Once the template with a desired number of polymerized layers was synthesized, it was washed with water and taken out of the solution. A razor blade was used to cut the caps off the structure, thus exposing the agar template. Thereafter, the whole structure was placed in water at ~90° C. to melt the agar and thereby remove the core template. In some cases, to ensure full removal of the agar, hot water was forced through the lumen of the tube using a syringe.

Fluorescent Modification of Polymer Tubes. A two-layer tube was employed with an inner layer being a copolymer of SA and DMAA (10:90 ratio by weight of the total monomer) while the outer layer was solely DMAA. The tube was placed in water at pH 4.5 and to this EDC and NHS were added at concentrations that were 1.5× the molar equivalent of the SA in the tube (each SA monomer has a carboxylate group, which is the one that reacts with the EDC). After 30 min of incubation, a solution of 0.01 g/mL of F—$NH_2$ in methanol was added dropwise to the above tube while stirring. The amount of F—$NH_2$ added was half the molar equivalent of the SA. The sample was then covered with aluminum foil to prevent photobleaching and maintained at 65° C. under moderate magnetic stirring for 24 h to allow the reaction to proceed. The tube was then washed once with a 50/50 methanol/water solution, and three more times with water adjusted to a pH of 4.5.

Optical Microscopy. All microscope images were taken using a Zeiss Axiovert 135 TV inverted microscope. Images were taken using a 2.5× objective. A microruler and the image analysis software ImageJ were used to determine tube dimensions from collected images. To visualize the green fluorescence from F—$NH_2$, which is green, images were collected using a band pass excitation filter (450-490 nm) and a band pass emission filter (515-565 nm). The images were then subsequently combined using ImageJ.

Synthesis and Properties

Figure 18:
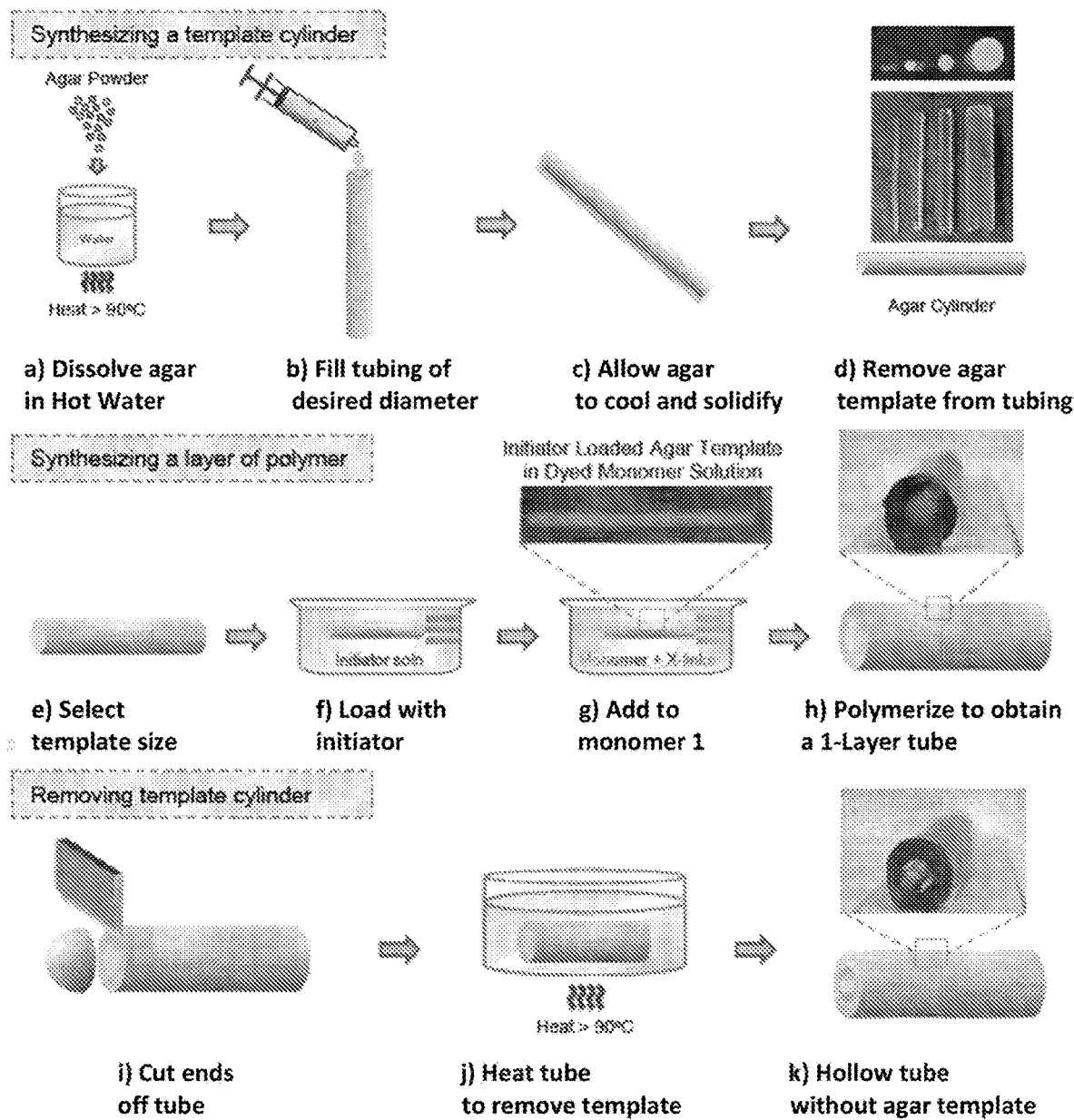
FIG. 18 illustrates synthesis of a single-layer polymer tube in accordance with the present invention. First, a cylindrical template of agar of desired diameter is created (a-d). Then, an agar cylinder of selected size (e) is loaded with free-radical initiator (f), and transferred to a solution of monomer 1, crosslinker and accelerant (g). The initiator diffuses outwardly from the template, initiating polymerization of the monomer to form a first layer of polymer around the template (h). To yield a hollow tube, the ends are removed (i) and the tubular structure is heated to ~90° C. (j), whereupon the agar melts away, leaving behind a hollow tube (k).

A technique to generate a single-layer polymer tube is shown schematically in FIG. 18. First, we synthesized a cylindrical template of the biopolymer agar in a mold (FIG. 18a-d). Templates based on other biopolymers like alginate, chitosan, or gelatin can also be used, but agar is particularly convenient for our purpose. Agar is a seaweed derived biopolymer that is solid at ambient temperature and a liquid solution at elevated temperature (>90° C.). Thus, agar may be readily dissolved in hot water, and upon cooling to room temperature sets into a gel. When the gel is reheated to about 90° C. or more, it melts into a solution. Here, we introduced a hot agar (5 wt %) solution into Tygon® tubing of a predetermined diameter, and allowed the solution to cool into a gel at ambient temperature. The agar cylinder was then removed by injecting DI water into the tubing. The cylinder was then cut into pieces of desired length.

Next, the cylindrical template was incubated in a solution containing a water soluble free-radical initiator (FIG. 18e, f), typically 15 mg/mL of ammonium persulfate (APS). This was done typically for 15 min, which is sufficient time for the APS to diffuse into the entire tube. This initiator-laden template was then transferred into a solution containing 10 wt % of a monomer (e.g., DMAA), 0.34 wt % BIS as crosslinker, 0.5 wt % XG, and 15 mg/mL of TEMED. The XG makes the solution viscous, while the TEMED allows the free-radical polymerization to occur at room temperature. The initiator diffuses out from the template cylinder into the surrounding solution and induced the growth of a crosslinked polymer layer around the template (FIG. 18g). Once a layer of desired thickness was formed (FIG. 18h), the structure was removed and washed. Then the hemispherical caps at the ends of the cylinder were cut off with a razor blade (FIG. 18i) to reveal the inner agar. The whole structure was then placed in a heated water bath (FIG. 18j) at 90° C. for ~20 min to melt away the agar. This resulted in a hollow tube with a polymeric wall of desired composition and thickness (FIG. 18k).

Figure 19:
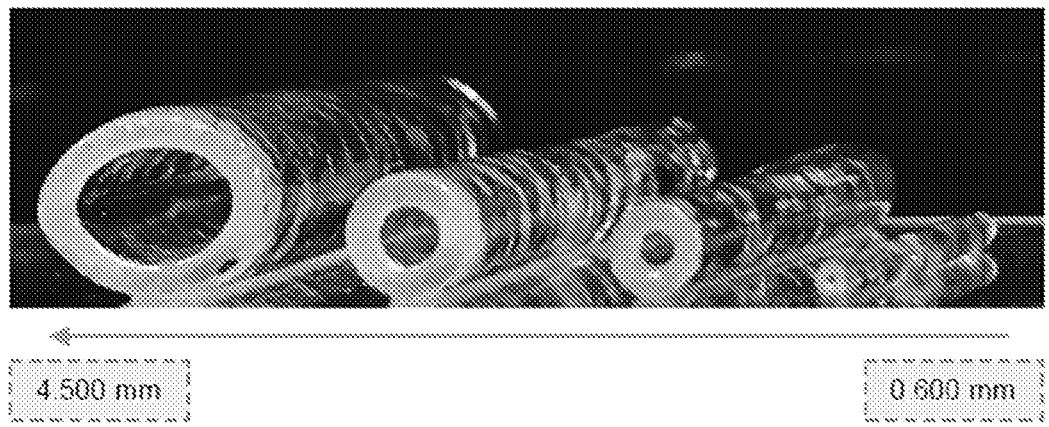
FIG. 19 are images of single-layer tubes having different lumen diameters. The depicted tubes have a wall comprising a DMAA-BIS network, with lumen (inner) diameter ranges from ~0.6 mm (far right) to ~4.5 mm (far left).

The resulting polymer tubes synthesized in accordance with the disclosed techniques were highly hydrated and capable of transporting liquids. In addition, the tubes were created with a variety of lumen (inner) diameters and wall thicknesses. FIG. 19 displays tubes with lumen diameters ranging from 4.5 mm to 0.6 mm. The lumen diameter was controlled by varying the diameter of the agar templates. All have a wall that is a network of DMAA, cross-linked with BIS. For comparison, human blood vessels range in diameter from ~5 μm for the smallest capillaries to >30 mm for the largest ones like the aorta. The wall thicknesses of our tubes in FIG. 19 are ~1 mm. This thickness can be easily controlled by varying either the initiator concentration or the polymerization time.

Figure 20:
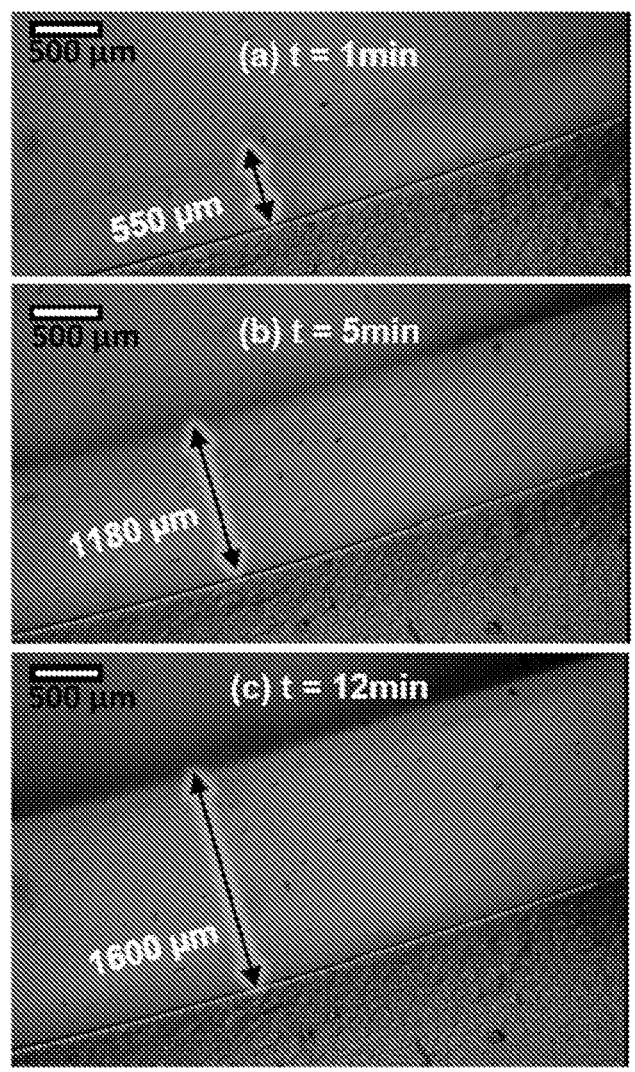
FIG. 20 are time-lapse microscope images illustrating the kinetics of polymer layer growth. An agar cylinder loaded with 15 mg/mL APS was placed in a 10 wt % DMAA solution at time t=0. The growth of the polymer layer over time is shown in panels a-c. Scale bars represent 500 μm.

Kinetics of Layer Growth. The "inside-out" growth of a polymer layer around the core template was visualized in real-time by optical microscopy. For this, a cylindrical template (1.2 mm diameter) with 15 mg/mL APS was placed in a monomer solution with the composition as stated above (10% DMAA, 0.34% BIS). Images show layer growth at ambient temperature over time (FIG. 20). The layer thickness was extracted from the images using ImageJ. As shown, the layer grew rapidly, reaching a thickness of 550 μm after 1 min (FIG. 20a) and saturates at a thickness of 1600 μm by about 15 min (FIG. 20c). Thus, the thickness of a layer was selected by controlling polymerization time.

Figure 21:
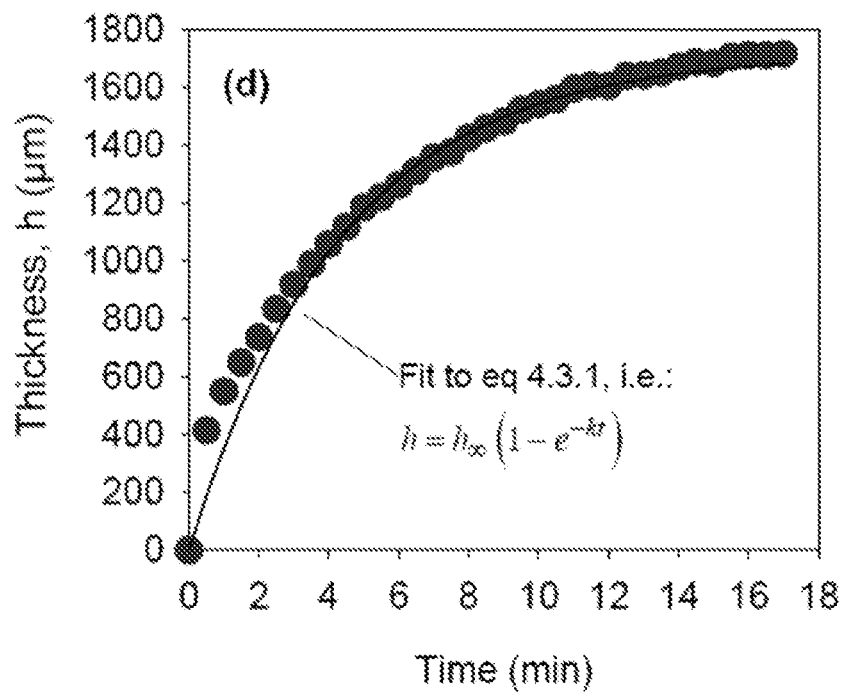
FIG. 21 illustrates graphically the thickness h of the polymer layer of FIG. 20 as a function of time t and fit to Equation 2 (described below).

FIG. 21 illustrates graphically the thickness h of the polymer layer (FIG. 20) as a function of time. The data are fit to the following equation:

$$h = h_\infty (1 - e^{-kt}) \quad \text{(Equation 2)}$$

where $h_\infty$ is the layer thickness at saturation and k is a rate constant. Equation 2 fits the data reasonably well, with a value of $k=0.21$ min$^{-1}$. There is a small deviation from the model in the initial 2 min of layer growth.

Figure 22:
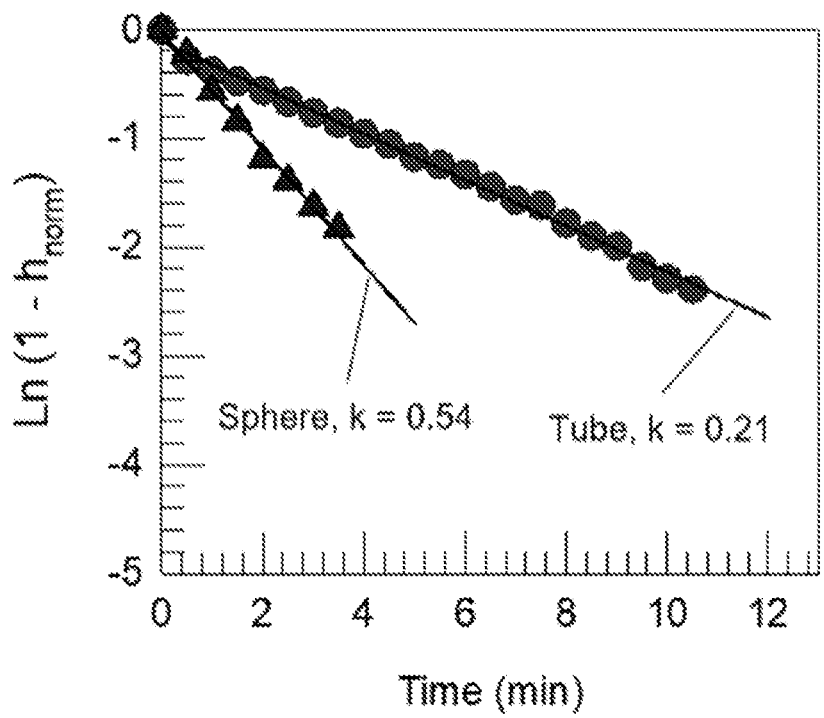
FIG. 22 illustrates graphically the kinetics of layer growth around a spherical template vs. a cylindrical template. Data from FIGS. 12 and 21 are replotted. Each set of data is normalized by the final layer thickness ($h^*=h/h_{28}$). The semilog plots both follow straight lines, confirming the exponential form for the fit (Equation 2). From the slope, the rate constants k are calculated, wherein $k_{sph}=0.54$ is much higher than $k_{cyl}=0.21$.

We then compared the kinetics of layer growth around a spherical core (data in FIG. 12) versus that around a cylindrical core (data in FIG. 21). The monomer solutions used for the two experiments were identical (10 wt % DMAA, 0.34% BIS), and so was the initiator concentration in the core (15 mg/mL APS) as well as the conditions for the polymerization (room temperature). The spherical core was based on alginate and had a diameter of 2 mm, while the cylindrical core above is based on agar and had a diameter of 1.2 mm. The layer of polymer formed around the agar cylinder is noticeably thicker than that around the capsule, i.e., the thickness $h_\infty$~1700 μm for the former and $h_\infty$~340 μm for the latter. Also, the layer growth is completed quicker in the case of the capsule (~7 min) vs. ~15 min in the case of the cylinder. FIG. 22 compares the kinetics on a normalized semilog plot of $h^* = h/h_\infty$ vs. t. Consistent with equation 2, the two plots follow a straight line. From the slopes, the rate constant $k_{sph}=0.54$ is much higher than $k_{cyl}=0.21$, indicating that the reaction proceeds more rapidly in the case of the capsule. Thus, the cylinder layer grew to a much greater thickness compared to the capsule layer thickness. The reasons for these differences are believed to be related to the different materials used for the template (alginate vs. agar). It should be noted that the volume of the cylinder was much larger than that of the capsule, which means there is a larger amount of initiator in the former case.

Figure 23:
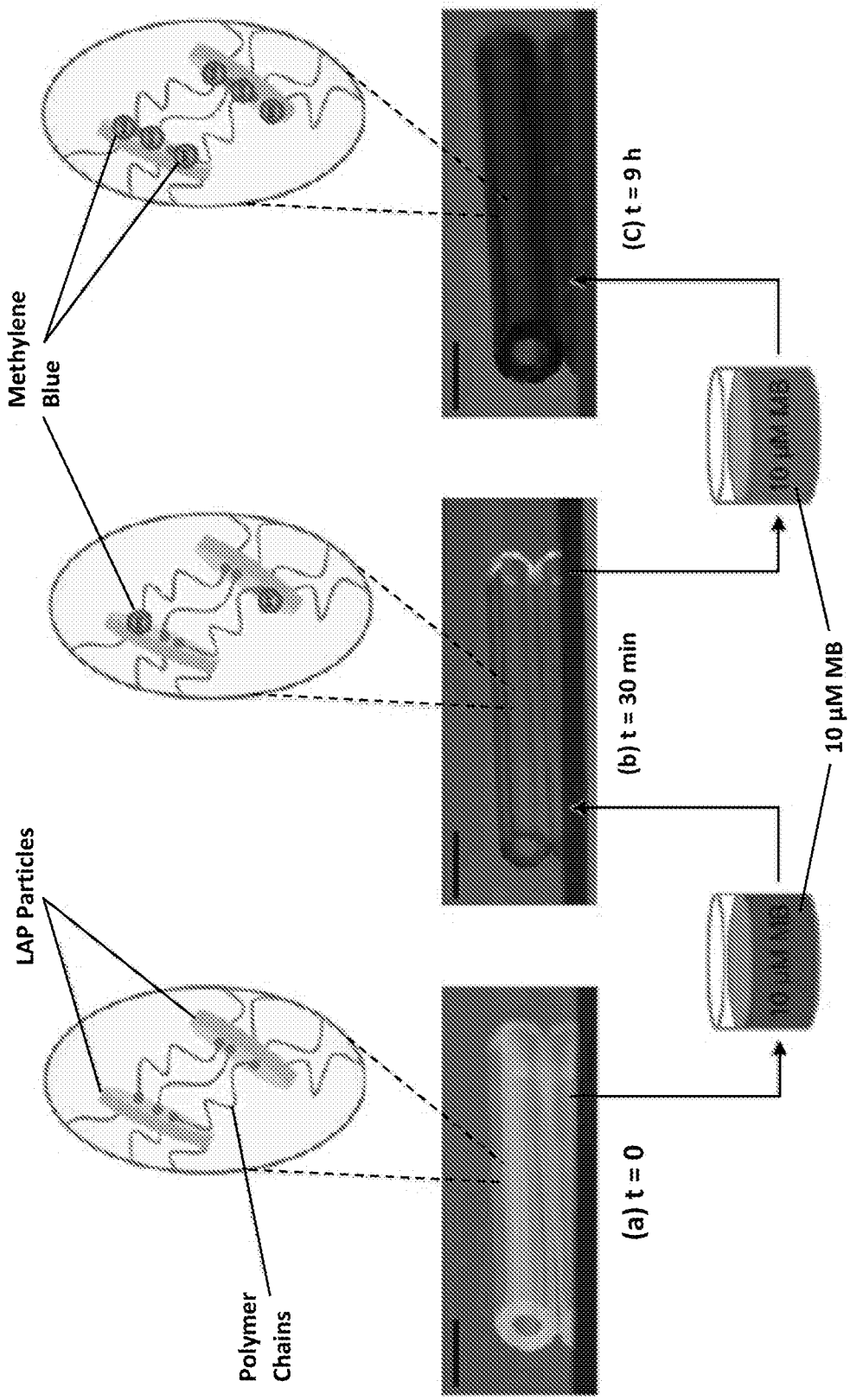
FIG. 23 illustrates a tube with a polymer layer crosslinked by LAP and staining of this layer. LAP particles serve as crosslinkers for growing polymer chains, leading to a network, as shown schematically. A tube with a layer of DMAA-LAP is substantially transparent (a). When placed in a 10 µM solution of methylene blue (MB) for 30 min, the tube wall takes on a light-blue color (b), while incubation in the same solution for 9 hours results in a darker blue color (c). The color is due to adsorption of the cationic MB on the anionic faces of the LAP particles, as shown schematically. Scale bars represent 5 mm.

LAP-Crosslinked Tubes and their Staining. To visualize tubes more clearly, we incorporated the nanoclay laponite (LAP) into our synthesis scheme. LAP is a disk-shaped nanoparticle, 25 nm in diameter and 1 nm in thickness. It is known to serve as a cross-linker for growing polymer chains, as shown in FIG. 23a. In addition, the faces of the disks are negatively charged, and these have a high affinity for cationic dyes. We typically use a monomer composition of 10 wt % monomer (e.g., DMAA), 0.005 wt % BIS, 3 wt % LAP and 15 mg/mL TEMED. Thus, LAP particles are the main cross-linkers for the polymer chains, and the advantage being that networks cross-linked by LAP are more flexible and robust than networks cross-linked with BIS. The rest of the procedure was the same as before: the agar template was placed in the monomer solution, and a layer of DMAA-LAP formed around the template in 15 min. A photo of this tube after removal of the template is shown in FIG. 23a. The tube wall was nearly transparent and colorless. The tube was then placed in a solution of the cationic dye, methylene blue (MB) at a concentration of 10 μM. The MB molecules adsorbed on the faces of LAP disks, turning the layer blue. Thus, either a light blue color (FIG. 23b) or a dark blue color (FIG. 23c) was imparted depending on the time for which the tube was soaked in the MB solution. Note that the dye adsorption is strong and irreversible; thus, the dye does not subsequently diffuse out of the tube if it is placed in water. Also, only tubes with LAP in the walls showed this strong, irreversible binding of MB; thus, we can distinguish layers based on this staining technique.

Figure 24:
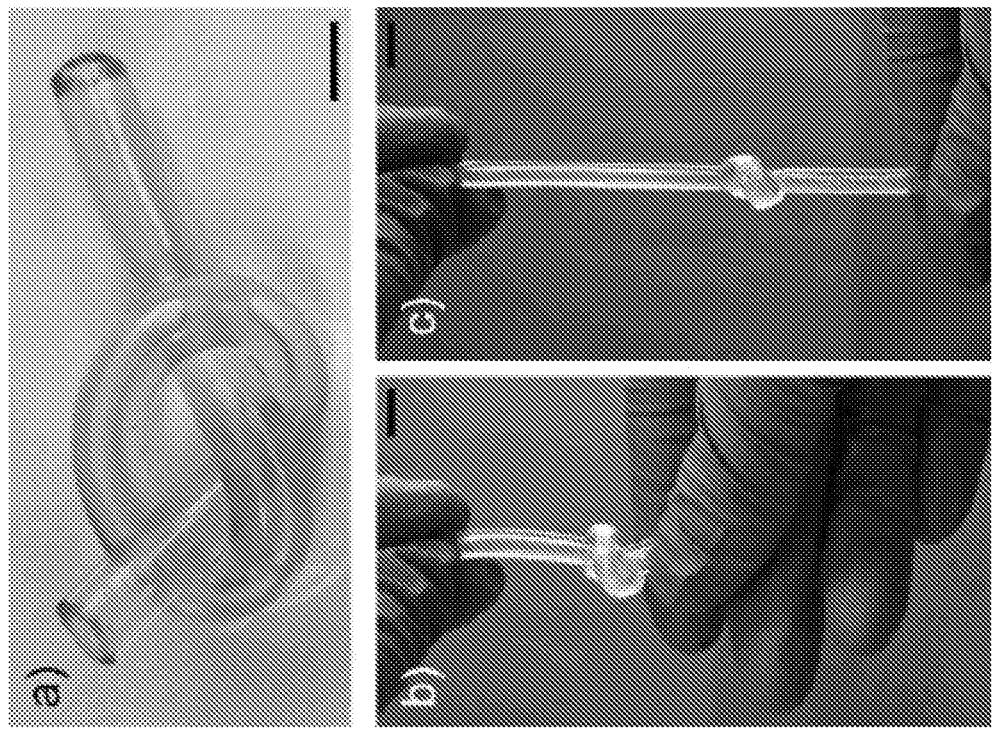
FIG. 24 illustrate the mechanical properties of tubes. As shown, a single-layer tube of DMAA-LAP is flexible and robust enough to be bent and tied into a knot (a). After being knotted (b), the tube is further stretched (c) up to ~150% of its initial length without breaking. Scale bars represent 5 mm.

Mechanical Robustness of the Tubes. Our method generated tubes that are mechanically robust. For example, the tubes supported the steady flow of liquids through their lumen. Tubes made with LAP as the cross-linker were especially robust, and they were also flexible and stretchable (FIG. 24). The tubes had a light blue color due to exposure to MB for just 1-2 min. The tube was stretchable, flexible, and robust. The tube could be tied into a knot, and the knotted tube stretched to >150% of its original length (FIG. 24b-c) without rupture. The stretchability is a well-known property of LAP-crosslinked gels, which is likely due to the increased length of polymer chain segments between cross-linking junctions.

Tubes Patterned with Stimuli-Responsive Polymers. Biological tubes, i.e., veins and arteries, display an ability to spontaneously shrink or enlarge their lumen diameter over certain tube segments (this behavior is termed vasoconstriction and vasodilation). These phenomena occur in response to changes in body temperature and blood pressure, and are responsible for manipulating a steady flow of blood. However, these behaviors have not been shown by prior synthetic polymer tubes. To mimic these characteristics with the disclosed tubes of the present invention, tubes were synthesized with patterned regions of different polymers in the same material, of which one (or more) polymers were stimuli-responsive.

Figure 25:
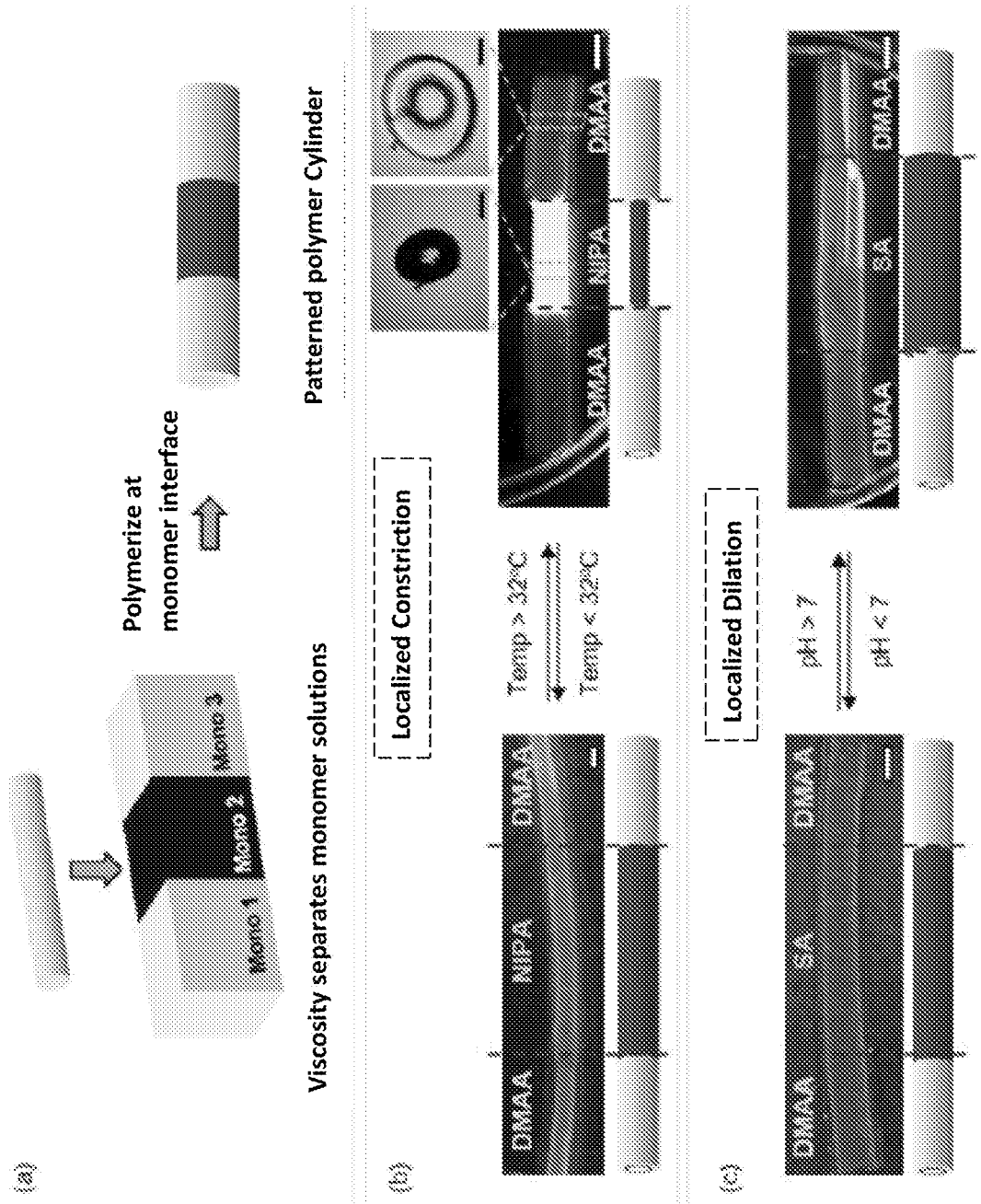
FIG. 25 illustrates the synthesis of laterally patterned tubes and images of exemplary tubes. An initiator-loaded cylindrical agar template is placed in a rectangular trough containing two or more highly viscous monomer solutions (a). The solutions do not mix due to their viscosity. A tube with three lateral segments corresponds to DMAA-NIPA-DMAA (b). When heated above 32° C., the middle NIPA segment shrinks, and the tube narrows; the lumen diameter (inset micrographs of a separate microscale tube shows inner diameter change; scale bar 500 µm) decreases by ~50%. A tube with three lateral segments corresponds to DMAA-SA-DMAA (c). At pH>7 the SA segment swells and the tube dilates; the lumen diameter increases from 4.5 mm to 5.7 mm (scale bars represent 4.5 mm).

First, we showed the ability to synthesize tubes with lateral patterns (FIG. 25), wherein different lateral segments of a tube were made with different polymers. For this, we used the same synthesis scheme as shown in FIG. 18, but used more than one monomer solution in the container. FIG. 25a illustrates lateral patterning into three zones, each with different monomers. To do this, we exploited the fact that highly viscous solutions will not mix. All monomer solutions had 10 wt % of the monomer, and were made viscous either by adding 0.5% XG or by using 3 wt % LAP. In a rectangular trough, we placed two glass slides vertically at discrete points, as shown in FIG. 25a. This divided the trough into three compartments. The three monomer solutions were then added to the three compartments. The glass slides were then removed, whereupon due to their high viscosity, the adjacent solutions did not mix. A cylindrical template loaded with initiator was then positioned perpendicularly across the three monomer solutions, as shown in FIG. 25a, and this was left to polymerize.

FIG. 25b shows a laterally patterned DMAA-NIPA-DMAA tube, where the middle segment is the thermo-responsive polymer NIPA (all layers crosslinked with BIS). Note that the initial photo reveals a smooth tube with no obvious demarcation of the three zones. The differences emerged upon heating. Above its lower critical solution temperature (LCST) of ~32° C., a NIPA gel became opaque and shrank. Correspondingly, we observed that the NIPA segment of the tube narrows above 32° C. Both the outer (OD) and inner diameter (ID) of the tube were reduced (inset images in FIG. 25b). Specifically, the OD decreased from 5.0 to 3.6 mm and the ID (diameter of the lumen) decreased from 2.1 to 1.0 mm. This change in diameter was reversible, i.e., the original sizes were restored upon cooling.

Next, we showed a laterally patterned DMAA-SA-DMAA tube in FIG. 25c (all layers crosslinked with BIS). The middle segment (SA) is actually a copolymer of SA/DMAA in a 20/80 ratio of the total monomer. Due to the presence of SA, this middle segment is anionic, whereas the segments with DMAA alone are nonionic. When the carboxylate groups are ionized, i.e., at pH>7, SA gels swell highly whereas the gels are less swollen at lower pH. In this case, the SA segment of the tube dilated significantly upon increasing the pH to above 7, with the OD increasing from 4.0 to 5.6 mm. This change was also reversible, i.e., the original sizes were restored when pH was again lowered. Overall, the above behavior of the tubes mimics the local vasoconstriction or vasodilation of blood vessels, which is achieved using stimuli-responsive polymers in the tube walls.

Next, we showed the ability to create tubes with longitudinal patterns, wherein the top and bottom halves of the tube were made from distinct polymers. Such a tube is akin to a Janus or two-faced material. Here again, we used viscosity to separate monomer solutions. We poured one solution to fill the rectangular trough half-way to the top, then poured the second monomer solution on top of the first. Again, due to their high viscosity, the adjacent solutions did not mix. A cylindrical template loaded with initiator was then positioned such that one half of its height was in contact with the bottom monomer and the other half with the top, as shown in FIG. 26a.

FIG. 26b shows a Janus tube with a top half of DMAA and a bottom half of NIPA (both layers crosslinked with BIS). At room temperature, this tube is an extended and relatively straight orientation, and it is not evident from the image that the tube is anisotropic. However, when the temperature of the system was increased above the LCST of NIPA (32° C.), the lower half of the tube became opaque due to the phase separation of NIPA. Moreover, the tube curled into a coil rather than remaining straight. This curling is due to the NIPA half shrinking as compared to the DMAA half. This mismatch in swelling degree between the top and bottom halves of the tube creates internal stresses. To relieve this stress, the tube curled with the swollen portion outside and the shrunken portion inside. Similar folding occurs for flat sheets formed by sandwiching DMAA and NIPA.

Figure 27:
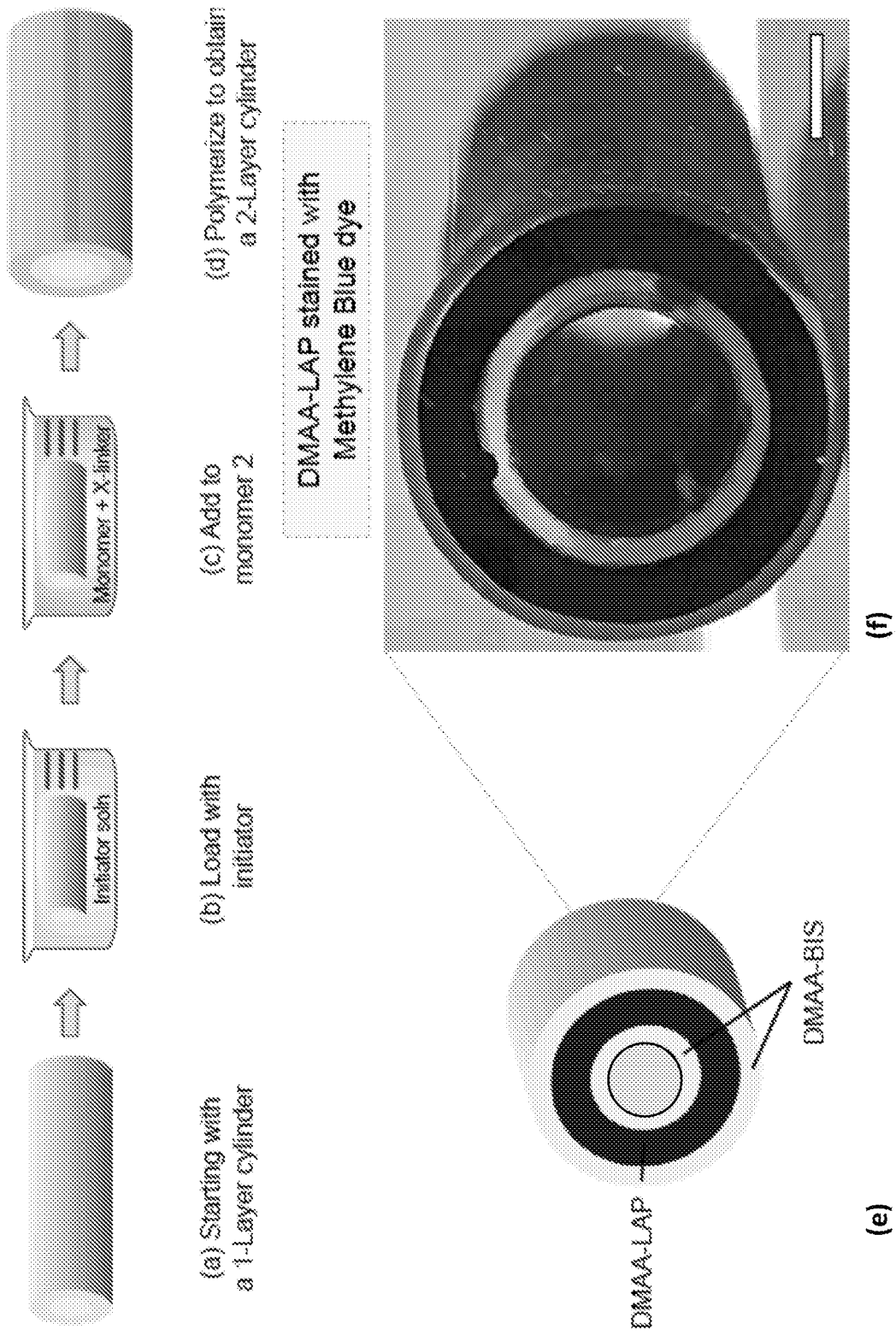
FIG. 27 illustrates the synthesis of multilayer polymer tubes. A one-layer cylinder (with agar intact) is used as a new template for the synthesis of the next outside layer (a). The template is soaked in initiator (b) and then placed in monomer 2 solution (c), yielding a second polymer layer outside the first polymer layer (d). This process is repeatable as desired to form additional layers. A three-layer tube is shown schematically (e) and in an image (f). The layers differ based on the crosslinker used: layers 1 and 3 has BIS as crosslinker while layer 2 has LAP as crosslinker. Only the LAP layer strongly binds MB dye, giving it a dark blue color. The scale bar represents 2 mm.

Multilayer Polymer Tubes. Our technique was utilized to synthesize a second layer of polymer to form a multilayer tube, as outlined in FIG. 27. For this, a cylinder with one polymer layer (with agar intact in the core) was incubated in the APS initiator solution for 15 min (FIG. 27b), essentially re-activating the structure for another polymerization. The initiator-loaded cylinder was then transferred into a second monomer solution (FIG. 27c). The initiator diffuses out and induces "inside-out" growth of a second polymer layer distinct from the first layer and on the outside (FIG. 27d). This process can be further repeated to generate additional layers.

Both the composition and thickness of each layer is selectively controlled. As an example, the multilayer tube (after removal of the agar template) shown in FIG. 27e,f has three distinct layers each of which is a polymer gel: (1) DMAA-BIS, (2) DMAA-LAP and (3) DMAA-BIS. That is, the three layers are based on the same monomer, but different crosslinkers. Also, the thicknesses of the three layers are different: (500 μm for the first layer, 900 μm for the second layer, and 500 μm for the third layer), which was achieved by varying the incubation time of the template in the three successive monomer solutions. To show the differences between the three layers, the entire tube was exposed to methylene blue (MB) dye for 24 h and then washed. Only the middle DMAA-LAP layer retained the MB dye whereas the dye was washed off from the other layers. Thus, in FIG. 27f, the inner and outer layers are colorless whereas the middle layer is dark blue.

Figure 28:
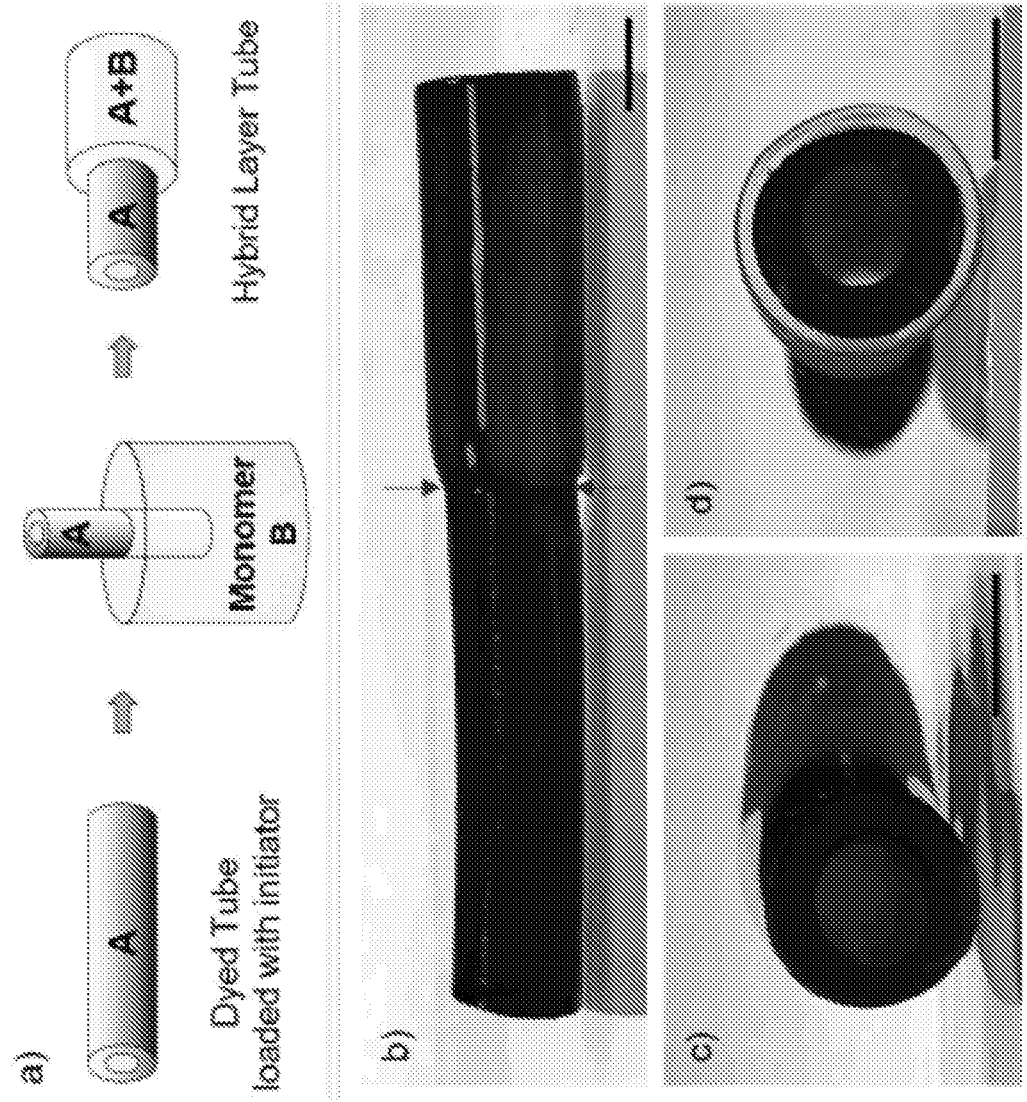
FIG. 28 illustrates the synthesis of tubes with single-layer and multilayer regions. A single-layer cylinder (with agar intact) is loaded with initiator and placed vertically in a second monomer solution such that only a portion of the cylinder is submerged (a). As a result, the second polymer layer forms only over the submerged portion. Images of an exemplary tube are shown in different views from the top and sides (b-d). The first or single-layer portion is DMAA-LAP and the second layer is DMAA-BIS. Only the former (LAP) strongly binds MB dye, giving it a dark blue color. The scale bars represent 5 mm.

Next, FIG. 28 shows the synthesis of a tube that has varying numbers of layers over distinct lateral regions. First, a cylinder with one polymer layer (with agar intact in the core) was reloaded with initiator. This structure was partially submerged vertically in a monomer solution, as shown. The second polymer layer then only grew over the submerged portion. An example of such a tube (after removal of the agar core) is shown in FIG. 28b. The tube changed from one to two layers at the point indicated by arrows. The inner layer was DMAA-LAP and the outer layer was DMAA-BIS. When exposed to MB dye for 24 h, the inner layer alone stained dark blue (FIG. 28c, d).

Figure 29:
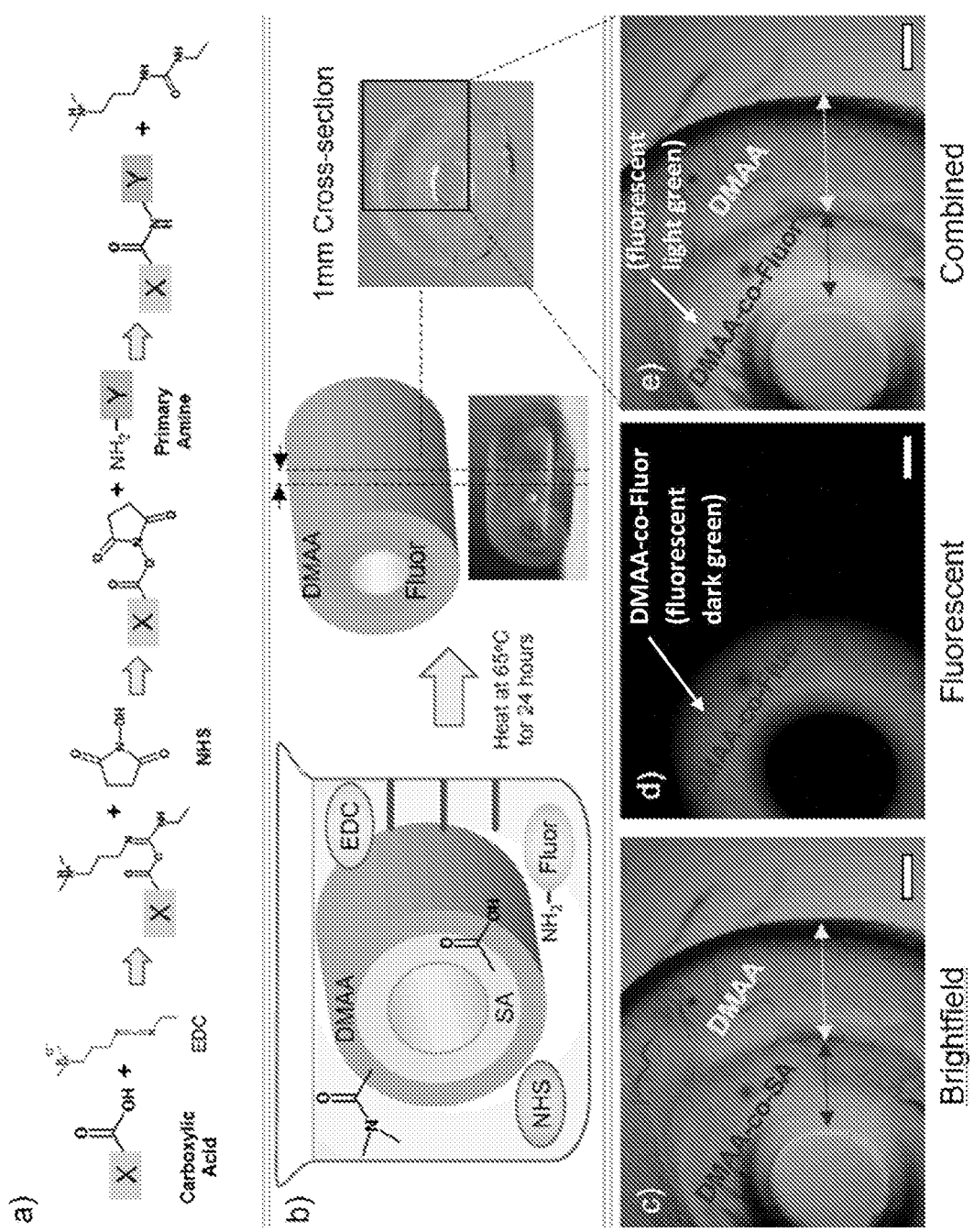
FIG. 29 illustrates post-modification of a specific layer in a multilayer tube. The tube has an outer layer of DMAA and an inner layer of SA, with the latter having carboxylate groups. The tube is reacted with EDC and NHS, and then with a primary amine via the reaction scheme shown in (a). As a result, the carboxylates become attached to the functional group Y on the amine. The amine chosen was fluoresceinamine (F—NH$_2$) which imparts fluorescence to the inner layer. A yellow-green color was selectively seen visually for this layer after modification (b). Scale bars in panel (b) represent 2 mm. The cross-section of the tube was viewed under fluorescence microscopy and the inner layer revealed bright green fluorescence (c-e). Scale bars in panels (c-e) represent 500 µm.

Chemical Post-Modification of Tube Layers. Multilayer tubes that have different polymers in each layer can also be modified further after synthesis. This allows functionalities to be introduced into precise regions of a tube. For example, a tube may be decorated with molecules that can sense analytes flowing through the lumen, or with biological molecules (e.g. growth factors) to enable their use in tissue engineering. Towards this end, we demonstrated the modification of a specific layer in a tube with fluorescent markers (FIG. 29). We started with a two-layer DMAA-SA tube. The outer layer was DMAA while the inner layer was a copolymer of SA/DMAA in a 10/90 ratio of the total monomer (both layers were crosslinked with BIS). This tube was added to a solution containing the coupling agents EDC and NHS, and thereafter reacted with a primary amine, which in this case was fluoresceinamine (F—$NH_2$). Following reaction and washing, photos of the modified tube are shown in the insets of FIG. 29b and fluorescence micrographs of the cross-section are shown in FIG. 29c. The F—$NH_2$ was selectively attached to the inner SA layer while there was no modification to the outer DMAA layer. Thus, a multilayer tube having a fluorescently modified inner layer was achieved.

Discussion. We have presented a technique for the synthesis of polymer tubes with multiple layers, which mimic features of natural structures such as blood vessels. The technique provides precise control over lumen diameter, wall thickness, numbers of layers and the chemistry of individual layers. Tubes are patternable with different polymers either in the lateral or longitudinal directions. Patterned tubes based on stimuli-responsive polymers exhibited the ability to spontaneously change their lumen diameter in response to stimuli, or to convert from a straight to a curled shape. Tubes are also post-modifiable to attach specific chemicals selectively to a given layer of a multilayer structure.

Example 3: Hair-Covered Surface

Materials and Methods

Materials. The following were purchased from Sigma-Aldrich (St. Louis, MO): the initiator ammonium persulfate (APS); the accelerant N,N,N',N'-tetramethylethylenediamine (TEMED); the monomers sodium acrylate (SA), acrylamide (AAm), N,N'-dimethylacrylamide (DMAA), and N-isopropyl-acrylamide (NIPA); the crosslinker N,N'-methylene-bis(acrylamide) (BIS); the cationic dye methylene blue (MB); xanthan gum (XG); fluoresceinamine (F—$NH_2$); and N-hydroxysuccinimide (NHS). The coupling agent 1-ethyl-3-(3-dimethylaminopropyl) carbodiimide (EDC) was purchased from Carbosynth (San Diego, CA). Agar was purchased from Living Jin (Los Angeles, CA). The nanoclay laponite XLG (LAP) was obtained as a gift from Southern Clay Products (Austin, TX). Iron (III) oxide, magnetic Nanoarc® powder (MNPs) was purchased from Alfa Aesar. Carbon black (EC-600JD) (CB) was purchased from Akzo Nobel. Deionized (DI) water from a Millipore system was used for all experiments.

Figure 30:
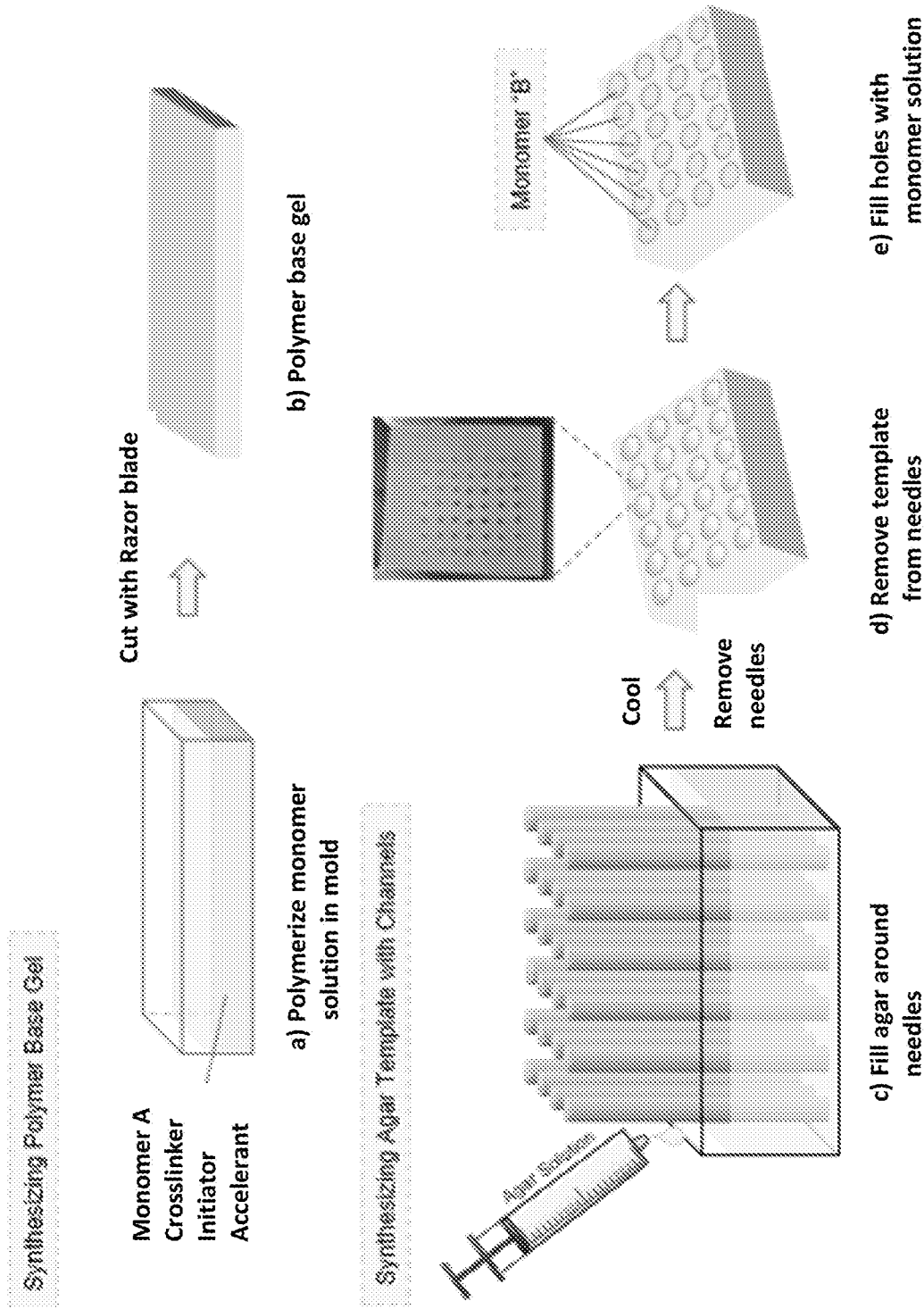
FIG. 30 illustrates the synthesis of a hair-covered gel. First, a base gel (e.g., DMAA) is made and cut to the desired size. Second, agar is poured around a syringe needle array (c) and cooled to produce a gel. The needles are removed, resulting in an agar template with wells or channels (d). The channels are filled with a monomer solution (e). The base gel is loaded with initiator (f) and placed atop the monomer-filled agar template (g). The initiator diffuses into the channels and forms polymer (h). The agar is dissolved by heat (i) to yield a hair-covered gel (j). Scale bars represent 5 mm.
Figure 30:
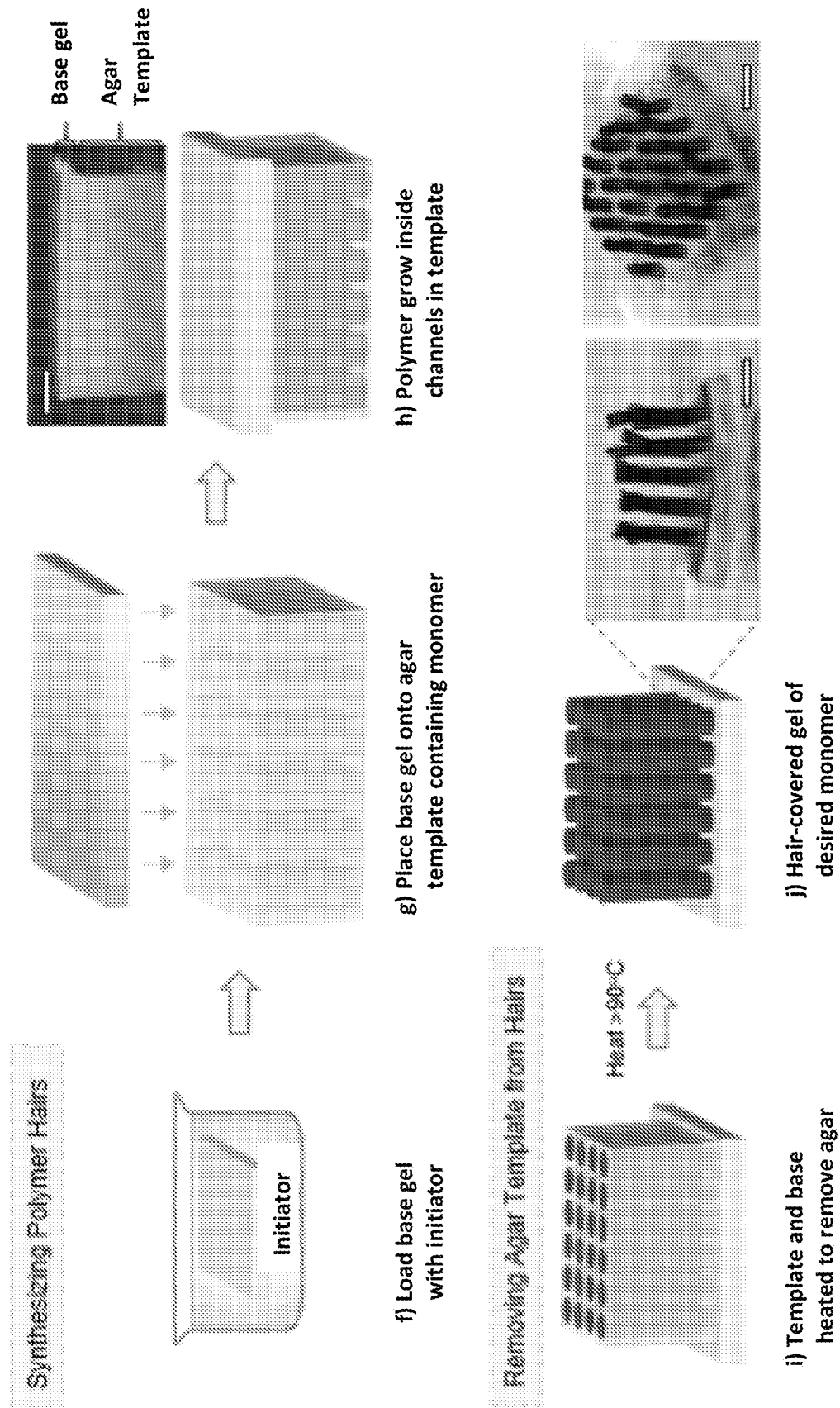

Fabrication of Agar Templates with an Array of Holes/Channels. An agar gel with an array of holes was created (FIG. 30). First, agar powder was dissolved in 95° C. DI water at a concentration of 5 wt %. Syringe needles were affixed on a glass microscope slide using epoxy adhesive, such that the needles formed an ordered array. This array was then placed in a beaker and the hot agar solution was poured to surround the needles up to a given height (this height eventually determined the length of the hairs). After ~30 min at room temperature, the agar solidified into a gel around the needles, and the needles were then removed. This leaves behind an agar gel with an array of holes running all the way through it. The dimensions of the holes depends on the diameter of the needles used. Typically, with 20-gauge needles, the holes were 1 mm in diameter.

Polymer Base Gel Fabrication. Single-layer polymer gels to use as the base for the hairs were fabricated by adding a given monomer solution into a Petri dish, followed by free-radical polymerization. A typical monomer solution had 10 wt % monomer, 0.34 wt % BIS (crosslinker), 15 mg/mL TEMED, and 4 mg/mL APS. Polymerization was conducted for 1 h under a nitrogen atmosphere. Subsequently, the polymer gel was removed and cut to the desired dimensions using a razor blade.

Multilayer polymer bases were fabricated in a similar way, but with controlled thicknesses. First, a solution of monomer 1 (e.g., DMAA, with overall composition as above), was placed between two glass slides separated by a spacer of 1 mm thickness. This was polymerized as above. Next, the spacer thickness was increased to 2 mm and a solution of monomer 2 (e.g., AAm) was introduced into the vacant space and polymerized. The slides were then removed to yield a multilayer gel, with two layers (DMAA and AAm), each of 1 mm thickness. This gel was then cut to the desired dimensions using a razor blade.

Synthesis of Hair-Covered Gels. Hair-covered gels were fabricated using the agar template with wells and the polymer base gel (FIG. 30). First, the base gel was incubated for 20 min in a 20 mg/mL solution of APS initiator. Simultaneously, the holes (channels) in the agar template were loaded with monomer. A typical monomer solution had 10 wt % monomer, 0.34 wt % BIS (crosslinker), 1 wt % LAP particles, and 10 mg/mL TEMED. Loading of monomer into the channels was done either by capillary rise or by filling each channel directly using a micropipette. The latter was used if the channels were relatively long (>13 mm) or wide (>1.25 mm in diameter). The agar template with monomer-filled channels was allowed to rest in a container in ~0.5 mm depth of monomer solution to prevent monomer from evacuating the channels. The initiator-loaded base gel was then placed over the top of the agar template. This system was allowed to polymerize at room temperature for 2 h under a nitrogen atmosphere. At this point, polymer hairs are connected to the base gel, but are surrounded by agar. To remove the agar template, the entire structure was placed in 90° C. DI water for 1 h, whereupon the agar gel melts to a liquid. This revealed the hairs on the surface of the base gel.

Patterns of Hairs. The process for creating spatial patterns of different hairs on a gel is identical to that for making a gel with one type of hair. In this case, selected channels were filled with different monomer solutions. For magnetic hairs, the monomer solution contained 10 wt % DMAA, 0.1 wt % BIS, 2 wt % LAP, 10 mg/mL TEMED, and 0.2 wt % MNPs. For black hairs, the MNPs in the above solution were replaced with 0.1 wt % CB.

Dye Adsorption. The comparison of dye adsorption between a base gel and hair-covered gel was done with the following materials. First, base gels were synthesized from a solution of 10 wt % DMAA, 0.34 wt % BIS, 1 wt % LAP, 4 mg/mL APS and 15 mg/mL TEMED. Two square base gels with a side length of 22.5 mm and a thickness of 1.5 mm were cut from the above base gel. One base gel was stored in DI Water. On the second base gel a 5×5 array of hairs of 10 mm length and 0.9 mm diameter were provided. These hairs were composed of 10 wt % DMAA, 0.34 wt % BIS and 1 wt % LAP, which is the same composition as the base gel.

The dye adsorption tests were performed in two separate beakers, each containing 30 mL of 10 µM MB dye. The base and hair-covered gel were placed into the separate beakers, and the solution was stirred with a magnetic stir bar. At different time points, a 1 mL aliquot of the supernatant was removed from each solution and analyzed on a Cary 50 UV-Vis spectrophotometer at a wavelength of 665 nm (absorbance peak of MB). Photos were also taken of the beakers over time. Following a 2 h period, the beakers were transferred to a shaker table, where they were allowed to mix for a full 24 h, at which point a final sample was analyzed in each case.

Multilayer Hairs. Multilayer hairs were synthesized using a hair-covered gel as a template. The hair-covered gel used here had hairs made as noted earlier: the base was DMAA-BIS, and the hairs were DMAA-BIS-LAP. Also, the hairs were colored blue by exposure to MB dye. This hair-covered gel was incubated in a 20 mg/mL solution of APS for 20 min. The gel was then removed and placed at the bottom of a container having a second monomer solution. The composition of this solution was 10 wt % AAm, 0.34 wt % BIS and 10 mg/mL TEMED. Additionally, 0.1 wt % of xanthan gum (XG) was added to this solution to make it slightly viscous. XG was included to prevent hairs from moving excessively during the polymerization of the second layer. After a layer of sufficient thickness had formed (~10 min), the whole gel was removed and washed with DI water.

Synthesis and Properties

Synthesis of Hair-covered Gel Surfaces. Our technique for producing hair-covered gel surfaces provides for the diffusion of initiator from a base gel through liquid columns in wells in an agar template that contain monomer (FIG. 30). For this, we first make a base polymer gel, typically using the monomer DMAA and BIS as the crosslinker. This gel was then cut to desired dimensions (typically a cuboid with 1 mm depth and a square face with sides of 22 mm) (FIG. 30a-b). The agar template with wells in which the hairs will grow was synthesized next. For this, we placed an array of syringe needles of a selected diameter into a container and poured a hot agar solution around them up to a desired height (FIG. 30c). The system was allowed to cool to room-temperature, at which point the agar solidified into a gel. The needles were removed to yield an agar gel with an array of holes (channels) running all the way through it (FIG. 30d). These channels were then filled with a solution containing 10 wt % of a monomer, 0.34 wt % BIS, 1 wt % LAP particles, and 10 mg/mL of TEMED. Filling of monomer into the channels was done either by capillary rise or by manual pipetting (FIG. 30e). Next, the base gel was incubated for ~15 min in a 20 mg/mL solution of water soluble free-radical initiator, typically APS (FIG. 30f). The initiator-loaded base gel was then placed over the monomer-filled agar template (FIG. 30g) such that the two were in intimate contact. Subsequently, the APS diffused through the monomer-filled channels in the agar template, which initiated the polymerization of the monomers into a gel. Note that diffusion occurred in a direction away from the initiator-laden gel, i.e., the hair grows downwardly (FIG. 30h). Polymerization along the length of the channel was completed within about 20 min.

Once the polymerization was complete, the hairs were still embedded in an agar gel. (FIG. 30i). We then heated the structure to ~90° C. in DI water to liquefy and remove the agar gel, thereby revealing the hairs (FIG. 30j). The hairs are still attached to the base gel since they grow outwardly from this gel. Note that the structure in FIG. 30j is inverted relative to the same structure during synthesis. In the scheme described above, both the hairs and base were made from the same monomer (DMAA), but with differing crosslinkers. The base was made with BIS as the crosslinker, while for the hairs a combination of BIS and LAP particles were used as the crosslinkers. The hairs appeared dark blue, showing high visual contrast from the base and from the solution they were in. This color was due to adsorption of a blue dye onto the LAP particles in the hairs. The base is colorless since it does not have LAP particles. The hairs shown are ~20 mm long and ~1 mm in diameter. They are arranged in a 5×5 array with a lateral spacing of 1 mm between adjacent hairs. Note also that the hairs were studied with the overall structure in solution. When taken out of solution, the hairs tended to collapse or bend sideways.

Figure 31:
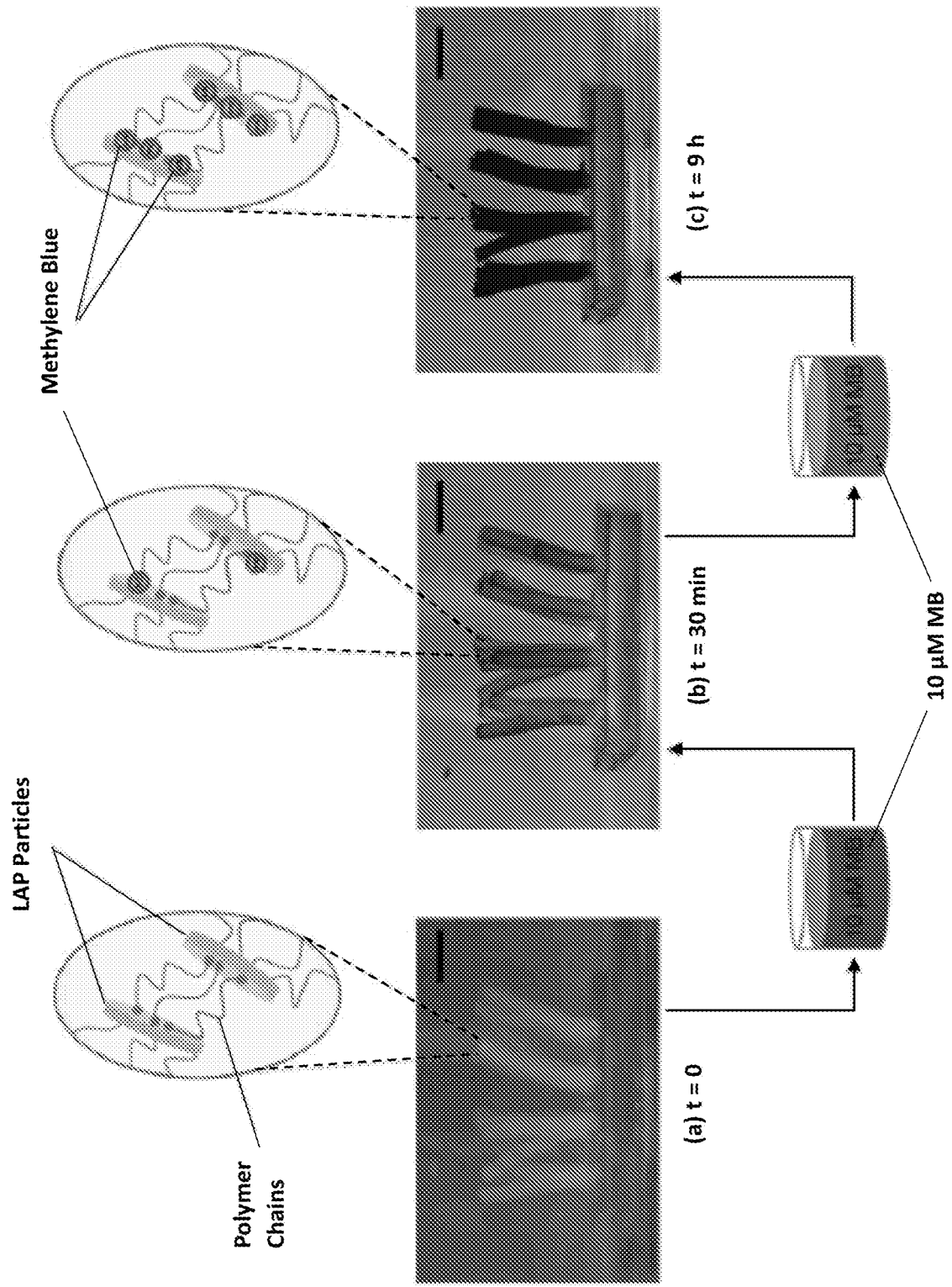
FIG. 31 illustrates staining of LAP-bearing hairs with a cationic dye. The LAP particles serve as crosslinkers for polymer chains in the hairs, as shown schematically. The hairs are initially transparent or translucent (a). When placed in a 10 µM solution of methylene blue (MB) for 30 min, the hairs take on a light blue color (b), while incubation in the same solution for 9 hours gives the hairs a darker blue color (c). The color is due to adsorption of the cationic MB on the anionic faces of the LAP particles, as shown schematically (b and c). Scale bars in the images are 5 mm.

LAP-Bearing Hairs and their Staining. For most of our hair-covered gels, the base was synthesized without LAP, and the hairs with LAP. The benefit of LAP is two-fold. First, LAP particles, which are disks of 25 nm diameter and 1 nm thickness, are known to serve as crosslinkers for growing polymer chains (FIG. 31a). Moreover, the use of LAP leads to gels that are flexible, and this is indeed the case with our hairs, i.e., they are flexible and "wavy" when they contain LAP. Secondly, our hairs (with or without LAP) are optically transparent and hence difficult to discern. For this reason, it is helpful to provide contrast to the hairs. This may be done by exploiting the anionic nature of LAP disks, which have a high affinity for cationic dyes (FIG. 31). When a colorless hair-covered gel was placed in a solution of the cationic dye, methylene blue (MB) at a concentration of 10 µM, the MB molecules adsorbed on the faces of LAP disks, turning the layer blue. Either a light blue (FIG. 23b) or a dark blue (FIG. 23c) color may be imparted, depending on the soaking in the MB solution. Note that dye adsorption to LAP was irreversible; thus, the dye did not subsequently diffuse out of the hairs. Also, the base that did not have LAP did not get stained by the MB, i.e., any absorbed dye in the base was removed by diffusion.

Figure 32:
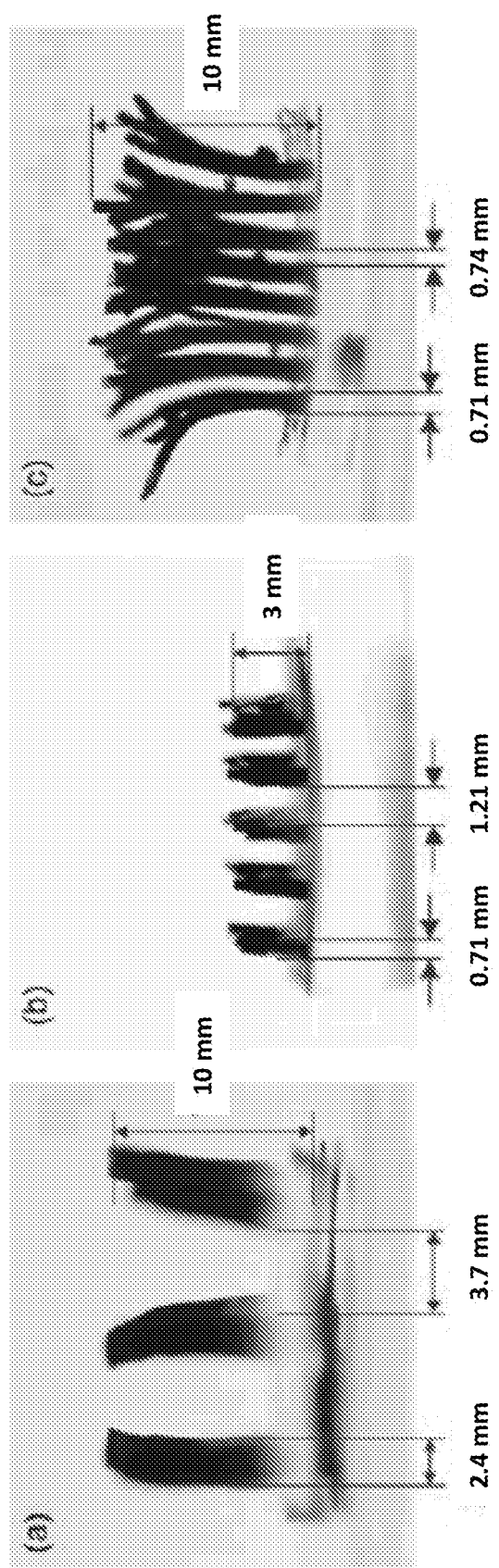
FIG. 32 are images of hairs extending outwardly from a substrate and of varying dimensions and spacing. The height, diameter, and spacing between hairs are varied. All hairs were fabricated on a base of substrates having the same dimensions (14.5 mm×14.5 mm).

Hair-covered Gels with Tailored Dimensions. Biological villi in the small intestine vary between individuals in diameter, height and spacing. Thus, we were interested in modulating the same variables through our synthesis technique. First, we showed that hairs may be synthesized in a variety of spacings. Hairs in a 3×3 array, a 5×5 array, and an 8×8 array are shown in FIG. 32a-c. All were synthesized on a base of the same area, a square of 14.5 mm length. The different arrays correspond to different numbers of needles chosen for the well-filled agar template. Second, hair thickness was varied. The hairs in FIG. 32a have a diameter of 2.4 mm (corresponding to 20-gauge needles used in making the template) and those in FIG. 32b-c have a diameter of 0.71 mm (25-gauge needles). Further, the height of the hairs was varied, which was done by filling the agar solution to different heights in FIG. 30c. The hairs in FIG. 32b have a height of ~3 mm while those in FIG. 32a, c have a height of ~10 mm.

Figure 33:
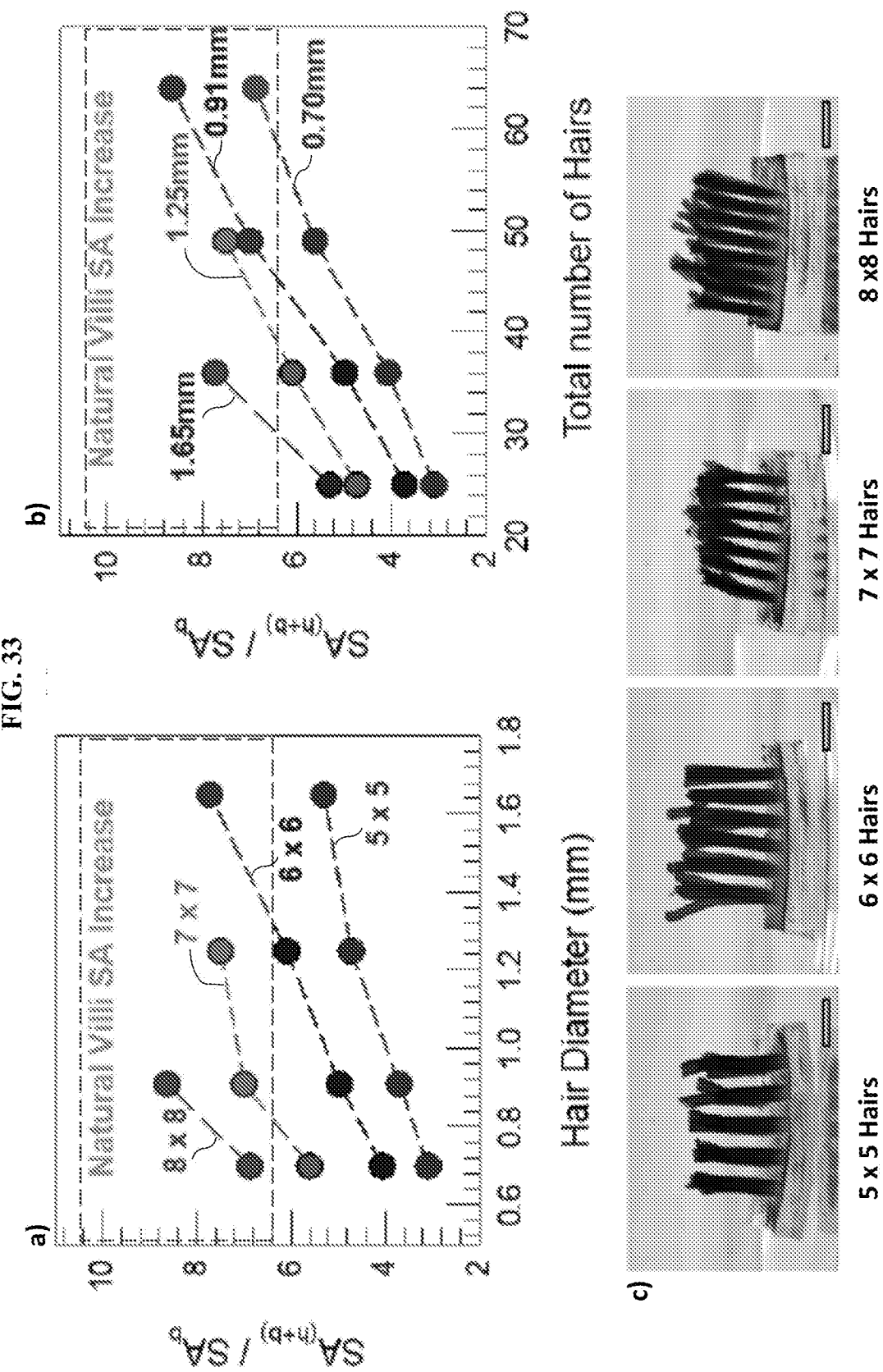
FIG. 33 illustrates surface area increase for hair-covered gels vs. base gels. The ratio of the surface area of the hair-covered base gel ($SA_{(h+b)}$) to the surface area of base gel alone ($SA_b$) was plotted as a function of the hair diameter (a) and as a function of the total number of hairs (b). The dashed line box demarcates the typical increase in surface area exhibited by intestine covered with villi over correspondingly sized flat intestine portion. Images of exemplary hair-covered gels are shown with different hair densities (c), including from left to right 5×5, 6×6, 7×7 and 8×8, respectively, for a constant hair diameter of 0.9 mm. Scale bars represent 5 mm.

The presence of villi on intestinal walls increases the surface area of the small intestine between 6 and 10 times. In FIG. 33, data is presented for the increase in surface area achieved by various combinations of hair diameters and spacing. The plotted variable on the y-axis is the ratio between the surface area of the hair-covered gel (i.e. $SA_{(h+b)}$ for Hairs+Base) and the surface area of only the base gel ($SA_b$). The surface area increase with respect to hair diameter is shown in FIG. 33a, and the surface area increase with respect to total number of hairs is shown in FIG. 33b. Each colored line in FIG. 33a corresponds to a different array of the hairs (5×5 to 8×8), while each line in FIG. 33b corresponds to a different hair diameter. All hair-covered gels were fabricated on a square base of 14×14 mm, with hairs spaced evenly along the lengths of a side. Hairs were synthesized at a length of 8 mm, and individual hairs were measured using electronic calipers to confirm dimensions post-synthesis. The area within the dashed line box region (FIG. 33a, b) indicates the typical surface area increase seen in the case of biological villi. The data show that this biological range is reached with the hair-covered arrays.

Figure 34:
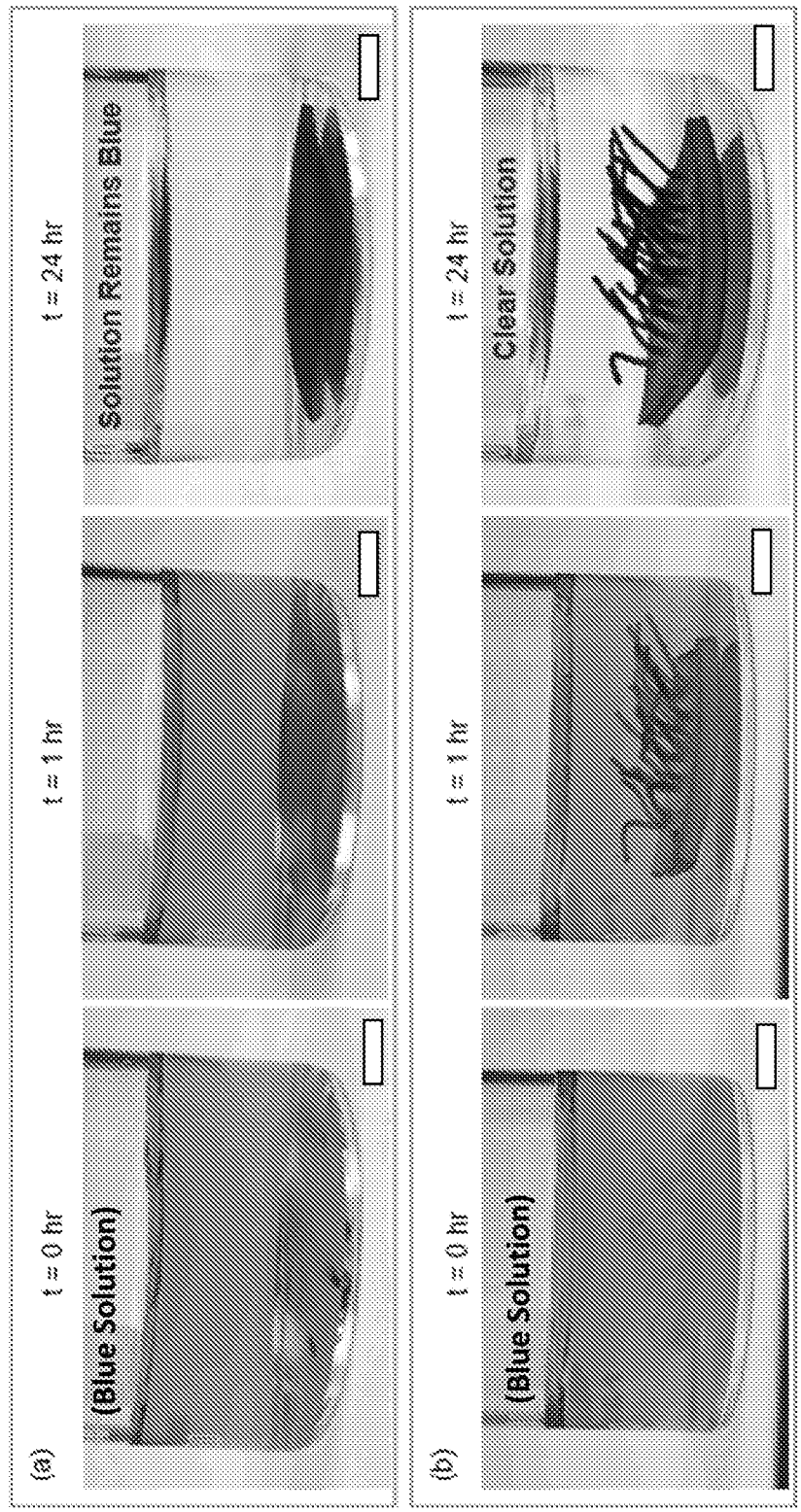
FIG. 34 illustrates dye adsorption of hair-covered gels vs. base gels. A base gel and a hair-covered gel of identical composition (both contain LAP) are compared for their ability to absorb MB dye from water. Images of the base gel (a) and hair-covered gel (b) in MB solution at different time points are shown (a-b). The hair-covered gel exhibits a lighter color, indicating more dye removal from the solution. Scale bars represent 5 mm.
Figure 35:
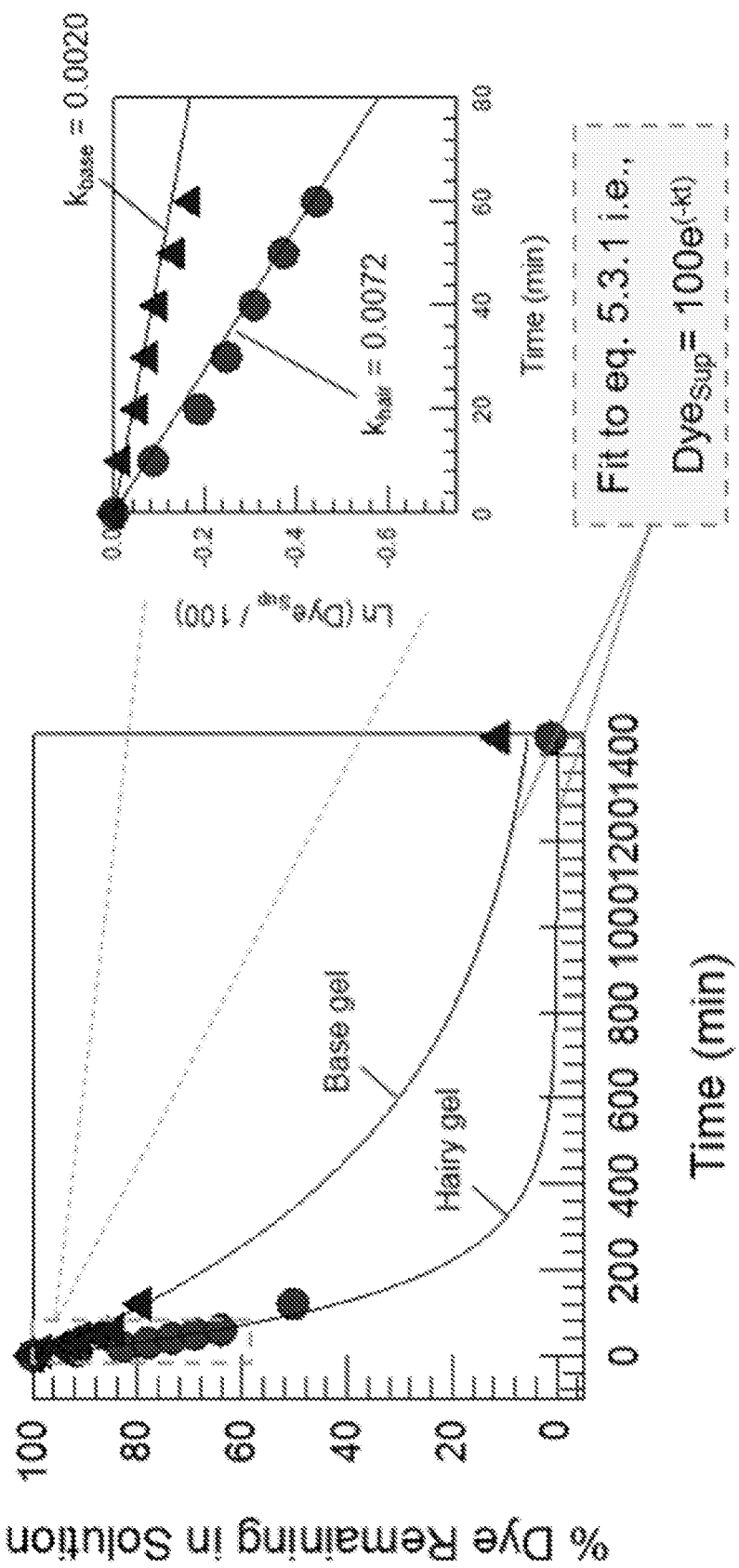
FIG. 35 illustrates graphically dye percent in solution as a function of time for the base and hair-covered gels of FIG. 34, confirming more rapid dye removal by the hair-covered gel. The inset is a semilog plot of the initial ~1 hour of the data. The slopes of the lines yield the decay constants k for each gel. The value of $k_{hair}$ is about three times the value of $k_{base}$.

Dye Adsorption by Hair-covered vs. Base Gels. As previously stated, villi improve nutrient transport through the small intestine by increasing the surface area for adsorption. To mimic this behavior, the adsorption of a dye from solution by a flat gel with no hairs (base gel) compared to an identical hair-covered gel was studied. For this purpose, we synthesized a base gel of the composition 10 wt % DMAA, 0.34 wt % BIS, and 1 wt % LAP. This was sectioned into two 22.5×22.5 mm squares, and one such base gel was used as is. Hairs were grown from the surface of the second base gel, with the hairs having an identical composition to the above. We then compared the two gels for their ability to extract MB from an aqueous solution. Each gel was placed in a separate beaker containing a 10 μM solution of MB (FIG. 34) and monitored for 2 h by UV-Vis spectroscopy. Thereafter, the beakers were transferred to a shaker table, where they were allowed to mix for a full 24 h, at which point a final sample was analyzed in each case. The results are plotted in FIG. 35, with the inset showing the data over the first hour. Photos at selected time points of the solution containing the base gel are shown in FIG. 34a and for the hair-covered gel in FIG. 34b.

After 24 h, the base gel in FIG. 34a showed a deep blue color while the solution still had a light blue color, indicating residual MB dye in solution. In comparison, the solution containing the hair-covered gel was practically colorless after 24 h, indicating that most of the MB had been removed. (Note that the remaining blue color of the solution after 24 h in FIG. 34a is not as readily apparent from black/white images). Both the hairs as well as the base of this gel were deep blue. The UV-Vis data for the dye in the supernatant was normalized and presented in FIG. 35. The data indicate more than three times faster removal of dye by the hair-covered gel as compared to the non-hair-covered base gel. Both the hair-covered gel and base gel data can be fit to an exponential decay:

$$\text{Dye\%} = 100 e^{-kt} \quad \text{(Equation 3)}$$

where Dye % is the percent of dye remaining in the supernatant, and k is a decay constant. The inset shows the data over roughly the first hour of the experiment, and this is plotted in a semilog fashion. From the slopes of the lines on this plot, we can calculate the decay constants. For the hair-covered gel $k_{hair} = 7.2 \times 10^{-3}$ min$^{-1}$ and for the base gel $k_{base} = 2.0 \times 10^{-3}$ min$^{-1}$. Thus, $k_{hair}$ is more than thrice $k_{base}$, which confirms the large increase in dye adsorption by the hair-covered gel.

Figure 36:
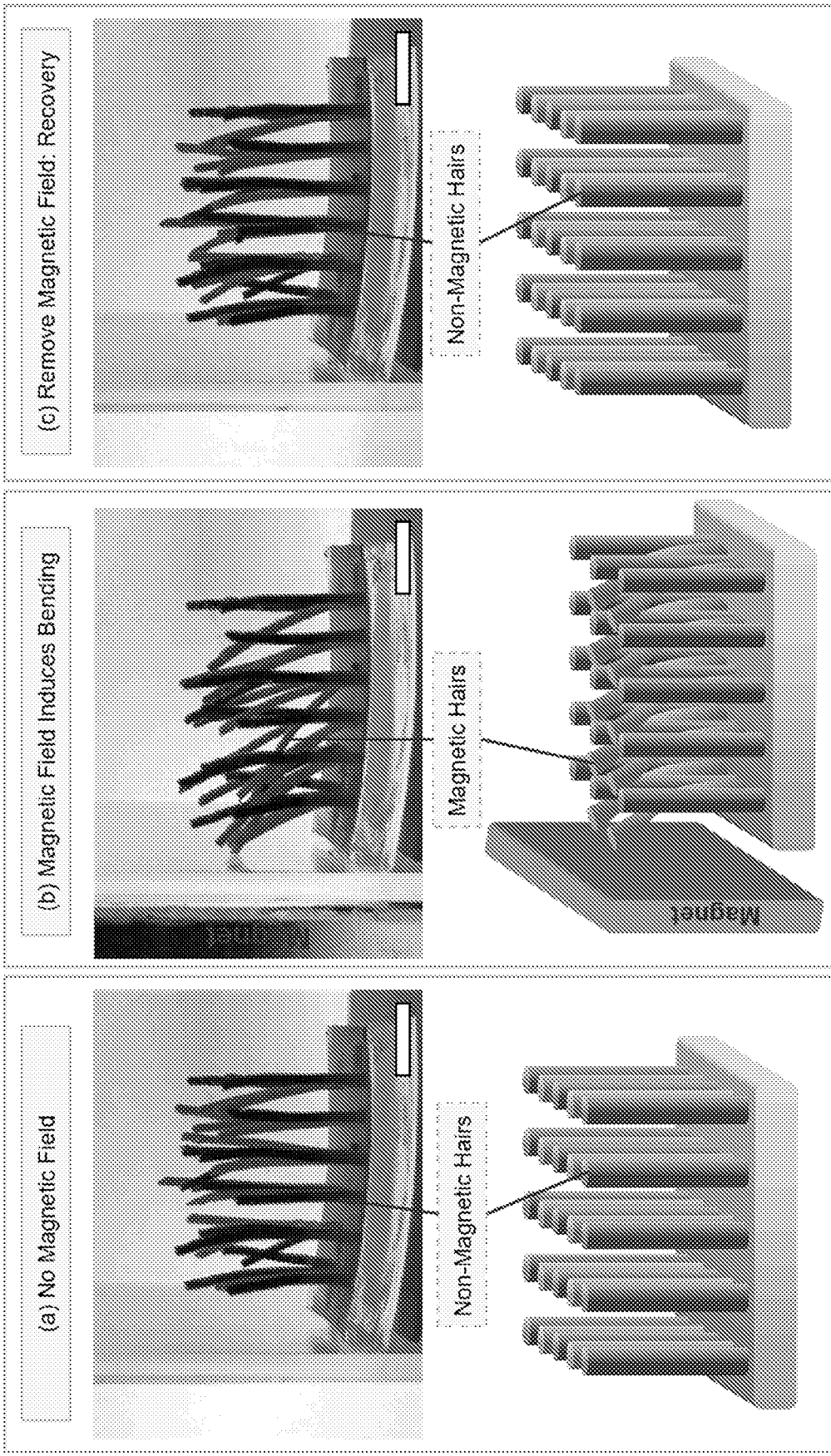
FIG. 36 illustrates stimuli-responsive rows of hairs. Rows of magnetically responsive hairs (lighter hairs, due to MNPs in the hairs) alternate with non-responsive hairs (darker/black hairs, due to CB in the hairs) on the base gel. Each sample is illustrated by photo (upper images) and schematically (lower images). With no magnetic field (a), both hairs stand vertically. When a magnet is placed on the left (b), the magnetic hairs bend toward the gel, while the non-responsive hairs remain vertical. When the magnetic field was removed (c), all hairs returned to their substantially vertical position. Scale bars are 5 mm.

Gels with Stimuli-Responsive Hairs. In addition to villi in the intestine, other hair-like structures in nature include the cilia on microbes, which exert a characteristic "beating" motion that transports the microbe through fluids. To mimic the "beating" motion, we synthesized hair-covered gels with magnetic hairs. Alternating rows of magnetic and non-magnetic hairs were polymerized on the surface of a DMAA-BIS base gel. Both hairs contained LAP for flexibility. For the magnetic hairs, we included 0.2 wt % MNPs ($Fe_2O_3$) in a DMAA-BIS-LAP gel, and these hairs have a brown color. In the non-magnetic hairs, we used the same composition of monomers, but replaced the MNPs with 0.1 wt % CB nanoparticles. These hairs have a black color due to the CB. FIG. 36 shows the response of the above hair-covered gel to a magnet placed to the left of the container while the gel is in DI water. Initially, in the absence of a magnetic field, both sets of hairs stand straight up from the surface (FIG. 36a). In the presence of a magnetic field, the responsive hairs bend towards the magnet, while the non-responsive (non-magnetic) hairs remained vertical (FIG. 36b). When the magnetic field was removed, the magnetic hairs returned to their original position (FIG. 36c). This behavior demonstrates that the hairs are magnetically responsive, and that a periodic magnetic field can be used to make the hairs "beat" in a manner similar to that of cilia.

Multilayer Hairs. To synthesize multilayer hairs, we first start with a previously synthesized hair-covered gel, specifically one with hairs of DMAA-LAP, with adsorbed MB for visualization. We incubate this gel in a 20 mg/mL APS solution for 20 min, then moved it to a container with a second monomer solution, which in this case was acrylamide (AAm) with BIS as the crosslinker. The initiator diffused outward from the hairs and base to create a second layer of hairs over the first. At this point, a hair-covered gel with an inner blue layer of DMAA-LAP, covered by a transparent layer of AAm-BIS hairs, was achieved (FIG. 37a). AAm is known to shrink and become turbid in solutions of >50% acetone, whereas DMAA is unaffected by acetone. Thus, when the whole gel was placed in a 60% acetone solution, the inner blue hairs of DMAA-LAP were surrounded by the turbid and opaque layer of AAm-BIS in FIG. 37b.

Figure 37:
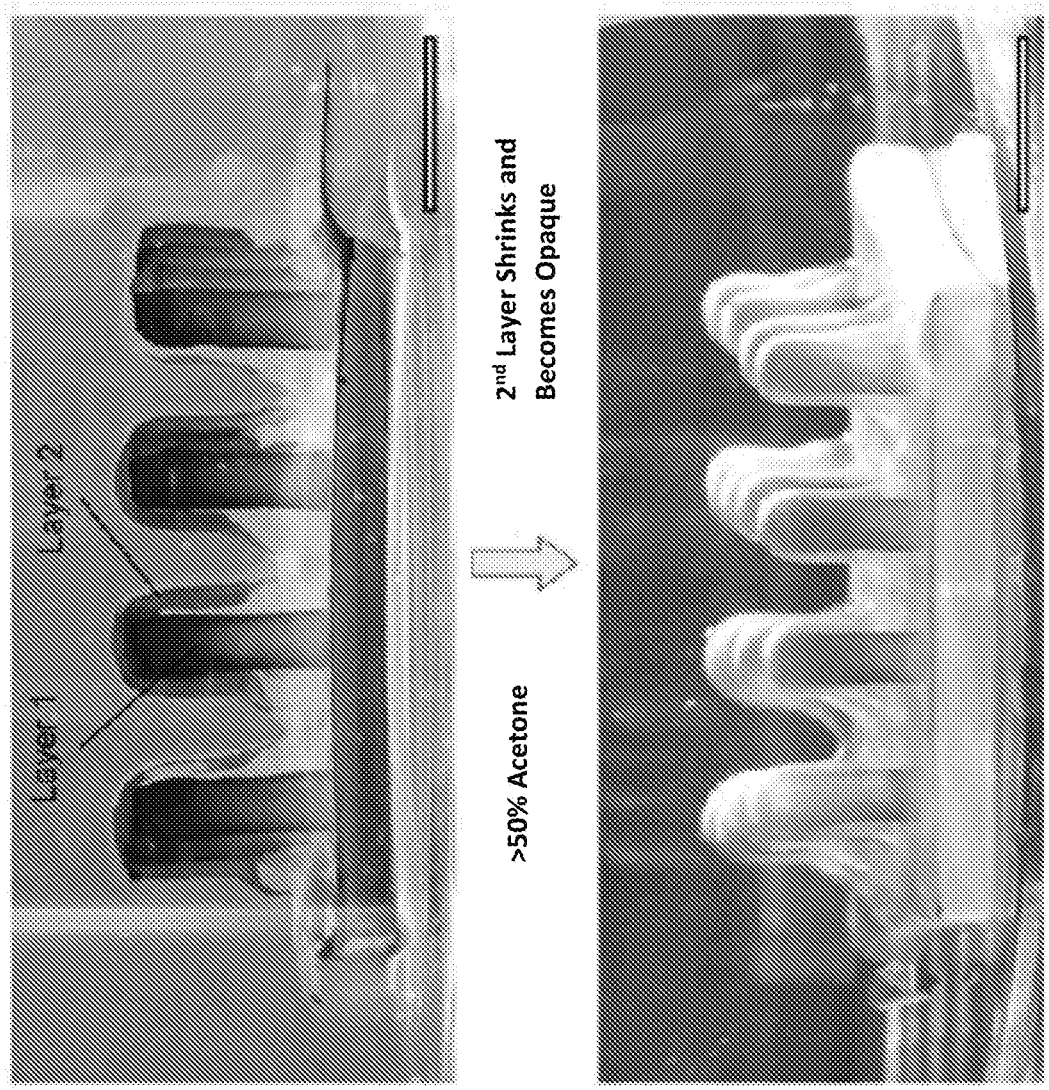
FIG. 37 illustrates an exemplary structure including multilayer hairs. Each hair has an inner layer of DMAA-LAP (seen as dark blue due to adsorbed MB dye) and an outer layer of AAm-BIS. In water (upper image), both layers are swollen (a). In 60% acetone the outer AAm layer shrinks and becomes turbid and opaque (b). Scale bars are 5 mm.
Figure 38:
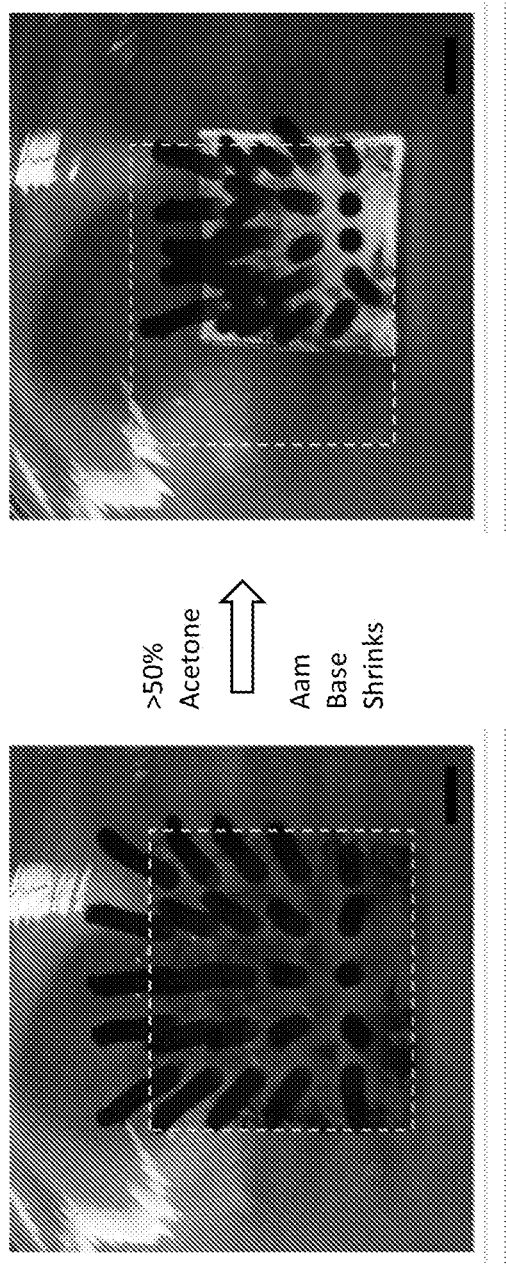
FIG. 38 illustrates a hair-covered gel with a stimuli-responsive base. The hairs are DMAA-LAP on top of a base of AAm-BIS. The entire structure is placed in a >50% acetone solution (60%). A top view of the response is shown in panel (a), and a side view of the response is shown in panel (b). The base gel shrinks, but the hairs remain the same height. The initial dimensions of the base gel is shown by dashed line box. Due to the shrinking, the distance between adjacent hairs decreased from 2.7 mm to 1.3 mm. Scale bars are 5 mm.
Figure 38:
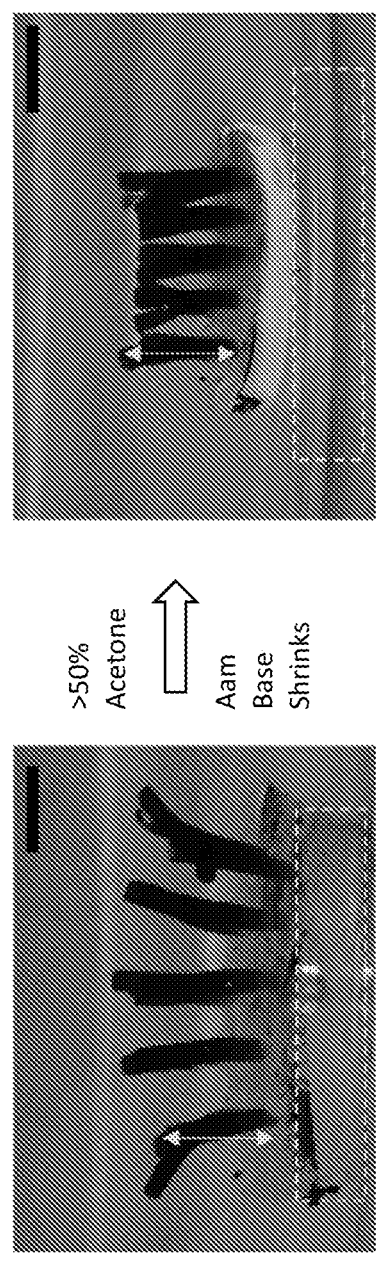

Hair-covered Gels with Stimuli-Responsive Bases. Previously we studied how hairs created from stimuli-responsive materials behave in interesting ways. Next, we studied the case where the base alone is stimuli-responsive. Here, the hairs were made of DMAA-LAP and stained blue by MB. The base was AAm-BIS. FIG. 38 shows images of this gel immersed in a 60% acetone solution. As shown in FIG. 37, AAm shrinks and becomes turbid while DMAA is unaffected. Thus, in this case, the base shrank by about 50% of its initial area, and so all the original hairs were packed much more densely in a smaller area. The spacing between hairs along the front edge of the gel decreased from about 2.7 mm initially to about 1.3 mm as the base shrank. However, as noted by the vertical arrows, the height of the hairs remained substantially unaltered.

Figure 39:
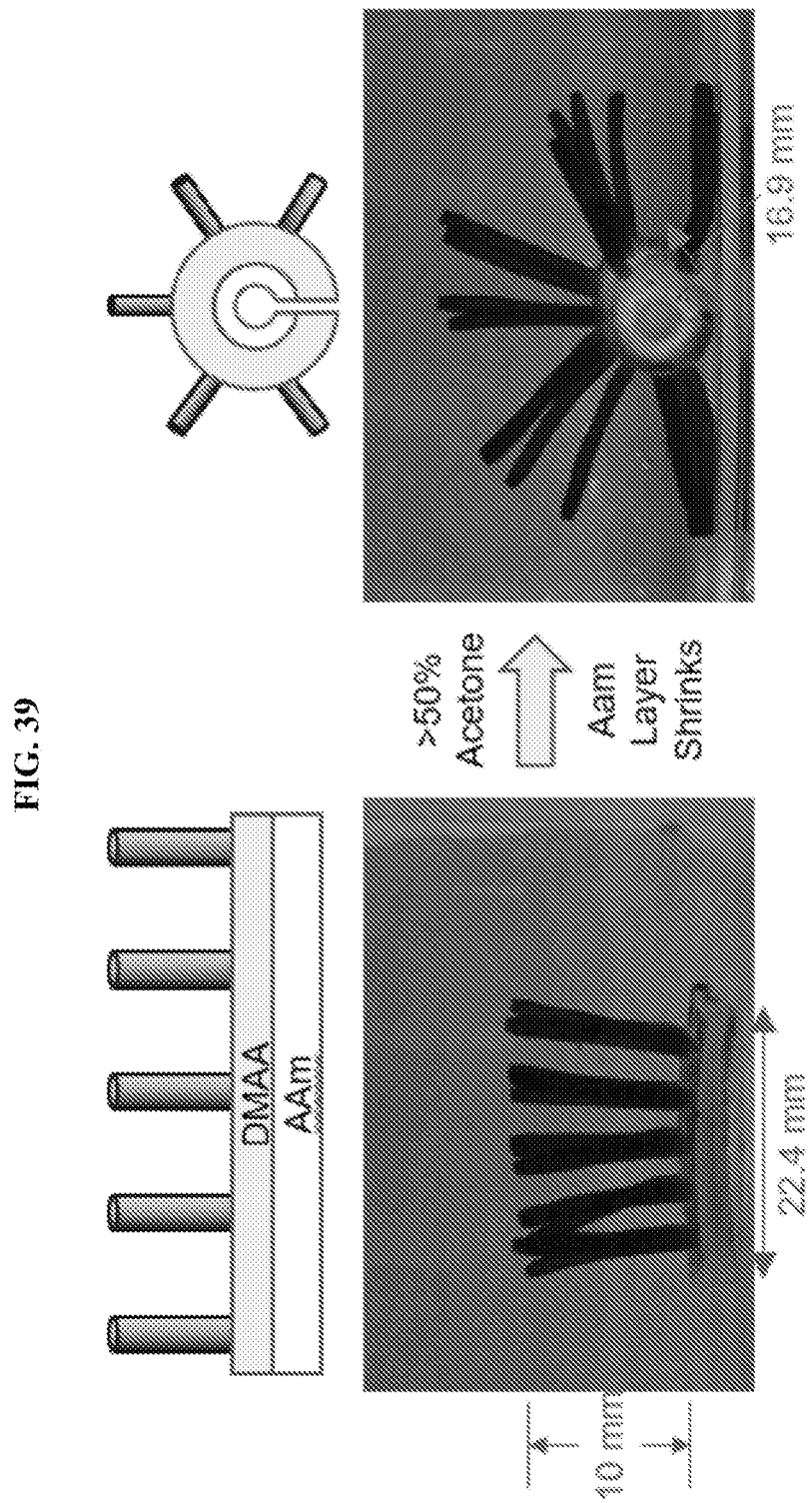
FIG. 39 illustrates a hair-covered gel with a bilayer base, and showing a shape change to curled configuration in response to solvent composition. The base has two layers, AAm and DMAA, both crosslinked with BIS. The hairs are formed of DMAA-LAP and grown on the DMAA side of the bilayer base. In acetone, the AAm layer shrinks, causing the base to curl into a tubular configuration. The DMAA layer, and the hairs, are exteriorly disposed and project outwardly from the central tube.

Next, we created hairs on a bilayer base. Bilayer bases were formed by polymerizing a first layer of monomer, followed by adding a second monomer and polymerizing that one as well. The two polymer networks in the bilayer are bonded at the interface because the second monomer will interpenetrate a bit into the first layer before it is polymerized. The first bilayer base studied here had a lower AAm and an upper DMAA layer, both crosslinked with BIS (FIG. 39). We then formed DMAA-LAP hairs on the DMAA layer of the base, and these were again stained blue by MB dye. When this hair-covered gel was placed in 60% acetone, the AAm layer shrank. This shrinking caused the bilayer base gel to curl toward the AAm layer, away from the hairs. Ultimately, this resulted in a tubular structure with hairs on the outside.

Figure 40:
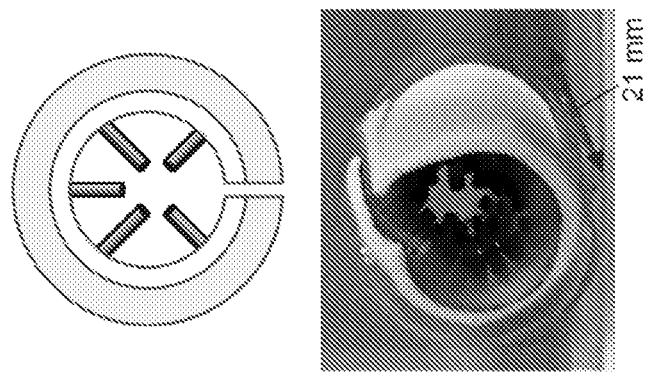
FIG. 40 illustrates another hair-covered gel with a bilayer base, and showing a shape change to another curled configuration in response to solvent composition. The base has two layers, AAm and DMAA, both crosslinked with BIS. The hairs are formed of DMAA-LAP and grown on the AAm side of the bilayer. In acetone, the AAm layer shrinks, causing the base to curl into a tubular configuration. Because the hairs were attached to the AAm layer, the hairs are interiorly disposed and project inwardly within the tubular structure when the base was disposed in its curled configuration, similar to villi on the interior wall of in the small intestine.
Figure 40:
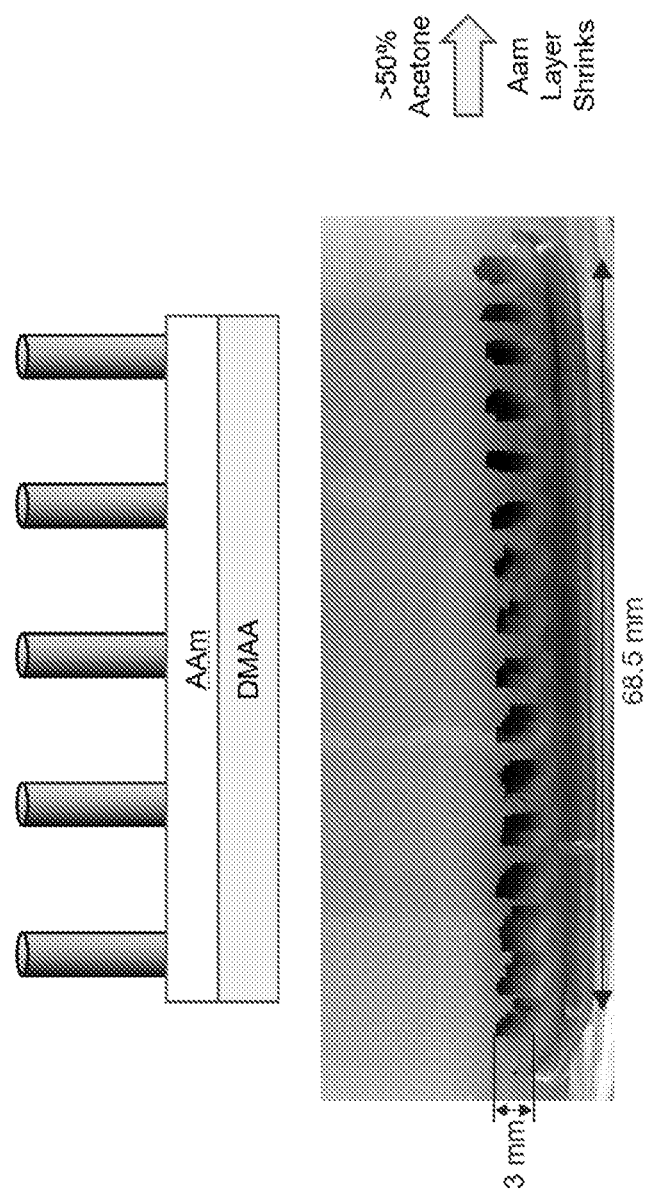

Next, we study the opposite case, in which hairs of DMAA-LAP were formed on the AAm side of the AAm/DMAA bilayer gel (FIG. 40). Again, the hair-covered gel was placed in 60% acetone, and the AAm layer shrank. The bilayer base gel curled towards the AAm layer, leading to a curled tubular structure with hairs on the inside of the tube, similar to villi on the interior wall of the small intestine.

Discussion. We have presented a technique for the synthesis of biomimetic hair-like structures that grow outward from a base polymer gel. The addition of hairs serves to increase the net surface area of the base gel by nearly 10-fold. This increase is comparable to the surface area increase provided by villi on the inner walls of small intestines. We can impact stimuli-responsive properties to the hairs (e.g., magnetic properties), and also induce such hair-covered gels to fold into tubes with hairs on the outside or inside.

All identified publications and references are herein incorporated by reference to the same extent as if each individual publication was specifically and individually indicated to be incorporated by reference in its entirety. While the invention has been described in connection with exemplary embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the features hereinbefore set forth.

What is claimed is:

1. A method of synthesizing a multilayer structure, comprising the step of subjecting a substrate to a first polymer layer-forming cycle, wherein said first cycle comprises:
    loading said substrate with a first reactant;
    exposing said loaded substrate to a second reactant, wherein said first reactant diffuses outwardly from said substrate and reacts with said second reactant, thereby initiating polymerization and forming a polymer layer disposed on said substrate; and
    subjecting said substrate and said polymer layer formed from the preceding cycle to one or more additional polymer layer-forming cycle(s),
    wherein each of said additional cycle(s) comprises:
        reloading said substrate and said polymer layer from the preceding cycle with a first reactant; and
        exposing said reloaded substrate and said polymer layer from the preceding cycle to a second reactant,
    wherein said first reactant diffuses outwardly from said substrate and said polymer layer from the preceding cycle and reacts with said second reactant, thereby initiating polymerization and forming a polymer layer disposed on and discrete from said polymer layer formed in the preceding cycle.

2. The method of claim 1, wherein a first reactant in at least one of said cycles differs from a first reactant in another of said cycles.

3. The method of claim 1, wherein a second reactant in at least one of said cycles differs from a second reactant in another of said cycles.

4. The method of claim 1, wherein said first reactant is an initiator or a first monomer.

5. The method of claim 1, wherein said second reactant is a second monomer.

6. The method of claim 1, wherein said multilayer structure comprises a generally cylindrical configuration, comprising the further step of removing said substrate, thereby forming a multilayer structure having a generally tubular configuration.

7. The method of claim 1, wherein at least one of said polymer layers comprises an array of hair-like protrusions coupled to and extending outwardly from said substrate.

8. The method of claim 1, wherein one of said polymer layers comprises a first composition, and at least another of said polymer layers comprises a second composition different from said first composition.

9. The method of claim 1, wherein one of said polymer layers has a first solute permeability, and at least another of said polymer layers has a second solute permeability different from said first solute permeability.

10. The method of claim 1, wherein one of said polymer layers has a first thickness and at least another of said polymer layers has a second thickness different from said first thickness.

* * * * *